US012332695B2

(12) United States Patent
Lin et al.

(10) Patent No.: US 12,332,695 B2
(45) Date of Patent: Jun. 17, 2025

(54) FOLDABLE APPARATUS AND ELECTRONIC DEVICE

(71) Applicant: HUAWEI TECHNOLOGIES CO., LTD., Guangdong (CN)

(72) Inventors: Yangming Lin, Dongguan (CN); Haiqiang Tian, Dongguan (CN); Weifeng Wu, Dongguan (CN); Tao Huang, Shenzhen (CN); Shangyun Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 18/192,022

(22) Filed: Mar. 29, 2023

(65) Prior Publication Data

US 2023/0244274 A1   Aug. 3, 2023

Related U.S. Application Data

(63) Continuation of application No. PCT/CN2021/092958, filed on May 11, 2021.

(30) Foreign Application Priority Data

Sep. 30, 2020   (CN) .......................... 202011061519.2

(51) Int. Cl.
*G06F 1/16*   (2006.01)
(52) U.S. Cl.
CPC .......... *G06F 1/1652* (2013.01); *G06F 1/1616* (2013.01); *G06F 1/1681* (2013.01)

(58) Field of Classification Search
CPC .... G06F 1/1652; G06F 1/1681; G06F 1/1616; G06F 1/1641; G06F 1/1637; G06F 1/1656; H05K 5/0017; H05K 5/0217
See application file for complete search history.

(56) References Cited

U.S. PATENT DOCUMENTS 9,677,308 B1 *   6/2017   Chen .......................... E05D 3/18
12,010,254 B2 *  6/2024   Liu ........................ H04M 1/022
(Continued)

FOREIGN PATENT DOCUMENTS

CN   110632977 A   12/2019
CN   111911524 A   11/2020
(Continued)

OTHER PUBLICATIONS

Official Action dated May 21, 2024, issued for Japanese Application 2023-519606 (2 pages) and Translation (2 pages).
(Continued)

*Primary Examiner* — Abhishek M Rathod

(57) ABSTRACT

A foldable apparatus and an electronic device, wherein foldable apparatus includes a mounting bracket and a rotating bracket assembly. The rotating bracket assembly includes a first rotating bracket and a second rotating bracket arranged on two sides of the mounting bracket along a width direction of the mounting bracket. The first rotating bracket is rotatably connected to the mounting bracket by using a first rotating shaft. The second rotating bracket is rotatably connected to the mounting bracket by using a second rotating shaft. When the first rotating bracket and the second rotating bracket rotate toward each other, the first rotating shaft and the second rotating shaft move in a direction away from the mounting bracket along the width direction of the mounting bracket.

20 Claims, 28 Drawing Sheets

(56) References Cited

U.S. PATENT DOCUMENTS

2020/0329573 A1* 10/2020 Huang ................. H05K 5/0017
2020/0348732 A1* 11/2020 Kang .................... G06F 1/1652

FOREIGN PATENT DOCUMENTS

| EP | 3722923 B1 | 11/2023 |
| JP | 2020125841 A | 8/2020 |
| TW | M582540 U | 8/2019 |
| TW | M587285 U | 12/2019 |

OTHER PUBLICATIONS

Office Action dated Jun. 19, 2024, issued for Chinese Application No. 202011061519.2 (8 pages).
Extended European Search Report dated Jan. 22, 2024, issued for European Application No. 21873874.8 (10 pages).
International Search Report dated Jul. 29, 2021, issued for International Application No. PCT/CN2021/092958 (13 pages).

* cited by examiner

FOLDABLE APPARATUS AND ELECTRONIC DEVICE

CROSS-REFERENCE TO RELATED APPLICATIONS

This application is a continuation of International Application No. PCT/CN2021/092958, filed on May 11, 2021, which claims priority to Chinese Patent Application No. 202011061519.2, filed on Sep. 30, 2020. The disclosures of the aforementioned applications are hereby incorporated by reference in their entireties.

TECHNICAL FIELD

This disclosure relates to the field of electronic device technologies, and in particular, to a foldable apparatus and an electronic device.

BACKGROUND

A foldable electronic device includes a housing, a folding component, and a flexible screen. The housing includes a left housing and a right housing that are separately disposed, the folding component is located between the left housing and the right housing, and the flexible screen is mounted on the left housing and the right housing. When the left housing and the right housing are folded under driving of the folding component, the flexible screen can be driven to be folded, so that the electronic device is in a folded state. In the folded state, a volume of the electronic device is small, to facilitate storage. When the left housing and the right housing are unfolded under driving of the folding component, the flexible screen is driven to be unfolded, so that the electronic device is in an unfolded state. In the unfolded state, a display of the electronic device is large, so that user experience can be improved.

Currently, in a folding process of the existing foldable electronic device, the flexible screen is pulled or squeezed at a folding position of the folding component. Consequently, reliability and a service life of the flexible screen are reduced.

SUMMARY

This disclosure provides a foldable apparatus and an electronic device, to reduce, in unfolded and folded state, a risk that a flexible screen is pulled or squeezed in an unfolding and folding process, and improve security and reliability of the flexible screen.

A first aspect of this disclosure provides a foldable apparatus. The foldable apparatus includes: a mounting bracket; and a rotating bracket assembly, where the rotating bracket assembly includes a first rotating bracket and a second rotating bracket arranged on two sides of the mounting bracket along a width direction of the mounting bracket; the first rotating bracket is rotatably connected to the mounting bracket by using a first rotating shaft, and the first rotating shaft is movable relative to the mounting bracket along the width direction of the mounting bracket; and the second rotating bracket is rotatably connected to the mounting bracket by using a second rotating shaft, and the second rotating shaft is movable relative to the mounting bracket along the width direction of the mounting bracket; and when the first rotating bracket and the second rotating bracket rotate toward each other, the first rotating shaft and the second rotating shaft move in a direction away from the mounting bracket along the width direction of the mounting bracket.

Specifically, in a process in which the foldable apparatus switches from an unfolded state to a folded state, when rotating toward each other along the width direction of mounting bracket, the first rotating bracket and the second rotating bracket are further movable in the direction away from the mounting bracket under driving of the first rotating shaft and the second rotating shaft. Compared with a case in which the first rotating shaft and the second rotating shaft do not move, an accommodation space of the foldable apparatus in the folded state can be increased.

In a possible implementation, the foldable apparatus further includes: a swing arm assembly, including a first swing arm and a second swing arm that are located on the two sides of the mounting bracket along the width direction of the mounting bracket, where the rotating bracket assembly is rotatably connected to the mounting bracket by using the swing arm assembly, one end of the first swing arm is slidably connected to the first rotating bracket and is rotatable relative to the first rotating bracket, and the other end is rotatably connected to the mounting bracket by using the first rotating shaft; and one end of the second swing arm is slidably connected to the second rotating bracket and is rotatable relative to the second rotating bracket, and the other end is rotatably connected to the mounting bracket by using the second rotating shaft; and a transmission assembly, including a transmission group and a push group, where the transmission group includes a first transmission connecting rod and a second transmission connecting rod that are located on the two sides of the mounting bracket along the width direction of the mounting bracket; the first transmission connecting rod is slidably connected to the first rotating bracket and rotatably connected to the mounting bracket, and the second transmission connecting rod is slidably connected to the second rotating bracket and rotatably connected to the mounting bracket; and the push group includes a first push member and a second push member, the first push member is rotatably connected to the second swing arm by using the second rotating shaft, and the first push member is further rotatably connected to the first transmission connecting rod, and the second push member is rotatably connected to the first swing arm by using the first rotating shaft, and the second push member is further rotatably connected to the second transmission connecting rod, where an axis around which the first transmission connecting rod rotates relative to the mounting bracket and an axis around which the first transmission connecting rod rotates relative to the first push member are different axes, and an axis around which the second transmission connecting rod rotates relative to the mounting bracket and an axis around which the second transmission connecting rod rotates relative to the second push member are different axes; and the first transmission connecting rod is configured to transfer movement of the first rotating bracket, to drive the first push member to push the second rotating shaft to move in the direction away from the mounting bracket, and the second transmission connecting rod is configured to transfer movement of the second rotating bracket, to drive the second push member to push the first rotating shaft to move in the direction away from the mounting bracket.

In this solution, two ends of the first swing arm are respectively connected to the first rotating bracket and the second push member, and two ends of the second swing arm are respectively connected to the second rotating bracket and the first push member. Therefore, the first rotating bracket and the second rotating bracket are connected by using the first transmission connecting rod, the first push member, and the second swing arm, and are also connected by using the second transmission connecting rod, the second push member, and the first swing arm. In this case, the first transmission connecting rod, the first push member, the second swing arm, the second transmission connecting rod, the second push member, and the first swing arm are configured to implement linkage between the first rotating bracket and the second rotating bracket. The first transmission connecting rod is configured to transfer movement of the first rotating bracket, and the second transmission connecting rod is configured to transfer movement of the second rotating bracket, so that in a process in which the first rotating bracket and the second rotating bracket rotate toward each other, the first rotating bracket drives, by using the first transmission connecting rod, the first push member to push the second rotating shaft to move in the direction away from the mounting bracket, and the second rotating bracket drives, by using the second transmission connecting rod, the second push member to push the first rotating shaft to move in the direction away from the mounting bracket, so as to increase the accommodation space of the foldable apparatus in the folded state. In addition, when the first swing arm is rotatably connected to the first rotating bracket, a risk of jamming between the first swing arm and the first rotating bracket in the folding or unfolding process of the foldable apparatus can be reduced, and when the second swing arm is rotatably connected to the second rotating bracket, a risk of jamming between the second swing arm and the second rotating bracket in the folding or unfolding process of the foldable apparatus can be reduced.

In a possible implementation, the transmission assembly further includes a limiting group, and the limiting group includes a first limiting member and a second limiting member; one end of the first limiting member is rotatably connected to the mounting bracket, and the other end is rotatably connected to the first swing arm and the second push member by using the first rotating shaft; one end of the second limiting member is rotatably connected to the mounting bracket, and the other end is rotatably connected to the second swing arm and the first push member by using the second rotating shaft; and the first limiting member is configured to limit movement of the first push member along a first preset track, and the second limiting member is configured to limit movement of the second push member along a second preset track.

In this solution, a first rocker of the first transmission connecting rod, the first push member, the second limiting member, and the mounting bracket form a first double rocker mechanism, and a second rocker of the second transmission connecting rod, the second push member, the first limiting member, and the mounting bracket form a second double rocker mechanism. In this case, when the foldable apparatus implements transmission between the first rotating bracket and the second rotating bracket by using the first double rocker mechanism and the second double rocker mechanism, because all moving members of the double rocker mechanism move in a same plane, complexity of the foldable apparatus can be reduced and movement of the components of the foldable apparatus is simplified, and stability and reliability of movement of the first rotating bracket and the second rotating bracket are improved. In addition, when the transmission assembly of the foldable apparatus is implemented by using the double rocker mechanisms, the first rotating shaft and the second rotating shaft may be connected to connecting rods of the double rocker mechanisms, and when the connecting rods perform planar movement, the first rotating shaft and the second rotating shaft are driven to perform planar movement, to further drive the first rotating shaft and the second rotating shaft to move along the width direction of the mounting bracket relative to the mounting bracket (a rack).

In a possible implementation, both the first preset track and the second preset track extend along the width direction of the mounting bracket. In this solution, in the first double rocker mechanism, when lengths of the first rocker and the second limiting member are the same, it indicates that lengths of two side links of the first double rocker mechanism are the same. In this case, movement of the connecting rod (the first push member) of the first double rocker mechanism is translation along the width direction of the mounting bracket, that is, the first preset track is a straight line extending along the width direction of the mounting bracket. Similarly, in the second double rocker mechanism, when lengths of the second rocker and the first limiting member are the same, it indicates that lengths of two side links of the second double rocker mechanism are the same. In this case, movement of the connecting rod (the second push member) of the second double rocker mechanism is translation along the width direction of the mounting bracket, that is, the second preset track is a straight line extending along the width direction of the mounting bracket. When moving tracks of the first push member and the second push member are both straight lines along the width direction, movement stability of the first push member and the second push member can be further improved, so as to improve stability of movement of the first rotating shaft and the second rotating shaft along the width direction of the mounting bracket.

In a possible implementation, the first preset track and the second preset track are both tilted toward a thickness direction of the mounting bracket along the width direction of the mounting bracket; in addition, oblique directions of the first preset track and the second preset track are opposite, and the first push member is tilted along the thickness direction of the mounting bracket in a process of moving along the width direction of the mounting bracket; and the second push member is tilted along the thickness direction of the mounting bracket in a process of moving along the second preset track. In this solution, when the lengths of the first rocker and the second limiting member are different, the first push member is tilted along the thickness direction of the mounting bracket when moving along the width direction of the mounting bracket. When the lengths of the second rocker and the first limiting member are different, the second push member is tilted along the thickness direction of the mounting bracket when moving along the width direction of the mounting bracket. In this case, a requirement on the lengths of the first rocker, the second limiting member, the second rocker, and the first limiting member is reduced, so as to reduce a processing difficulty. In addition, when the first push member and the second push member are tilted along the thickness direction of the mounting bracket when moving along the width direction of the mounting bracket, jamming between the first push member, and the first transmission connecting rod connected to the first push member and the second swing arm can be further prevented, and jamming between the second push member, and the second transmission connecting rod connected to the second push member and the first rocker can be prevented.

In a possible implementation, the first push member is slidably connected to the mounting bracket, and the second push member is slidably connected to the mounting bracket. In this solution, the first push member is slidable relative to the mounting bracket along the width direction of the mounting bracket, to push the second rotating shaft to move along the width direction of the mounting bracket; and in addition, the second push member is slidable relative to the mounting bracket along the width direction of the mounting bracket, to push the first rotating shaft to move along the width direction of the mounting bracket.

In a possible implementation, the transmission assembly further includes a limiting group, and the limiting group includes a first limiting member and a second limiting member; and both the first limiting member and the second limiting member are slidably connected to the mounting bracket; the first limiting member is slidable relative to the mounting bracket along the width direction of the mounting bracket, the first limiting member is rotatably connected to the second push member by using the first rotating shaft, and the second push member is movable relative to the first limiting member along a thickness direction of the mounting bracket, the first limiting member is further rotatably connected to the first swing arm; the second limiting member is slidable relative to the mounting bracket along the width direction of the mounting bracket, the second limiting member is rotatably connected to the first push member by using the second rotating shaft, and the first push member is movable relative to the second limiting member along the thickness direction of the mounting bracket, and the second limiting member is further rotatably connected to the second swing arm; and the first limiting member is configured to limit movement of the first push member along a third preset track, and the second limiting member is configured to limit movement of the second push member along a fourth preset track.

In this solution, a first crank of the first transmission connecting rod, the first push member, the second limiting member, and the mounting bracket form a first crank-slider mechanism, and a second crank of the second transmission connecting rod, the second push member, the first limiting member, and the mounting bracket form a second crank-slider mechanism. In this case, when the foldable apparatus implements transmission between the first rotating bracket and the second rotating bracket by using the first crank-slider mechanism and the second crank-slider mechanism, because all moving members of the crank-slider mechanism move in a same plane, complexity of the foldable apparatus can be reduced and movement of the components of the foldable apparatus is simplified, and stability and reliability of movement of the first rotating bracket and the second rotating bracket are improved. In addition, in the first crank-slider mechanism, movement of the first push member may be curved movement in a plane in which the first crank-slider mechanism is located, that is, the first push member is movable relative to the mounting bracket along the width direction of the mounting bracket, and is further movable along the thickness direction of the mounting bracket, so as to drive the second rotating shaft to move along the width direction of the mounting bracket. In the second crank-slider mechanism, movement of the second push member may be curved movement in a plane in which the second crank-slider mechanism is located, that is, the second push member is movable relative to the mounting bracket along the width direction of the mounting bracket, and is further movable along the thickness direction of the mounting bracket, so as to drive the first rotating shaft to move along the width direction of the mounting bracket.

In a possible implementation, a first mounting groove is provided in the second limiting member, a second mounting groove is provided in the first limiting member, and both the first mounting groove and the second mounting groove are recessed along the thickness direction of the mounting bracket; and the first push member is movably connected to the first mounting groove, and the second push member is movably connected to the second mounting groove.

In this solution, to implement curved movement of the first push member, the first mounting groove is provided in the second limiting member, and the first push member is movably mounted in the first mounting groove, so that the first push member is movable (curved movement) along the width direction and the thickness direction of the mounting bracket relative to the second limiting member. Similarly, to implement curved movement of the second push member, the second mounting groove is provided in the first limiting member, and the second push member is movably mounted in the second mounting groove, so that the second push member is movable (curved movement) along the width direction and the thickness direction of the mounting bracket relative to the first limiting member. In addition, both the first mounting groove and the second mounting groove are recessed along the thickness direction of the mounting bracket, so that a thickness of the first push member when being mounted in the first mounting groove and a thickness of the second push member when being mounted in the second mounting groove can be reduced, to reduce a size of the foldable apparatus along the thickness direction of the mounting bracket, thereby helping implement miniaturization and a light and thin design of the foldable apparatus and the electronic device.

In a possible implementation, chutes extending along the width direction of the mounting bracket are provided on side walls of the mounting bracket that are relative to the first limiting member and the second limiting member, and the first limiting member and the second limiting member are respectively slidably connected to the corresponding chutes. In this solution, the first limiting member and the chute that fit each other can implement sliding of the first limiting member along the width direction of the mounting bracket, so as to limit a moving track of the first push member and prevent movement deviation of the first push member. Similarly, the second limiting member and the chute that fit each other can implement sliding of the second limiting member along the width direction of the mounting bracket, so as to limit a moving track of the second push member and prevent movement deviation of the second push member. In a possible implementation, the first rotating shaft is disposed on the first push member, the first swing arm is rotatably connected to the first rotating shaft, the second rotating shaft is disposed on the second push member, and the second swing arm is rotatably connected to the second rotating shaft; and a plurality of chutes extending along the width direction of the mounting bracket are provided on the mounting bracket, the first rotating shaft is slidably connected to the corresponding chute, and the second rotating shaft is slidably connected to the corresponding chute. In this solution, the first rotating shaft and the chute that fit each other can implement sliding of the second rotating shaft along the width direction of the mounting bracket, and can limit a moving track of the first push member and prevent movement deviation of the first push member. Similarly, the second rotating shaft, the chute, and the first rotating shaft slide along the width direction of the mounting bracket, and can limit a moving track of the second push member and prevent movement deviation of the first push member.

In a possible implementation, the chute is obliquely disposed or is of an arcuate structure along the thickness direction of the mounting bracket, that is, along the thickness direction of the mounting bracket, heights of the chute are different, to implement movement of the first push member and the second push member along the width direction and the thickness direction of the mounting bracket, so that the first push member and the second push member can be tilted along the thickness direction of the mounting bracket when moving along the width direction of the mounting bracket, so as to prevent jamming between the first push member, and the first transmission connecting rod connected to the first push member and the second swing arm, and prevent jamming between the second push member, and the second transmission connecting rod connected to the second push member and the first swing arm.

In a possible implementation, the foldable apparatus further includes a support plate assembly, and the support plate assembly includes a first support plate and a second support plate arranged on the two sides of the mounting bracket along the width direction of the mounting bracket; and the first support plate is rotatably connected to the first rotating bracket, and the first support plate is slidably connected to the first transmission connecting rod and is rotatable relative to the first transmission connecting rod; the second support plate is rotatably connected to the second rotating bracket, and the second support plate is slidably connected to the second transmission connecting rod and is rotatable relative to the second transmission connecting rod. In this solution, when the first rotating bracket rotates relative to the first support plate, and the second rotating bracket rotates relative to the second support plate, in the folding or unfolding process of the foldable apparatus, jamming between the first support plate and the first rotating bracket can be prevented, and jamming between the second support plate and the second rotating bracket can be prevented, so that the foldable apparatus can work normally.

In a possible implementation, in a process in which the first rotating bracket and the second rotating bracket rotate toward each other, the first transmission connecting rod drives one end of the first support plate that is close to the mounting bracket to move in a direction away from the mounting bracket, and the second transmission connecting rod drives one end of the second support plate that is close to the mounting bracket to move in the direction away from the mounting bracket, so that the first rotating bracket and the second rotating bracket rotate to a first position, and in this case, the first support plate, the mounting bracket, and the second support plate form an accommodation space through enclosure. Along the width direction of the mounting bracket, the first support plate has a second end close to the mounting bracket, and the second support plate has a fourth end close to the mounting bracket; and in the process in which the first rotating bracket and the second rotating bracket rotate toward each other, the first transmission connecting rod drives the second end to move in the direction away from the mounting bracket, and the second transmission connecting rod drives the fourth end to move in the direction away from the mounting bracket.

In this solution, the first rotating bracket is connected to the first support plate, and the second rotating bracket is connected to the second support plate. Therefore, in a process of rotation and movement of the first rotating bracket, the first support plate can be driven to move and rotate, and in a process of rotation and movement of the second rotating bracket, the second support plate can be driven to move and rotate, and when the first rotating bracket and the second rotating bracket rotate toward each other, the second end of the first support plate and the fourth end of the second support plate can be driven away from each other, so that the foldable apparatus switches from the unfolded state to the folded state. In addition, when the foldable apparatus is in the folded state, the first support plate, the second support plate, the first transmission connecting rod, the second transmission connecting rod, and the mounting bracket form an accommodation space through enclosure, and the accommodation space is used to accommodate a folding part of the flexible screen. When the first rotating bracket drives the first support plate to rotate and move in the direction away from the mounting bracket, and the second rotating bracket drives the second support plate to rotate and move in the direction away from the mounting bracket, compared with a case in which the first rotating bracket drives only the first support plate to rotate, and the second rotating bracket drives only the second support plate to rotate, when the foldable apparatus is in the folded state, a distance between the first support plate and the mounting bracket and a distance between the second support plate and the mounting bracket are larger, so that a second length L2 of a contour of the accommodation space of the foldable apparatus can be increased, to further alleviate squeezing and pulling of the folding part by the foldable apparatus in the folding process, improve reliability and structural strength of the flexible screen, and lower a requirement on performance of a material of the flexible screen, thereby reducing costs. In addition, the accommodation space has sufficient space, so that the folding part of the flexible screen can be prevented from arching in the accommodation space, and flatness of the flexible screen in the folded state can be improved.

In a possible implementation, the first transmission connecting rod includes a first arcuate section, where the first arcuate section is rotatably connected to the mounting bracket, and the second transmission connecting rod includes a second arcuate section, where the second arcuate section is rotatably connected to the mounting bracket; and when the first rotating bracket and the second rotating bracket rotate toward each other to the first position, the first support plate, the first arcuate section, the mounting bracket, the second arcuate section, and the second support plate form the accommodation space through enclosure.

In this solution, when the foldable apparatus is in the folded state, the first support plate, the second support plate, the first arcuate section of the first transmission connecting rod, the second arcuate section of the second transmission connecting rod, and the mounting bracket form the accommodation space through enclosure. The accommodation space includes a third arcuate section, a third straight section, and a fourth straight section, and the third arcuate section is located between the third straight section and the fourth straight section. The first arcuate section of the first transmission connecting rod and the second arcuate section of the second transmission connecting rod form the third arcuate section of the accommodation space through enclosure, a first straight section of the first support plate forms the third straight section of the accommodation space, a second straight section of the second support plate forms the fourth straight section of the accommodation space, and the third arcuate section is used to accommodate a fifth part of the folding part. In this case, compared with a case in which the accommodation space is formed through enclosure by the first support plate and the second support plate that are both in a slabbed structure, the first arcuate section and the second arcuate section can alleviate squeezing on the folding part, so as to alleviate squeezing of the flexible screen by the foldable apparatus (the first transmission connecting rod and the second transmission connecting rod) in the folding process, and further improve reliability and structural strength of the flexible screen.

In a possible implementation, a first track and a first slider that are slidably fitted are provided on the first support plate and the first transmission connecting rod, and a second track and a second slider that are slidably fitted are provided on the second support plate and the second transmission connecting rod; and in a process in which the first rotating bracket and the second rotating bracket rotate toward each other, the first slider slides from an end of the first track that is away from the mounting bracket to an end of the first track that is close to the mounting bracket, and the second slider slides from an end of the second track that is away from the mounting bracket to an end of the second track that is close to the mounting bracket. The first track has a fifth end and a sixth end that are oppositely disposed, the second track has a seventh end and an eighth end that are oppositely disposed, and the sixth end and the eighth end are close to the mounting bracket; in the process in which the first rotating bracket and the second rotating bracket rotate toward each other, the first slider is slidable from the fifth end to the sixth end, and the second slider is slidable from the seventh end to the eighth end; and in a process in which the first rotating bracket and the second rotating bracket rotate away from each other, the first slider is slidable from the sixth end to the fifth end, and the second slider is slidable from the eighth end to the seventh end.

In this solution, because the first support plate is slidably connected to the first transmission connecting rod, and the second support plate is slidably connected to the second transmission connecting rod, in a process in which the first support plate and the second support plate rotate under driving of the first rotating bracket and the second rotating bracket, the first support plate is slidable and rotatable relative to the first transmission connecting rod, where a sliding track of the first support plate is the first track, and the second support plate is slidable and rotatable relative to the second transmission connecting rod, where a sliding track of the second support plate is the second track. Therefore, the first track is used to guide the relative sliding between the first support plate and the first transmission connecting rod, and the second track is used to guide the relative sliding between the second support plate and the second transmission connecting rod.

In a possible implementation, the first track is obliquely disposed or is of an arcuate structure, and the second track is obliquely disposed or is of an arcuate structure. In this case, the first track enables the first support plate to rotate relatively when sliding relative to the first transmission connecting rod, to prevent jamming between the first support plate and the first transmission connecting rod, and the second track enables the second support plate to rotate relatively when sliding relative to the second transmission connecting rod, to prevent jamming between the second support plate and the second transmission connecting rod.

In a possible implementation, the foldable apparatus further includes a first damping assembly connected to the mounting bracket, and the first damping assembly and the transmission assembly are arranged along a length direction of the mounting bracket; the first damping assembly includes a first rotating arm, a second rotating arm, at least two mutually meshed first gears, a first elastic member, and a cam disposed between the first elastic member and the first gears, where the cam has a first concave-convex surface; along the width direction of the mounting bracket, one end of the first rotating arm is slidably connected to the first rotating bracket and is slidable relative to the first rotating bracket, the other end is provided with a first tooth part, one end of the second rotating arm is slidably connected to the second rotating bracket and is slidable relative to the second rotating bracket, and the other end is provided with a second tooth part, both the first tooth part and the second tooth part mesh with the first gears, and along the length direction of the mounting bracket, a second concave-convex surface is disposed on a surface that is of the first gear and that is relative to the first concave-convex surface; the cam and the first gears are arranged along the length direction of the mounting bracket, and two ends of the first elastic member elastically abut against the mounting bracket and the cam respectively; and in a process in which the first rotating arm and the second rotating arm rotate, the first tooth part and the second tooth part are rotatable relative to the cam, so that the first concave-convex surface can mesh with the second concave-convex surface.

In this solution, when the foldable apparatus is in the unfolded state, the first damping assembly can provide a first damping force, and the first damping force can act on the first rotating bracket and the second rotating bracket, so as to provide resistance against rotation of the first rotating bracket and the second rotating bracket toward each other, so that the foldable apparatus can be maintained in the unfolded state, and when the foldable apparatus needs to switch from the unfolded state to the folded state, the user needs to apply, to the first rotating bracket and the second rotating bracket, a driving force capable of overcoming the first damping force, so that the first rotating bracket and the second rotating bracket can overcome the first damping force, thereby enabling the foldable apparatus to switch to the folded state. When the foldable apparatus is in the folded state, the first damping assembly can provide a second damping force, and the second damping force can act on the first rotating bracket and the second rotating bracket, so as to provide resistance against rotation of the first rotating bracket and the second rotating bracket away from each other, so that the foldable apparatus can be maintained in the folded state, and when the foldable apparatus needs to switch from the folded state to the unfolded state, the user needs to apply, to the first rotating bracket and the second rotating bracket, a driving force capable of overcoming the second damping force, so that the first rotating bracket and the second rotating bracket can overcome the second damping force, thereby enabling the foldable apparatus to switch to the unfolded state. In addition, in the folding or unfolding process of the foldable apparatus, the first damping assembly can further provide a third damping force, so as to provide a torque for the electronic device in the unfolding and folding process, and improve user experience in the unfolding and folding process.

In a possible implementation, the first damping assembly further includes a mounting member, the mounting member has a mounting space, and the cam and the first elastic member are located in the mounting space; the first gear is connected to a pin shaft extending along the length direction of the mounting bracket, the cam and the first elastic member are sleeved on the pin shaft, and two ends of the first elastic member elastically abut against the mounting member and the cam respectively; and a rotating hole is provided in the mounting member, the pin shaft can run through the rotating hole and protrude out of the mounting member, the first damping assembly further includes a clamping member, a clamping slot is provided in a part of the pin shaft that protrudes out of the mounting member, and the clamping member is clamped with the clamping slot.

In this solution, the mounting member has the mounting space, and the mounting space is used to mount the first elastic member and the cam. In addition, the clamping member can be disposed to clamp the first elastic member and the cam of the first damping assembly by using the clamping member, thereby preventing the first elastic member and the cam from falling out.

In a possible implementation, the foldable apparatus further includes a second damping assembly and a third damping assembly, the first transmission connecting rod has a first mounting cavity, the second damping assembly is mounted in the first mounting cavity, the second transmission connecting rod has a second mounting cavity, and the third damping assembly is mounted in the second mounting cavity; the second damping assembly includes a first moving member and a second elastic member, and along the length direction of the mounting bracket, the second elastic member is connected to the first moving member, and the first moving member elastically abuts to the first rotating bracket by using the second elastic member, the second elastic member is deformable along the length direction of the mounting bracket, and the first moving member is connected to the first transmission connecting rod by using a first roller; and the third damping assembly includes a second moving member and a third elastic member, and along the length direction of the mounting bracket, the third elastic member is connected to the second moving member, and the second moving member elastically abuts to the second rotating bracket by using the third elastic member, the third elastic member is deformable along the length direction of the mounting bracket, and the second moving member is connected to the second transmission connecting rod by using a second roller.

In this solution, when the foldable apparatus is in the unfolded state, the second damping assembly can provide a fourth damping force acting on the first rotating bracket, so as to provide resistance against rotation of the first rotating bracket, and the third damping assembly can provide a fifth damping force acting on the second rotating bracket, so as to provide resistance against rotation of the second rotating bracket, so that the first rotating bracket and the second rotating bracket can be maintained at a second position, that is, the foldable apparatus can be maintained in the unfolded state. When the foldable apparatus needs to switch from the unfolded state to the folded state, the user needs to apply, to the first rotating bracket, a driving force capable of overcoming the fourth damping force, and apply, to the second rotating bracket, a driving force capable of overcoming the fifth damping force, so that the first rotating bracket and the second rotating bracket can rotate toward each other, thereby enabling the foldable apparatus to switch from the unfolded state to the folded state.

When the foldable apparatus is in the folded state, the second damping assembly can provide a sixth damping force for the first rotating bracket, so as to provide resistance against rotation of the first rotating bracket, and the third damping assembly can provide a seventh damping force for the second rotating bracket, so as to provide resistance against rotation of the second rotating bracket, so that the first rotating bracket and the second rotating bracket can be maintained at a first position, that is, the foldable apparatus can be maintained in the folded state. When the foldable apparatus needs to switch from the folded state to the unfolded state, the user needs to apply, to the first rotating bracket, a driving force capable of overcoming the sixth damping force, and apply, to the second rotating bracket, a driving force capable of overcoming the seventh damping force, so that the first rotating bracket and the second rotating bracket can rotate away from each other, thereby enabling the foldable apparatus to switch from the folded state to the unfolded state. In addition, in the folding or unfolding process of the foldable apparatus, the second damping assembly can apply an eighth damping force to the first rotating bracket, and the third damping assembly can apply a ninth damping force to the second rotating bracket, so as to provide a torque for the electronic device in the unfolding and folding process, and improve user experience in the folding and unfolding process.

In a possible implementation, the first rotating bracket includes a first recessed part and a second recessed part spaced along the width direction of the mounting bracket; and the second rotating bracket includes a third recessed part and a fourth recessed part spaced along the width direction of the mounting bracket; in a process in which the first rotating bracket rotates, the first moving member is movable along a wall surface between the first recessed part and the second recessed part, and the first moving member can fit the first recessed part or the second recessed part; and in a process in which the second rotating bracket rotates, the second moving member is movable along a wall surface between the third recessed part and the fourth recessed part, and the second moving member can fit the third recessed part or the fourth recessed part. In this solution, when the first moving member fits the first recessed part or the second recessed part, the first rotating bracket can be limited to the first position or the second position, and stability and reliability of the first rotating bracket at the position are improved. Similarly, when the second moving member fits the third recessed part or the fourth recessed part, the second rotating bracket can be limited to the first position or the second position, and stability and reliability of the second rotating bracket at the position are improved.

In a possible implementation, a distance between the first recessed part and the mounting bracket is less than a distance between the second recessed part and the mounting bracket, and a distance between the third recessed part and the mounting bracket is less than a distance between the fourth recessed part and the mounting bracket.

In this solution, when the foldable apparatus is in the unfolded state, that is, when the first rotating bracket and the second rotating bracket are located at the second position, the first moving member of the second damping assembly fits the first recessed part, and the second moving member of the third damping assembly fits the third recessed part. When the foldable apparatus is in the folded state, that is, when the first rotating bracket and the second rotating bracket are located at the first position, the first moving member of the second damping assembly fits the second recessed part, and the second moving member of the third damping assembly fits the fourth recessed part. In addition, when the distance between the first recessed part and the mounting bracket is less than the distance between the second recessed part and the mounting bracket, and the distance between the third recessed part and the mounting bracket is less than the distance between the fourth recessed part and the mounting bracket, in the process in which the first rotating bracket and the second rotating bracket rotate toward each other, the first transmission connecting rod is movable relative to the first rotating bracket in the direction away from the mounting bracket, and the second transmission connecting rod is movable relative to the second rotating bracket in the direction away from the mounting bracket, to prevent jamming between the first transmission connecting rod and the first rotating bracket, and prevent jamming between the second transmission connecting rod and the second rotating bracket.

In a possible implementation, the first moving member is slidable along a wall surface between the first recessed part and the second recessed part, and the second moving member is slidable along a wall surface between the third recessed part and the fourth recessed part. In this solution, in a process of relative movement of the first rotating bracket and the first transmission connecting rod, the first moving member slides along the first rotating bracket, and in a process of relative movement of the second rotating bracket and the second transmission connecting rod, the second moving member slides along the second rotating bracket.

In a possible implementation, the first moving member is rollable along the wall surface between the first recessed part and the second recessed part, and the second moving member is rollable along the wall surface between the third recessed part and the fourth recessed part. In this solution, in the process of relative movement of the first rotating bracket and the first transmission connecting rod, the first moving member rolls along the first rotating bracket, and in the process of relative movement of the second rotating bracket and the second transmission connecting rod, the second moving member rolls along the second rotating bracket, so as to reduce wear between the first moving member and the first rotating bracket and wear between the second moving member and the second rotating bracket.

In a possible implementation, a first through hole is provided in the first mounting cavity, the first roller is rotatable in the first through hole, and the first roller is movable in the first through hole along the length direction of the mounting bracket; and a second through hole is provided in the second mounting cavity, the second roller is rotatable in the second through hole, and the second roller is movable in the second through hole along the length direction of the mounting bracket.

In this solution, the first through hole is provided in the first transmission connecting rod, and a size of the first through hole along the length direction of the mounting bracket is greater than a size of the first through hole along the width direction of the mounting bracket, that is, the first through hole is an elongated hole. The first roller of the first moving member is rotatable in the first through hole. In addition, the first roller is further movable along the length direction of the mounting bracket, and can implement movement of two first moving members along the length direction of the mounting bracket, to change a deformation amount of the second elastic member, thereby implementing movement of the first moving member relative to the first rotating bracket. Similarly, the second through hole is provided in the second transmission connecting rod, and a size of the second through hole along the length direction of the mounting bracket is greater than a size of the second through hole along the width direction of the mounting bracket, that is, the second through hole is an elongated hole. The second roller of the second moving member is rotatable in the second through hole. In addition, the second roller is further movable along the length direction of the mounting bracket, and can implement movement of two second moving members along the length direction of the mounting bracket, to change a deformation amount of the third elastic member, thereby implementing movement of the second moving member relative to the second rotating bracket.

In a possible implementation, the transmission assembly further includes a synchronous gear set, the synchronous gear set includes a second gear, a third gear, a fourth gear, and a fifth gear arranged along the width direction of the mounting bracket, the fourth gear meshes with the second gear, the fifth gear meshes with the third gear, and the fourth gear meshes with the fifth gear; and the second gear is connected to the first transmission connecting rod, and the third gear is connected to the second transmission connecting rod.

In this solution, the second gear and the first transmission connecting rod rotate around a same rotating shaft, and the third gear and the second transmission connecting rod rotate around a same rotating shaft, so as to implement synchronous rotation of the second gear and the first transmission connecting rod and synchronous rotation of the third gear and the second transmission connecting rod, and the first transmission connecting rod is connected to the first rotating bracket, and the second transmission connecting rod is connected to the second rotating bracket, to further implement synchronous rotation of the first rotating bracket and the second rotating bracket. In addition, by adding the fourth gear and the fifth gear that mesh with the second gear and the third gear to the synchronous gear set, diameters of the second gear and the third gear can be further reduced when the second gear meshes with the third gear, so as to reduce a space occupied by the synchronous gear set along the width direction and the thickness direction of the mounting bracket, thereby helping implement miniaturization and a light and thin design of the foldable apparatus.

A second aspect of this disclosure provides an electronic device. The electronic device includes a first housing, a second housing, a flexible screen, and the foldable apparatus in the first aspect. The first housing and the second housing are located on two sides of the foldable apparatus. The first housing is fastened to the first rotating bracket located on a same side, and the second housing is fastened to the second rotating bracket located on a same side. The flexible screen is covered on the first housing, the second housing, and the foldable apparatus, and is fastened to the first housing and the second housing.

In this solution, under driving of the foldable apparatus, the electronic device can be enabled to be in an unfolded state or a folded state, and in a process in which the foldable apparatus switches from the unfolded state to the folded state, because the first rotating bracket and the second rotating bracket that are connected to the first housing and the second housing are movable in a direction away from the mounting bracket when rotating toward each other, an accommodation space of the foldable apparatus in the folded state can be increased, and squeezing of the flexible screen by the foldable apparatus when the electronic device is in the folded state can be reduced, thereby improving reliability of the flexible screen. In addition, the accommodation space has sufficient space, the flexible screen can be further prevented from arching in the accommodation space, and flatness of the flexible screen in the folded state can be improved.

In a possible implementation, when the foldable apparatus includes a support plate assembly, the flexible screen is further fastened to at least one part of the support plate assembly.

In a possible implementation, the flexible screen includes a third region, a fourth region, and a fifth region, and the fifth region is located between the third region and the fourth region; and the support plate assembly includes a first support plate and a second support plate that are disposed along a width direction of the mounting bracket, the third region is not fastened to the first support plate, the fourth region is not fastened to the second support plate, and the fifth region is not fastened to the foldable apparatus. In this solution, when the electronic device is in a folded state, the third region, the fourth region, and the fifth region form a water drop-shaped structure after being folded, that is, the folding part is in a water drop shape, and the fifth region is semi-circular arcuate after being folded. In addition, because the third region, the fourth region, and the fifth region of the flexible screen are not fastened to the foldable apparatus, the foldable apparatus can be prevented from stretching the flexible screen in a folding or unfolding process, and reliability of the flexible screen is improved.

In a possible implementation, the flexible screen includes a third region, a fourth region, and a fifth region, and the fifth region is located between the third region and the fourth region; and the support plate assembly includes a first support plate and a second support plate that are disposed along a width direction of the mounting bracket, the third region is fastened to the first support plate, the fourth region is fastened to the second support plate, and the fifth region is not fastened to the support apparatus. In this solution, when the electronic device is in a folded state, the fifth region forms a semi-circular arc shape through enclosure, and when the third region is fastened to the first support plate, and the fourth region is fastened to the second support plate, in a folding or unfolding process of the electronic device, the third region can be enabled to move with the first support plate, and the fourth region can be enabled to move with the second support plate, that is, there is no relative movement between the third region and the first support plate, so that flatness of the folding part of the flexible screen in the unfolding and folding process is improved, and a failure risk of the flexible screen is reduced.

It should be understood that, the foregoing general descriptions and the following detailed descriptions are merely examples, and are not intended to limiting this disclosure.

REFERENCE NUMERALS

Figure 1:
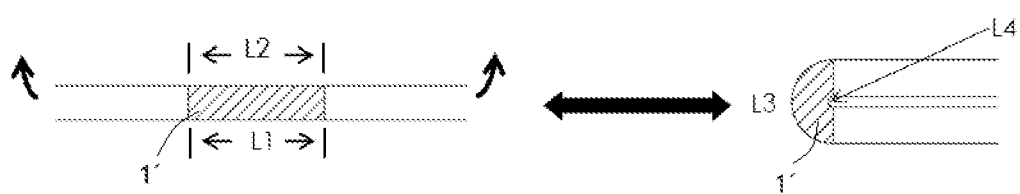
FIG. 1 is a schematic diagram of unfolding and folding of a part of a flexible screen in a conventional technology in a specific embodiment.

1'—flexible screen;
1—foldable apparatus, 11—rotating bracket assembly, 111—first rotating bracket, 111a—first recessed part, 111b—second recessed part, 111c—third convex part; 112—second rotating bracket, 112a—third recessed part, 112b—fourth recessed part, 112c—fourth convex part; 113—third track, 114—third rotating bracket, 114a—first sliding space, 115—fourth rotating bracket, 115a—second sliding space;
12—swing arm assembly, 121—first swing arm, 121a—ninth rotating shaft, 122—second swing arm, 122a—tenth rotating shaft;
13—push group, 131—first push member, 132—second push member, 133—first limiting member, 133a—first convex part, 134—second limiting member, 134a—second convex part;
14—transmission group, 141—first transmission connecting rod, 141a—first rocker, 141b—first mounting cavity, 141c—first through hole, 141d—first slider, 141e—first crank, 141f—first arcuate section, 141g—first straight section, 142—second transmission connecting rod, 142a—second rocker, 142b—second mounting cavity, 142c—second through hole, 142d—second slider, 142e—second crank, 142f—second arcuate section, 142g—second straight section, 143—third slider;
151—first rotating shaft, 152—second rotating shaft, 153—third rotating shaft, 154—fourth rotating shaft, 155—fifth rotating shaft, 156—sixth rotating shaft, 157—eighth rotating shaft, 158—eleventh rotating shaft, 159—twelfth rotating shaft;
16—synchronous gear set, 161—second gear, 162—third gear, 163—fourth gear, 164—fifth gear;
17—support plate assembly, 171—first support plate, 1711—first body part, 1712—first extension part, 1713—first track, 1713a—fifth end, 1713b—sixth end, 1714—first end, 1715—first arcuate groove, 1716—second end, 172—second support plate, 1721—second body part, 1722—second extension part, 1723—second track, 1723b—eighth end; 1724—third end, 1726—fourth end, 173—third support plate, 174—accommodation space, 174a—third arcuate section, 174b—third straight section, 174c—fourth straight section;
18—mounting bracket, 181—rotating shaft cover, 181a—accommodation cavity, 182—fixed block, 182a—chute;
191—first damping assembly, 1911—cam, 1911a—first concave-convex surface, 1912—first elastic member, 1913—first gear, 1913a—second concave-convex surface, 1914—first rotating arm, 1914a—first tooth part, 1914b—thirteenth rotating shaft, 1915—second rotating arm, 1915a—second tooth part, 1915b—fourteenth rotating shaft, 1916—mounting member, 1916a—mounting space, 1916b—press plate, 1917—clamping member, 1918—pin shaft, 1918a—clamping slot;
192—second damping assembly, 1921—first moving member, 1921a—first roller, 1922—second elastic member;
193—third damping assembly;
2—flexible screen, 21—first region, 22—second region, 23—third region, 24—fourth region, 25—fifth region, 26—folding part; and
31—first housing, 311—first groove, 32—second housing, 321—second groove.

The accompanying drawings herein are incorporated into this specification and constitute a part of this specification, show embodiments that comply with this disclosure, and are used together with this specification to explain principles of this disclosure.

DESCRIPTION OF EMBODIMENTS

To better understand the technical solutions of this disclosure, the following describes embodiments of this disclosure in detail with reference to the accompanying drawings.

FIG. 1 shows a partial structure of a flexible screen 1' in a conventional technology, and the partial structure is a part that is of the flexible screen 1' and that fits a folding component. When a foldable electronic device is in an unfolded state, a length of an outer side of the flexible screen 1' of the part is L1, and a length of an inner side of the flexible screen 1' of the part is L2. In this case, L1=L2, that is, in the unfolded state, lengths of all parts of the flexible screen 1' are the same, and the flexible screen 1' is not stretched and compressed. After the flexible screen 1' is folded along an arrow shown in FIG. 1 under driving of a folding component, the length L2 of the inner side of the flexible screen 1' changes to L4, and the length L1 of the outer side changes to L3, where L4<L2, and L3>L1. That is, in a folding process, the inner side of the flexible screen 1' is compressed and the outer side is stretched. A length of an intermediate layer of the flexible screen 1' along a thickness direction changes in the folding process, resulting in a risk of damage to the flexible screen 1' during folding for a plurality of times due to stretching and compression for a plurality of times.

To resolve the technical problem, an embodiment of this disclosure provides an electronic device. An embodiment of this disclosure provides an electronic device shown in FIG. 2. The electronic device includes any device with a foldable screen function, for example, a mobile phone, a tablet computer, a personal digital assistant (PDA), a notebook computer, a vehicle-mounted computer, a foldable display device, a foldable display, or a wearable device. A specific form of the electronic device is not specially limited in embodiments of this disclosure. For ease of description, the following uses an example in which the electronic device is a mobile phone for description. The following describes the electronic device in this disclosure by using specific embodiments.

Figure 2:
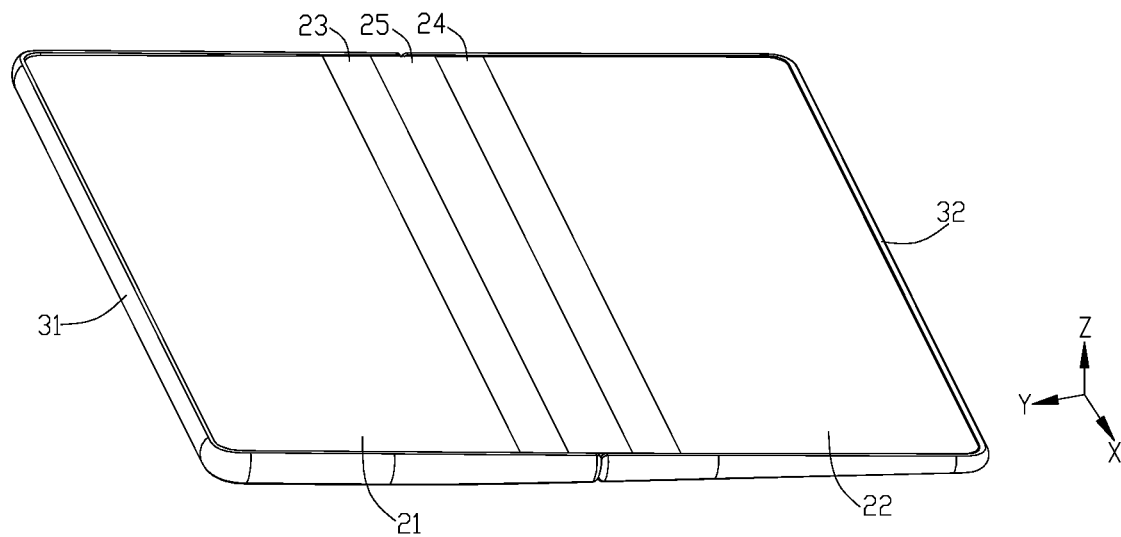
FIG. 2 is a schematic diagram of a structure of an electronic device in an unfolded state according to an embodiment of this disclosure.
Figure 3:
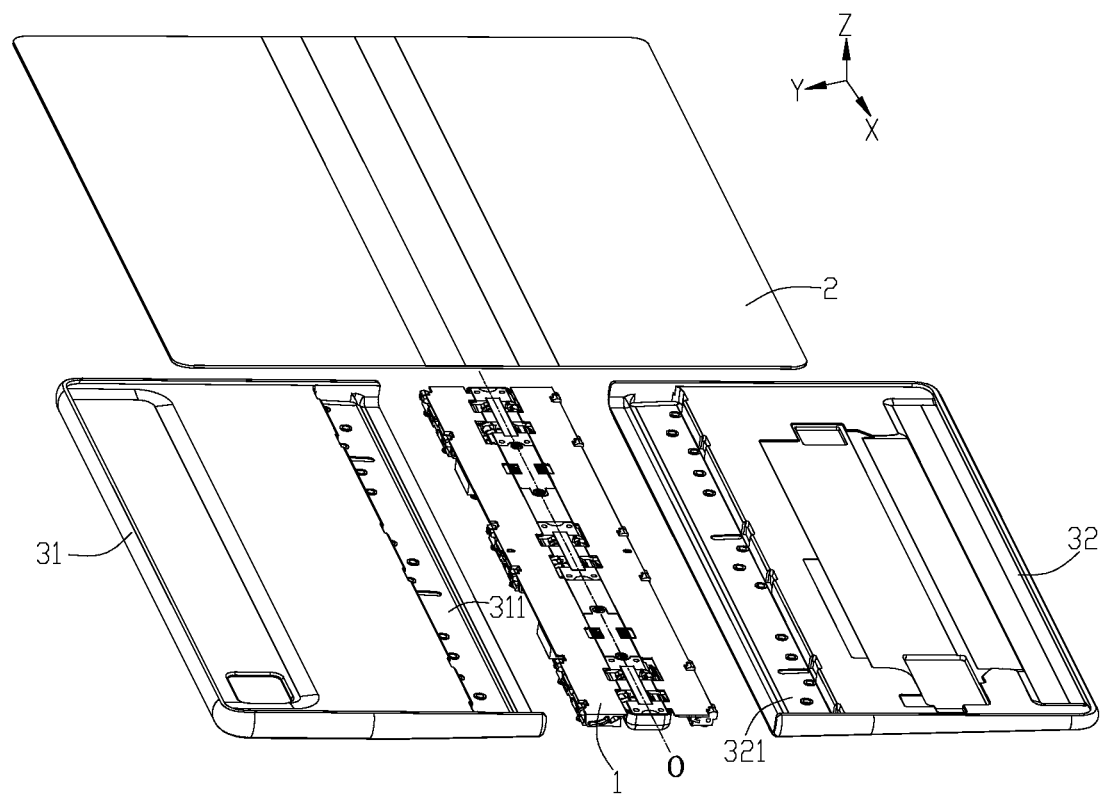
FIG. 3 is an exploded view of FIG. 2.

As shown in FIG. 2 and FIG. 3, the electronic device includes a foldable apparatus 1, a screen, a first housing 31, and a second housing 32. The screen may be a flexible screen 2, and the flexible screen 2 is configured to display an image, a video, and the like. A specific type of the flexible screen 2 in this disclosure is not limited. For example, the flexible screen 2 may be an active-matrix organic light-emitting diode or an active-matrix organic light-emitting diode (AMOLED) display. As a self-luminescent display, the AMOLED display does not need to be provided with a back light module (BLM). Therefore, when a substrate in the AMOLED display is made of a flexible resin material, for example, polyethylene terephthalate (PET), the AMOLED display can have bendability. For example, the flexible screen 2 may alternatively be an organic light-emitting diode (OLED) display, a mini light-emitting diode display, a micro light-emitting diode display, a micro organic light-emitting diode display, a quantum dot light-emitting diode (QLED) display, or the like.

Figure 4:
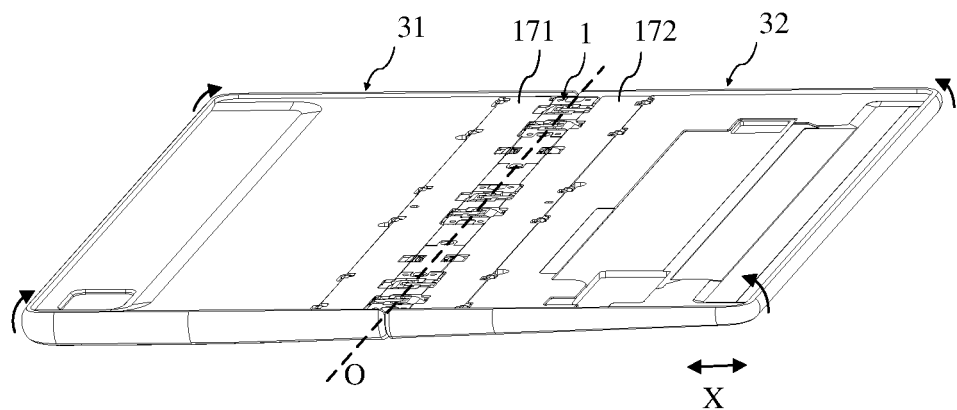
FIG. 4 is a schematic diagram of a structure of FIG. 2, where a flexible screen is removed.

As shown in FIG. 3 and FIG. 4, the first housing 31 and the second housing 32 are spaced apart, and the first housing 31 and the second housing 32 may alternatively be a middle frame structure of the electronic device. The first housing 31 and the second housing 32 are configured to mount components such as a battery, a circuit board, a camera, an earphone, an earpiece, a button, and a battery of the electronic device, and the first housing 31 and the second housing 32 are further configured to carry the flexible screen 2. That is, the flexible screen 2 is fastened (for example, attached) to the first housing 31 and the second housing 32, so that the flexible screen 2 is kept flat to the greatest extent in a use process, and a non-display surface of the flexible screen 2 is protected. The foldable apparatus 1 is located between the first housing 31 and the second housing 32, and is connected to the first housing 31 and the second housing 32. Specifically, as shown in FIG. 3, the first housing 31 is provided with a first groove 311, and the second housing 32 is provided with a second groove 321. One part of the foldable apparatus 1 is mounted in the first groove 311, and the other part is mounted in the second groove 321. In some possible implementations, the foldable apparatus 1 may be connected to the first groove 311 and the second groove 321 by using a screw or in another manner.

Figure 5:
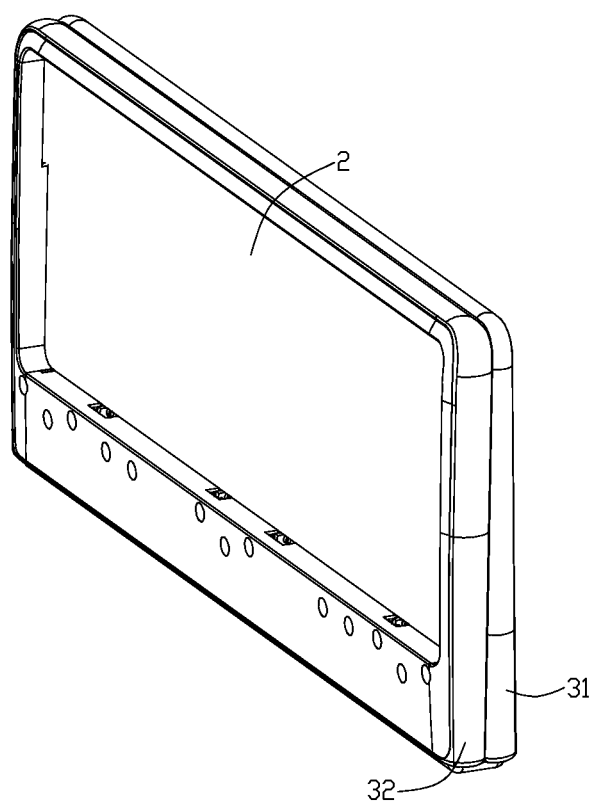
FIG. 5 is a schematic diagram of a structure of an electronic device in a folded state according to an embodiment of this disclosure.

In a use process of the electronic device, the foldable apparatus 1 includes at least an unfolded state shown in FIG. 4 and a folded state shown in FIG. 5. In the unfolded state, the first housing 31 and the second housing 32 are approximately located in a same plane, so that the flexible screen 2 is approximately a plane. In this case, the flexible screen 2 is exposed, a user can operate the flexible screen 2, and the flexible screen 2 can display information such as an image or a video, so as to implement large-screen display and improve viewing experience of the user. In addition, when the foldable apparatus 1 is in the unfolded state, the first housing 31 and the second housing 32 are rotatable along directions shown by arrows in the figure, so as to drive the foldable apparatus 1 to be foldable along a center line O. In a folding process, one end of the first housing 31 and one end of the second housing 32 that are away from the foldable apparatus 1 approach each other, so that the electronic device is in the folded state shown in FIG. 5. In addition, the electronic device in this embodiment is a flexible screen infolding structure. In the folded state, the flexible screen 2 is located in a space formed by the first housing 31 and the second housing 32 through enclosure after the first housing 31 and the second housing 32 are folded. In this case, the flexible screen 2 is not exposed, the user cannot operate the flexible screen 2, and the electronic device is easy to store and carry. In addition, when the foldable apparatus 1 is in the folded state, the first housing 31 and the second housing 32 are rotatable (rotation directions are opposite to the arrow directions shown in FIG. 4), so as to drive the foldable apparatus 1 to be unfolded along the center line O, so that the electronic device is in the unfolded state shown in FIG. 4. Therefore, in this disclosure, the foldable apparatus 1 is configured to implement folding and unfolding of the electronic device.

A person skilled in the art may understand that, the structure shown in this embodiment of this disclosure does not constitute a specific limitation on the electronic device. In some other possible implementations of this disclosure, the electronic device may include more or fewer components than those shown in the figure, or combine some components, or split some components, or have different component arrangements.

Figure 6:
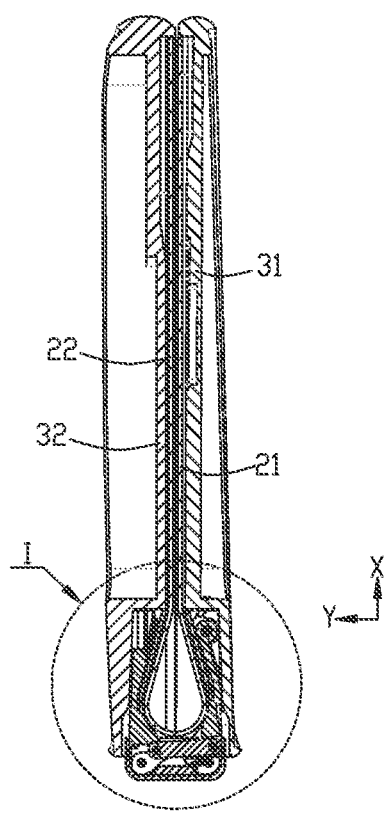
FIG. 6 is a cutaway drawing of FIG. 5.
Figure 7:
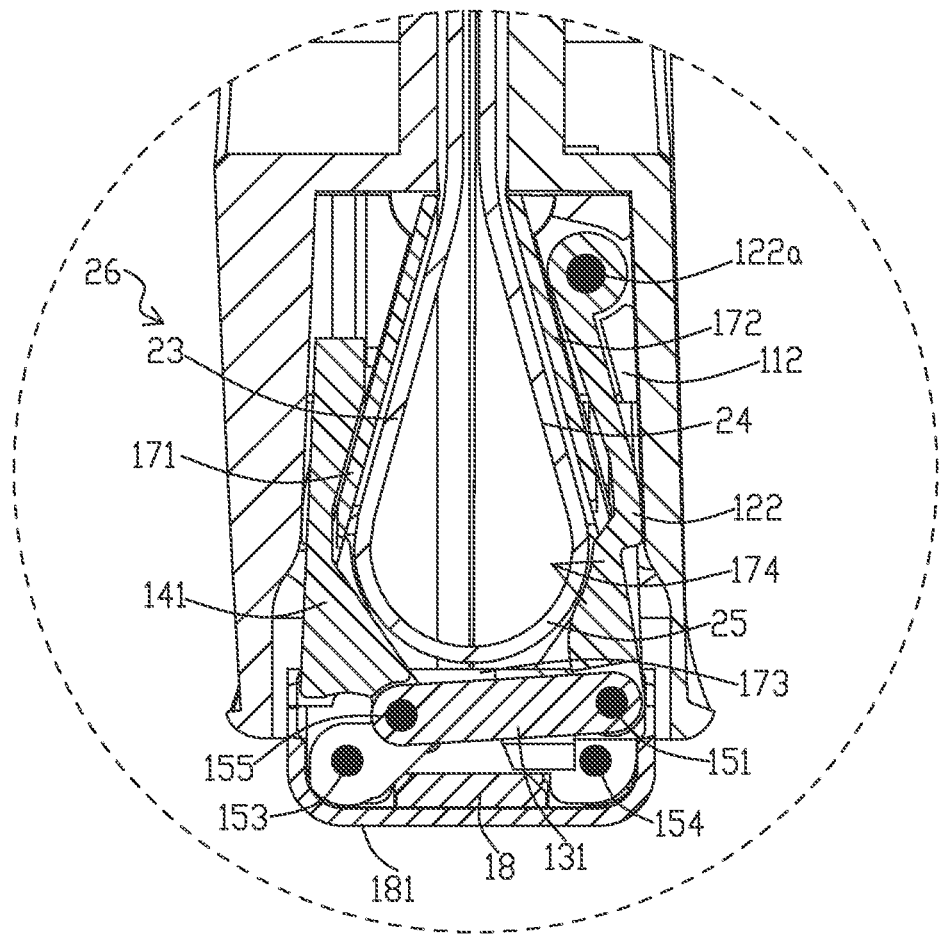
FIG. 7 is a partial enlarged view of part I in FIG. 6.
Figure 8:
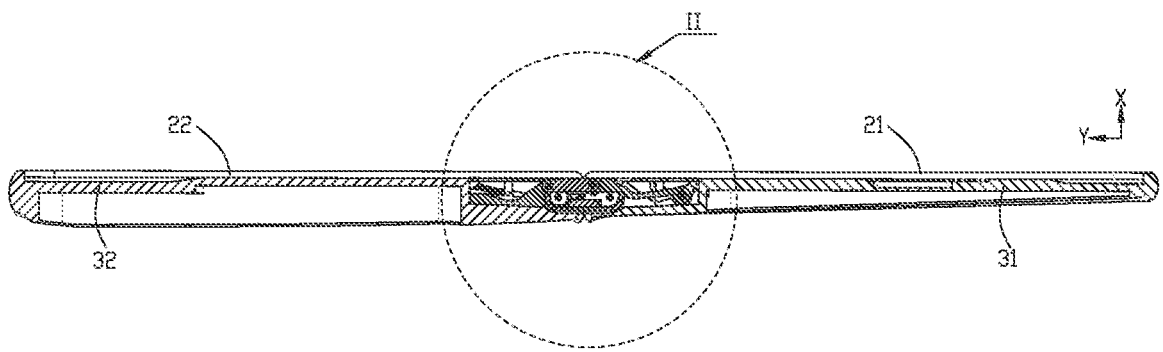
FIG. 8 is a cutaway drawing of FIG. 4.

As shown in FIG. 6 and FIG. 7, the foldable apparatus 1 is folded to form an accommodation space 174, a folding part 26 of the flexible screen 2 is accommodated in the accommodation space 174, and a remaining part is accommodated in the first housing 31 and the second housing 32. To improve a service life and reliability of the flexible screen 2, pulling and squeezing of the folding part 26 in the unfolding and folding process need to be alleviated or eliminated, that is, the folding part 26 needs to be made free from pulling by an external force in the unfolding process and free from squeezing by an external force in the folding process.

Figure 9:
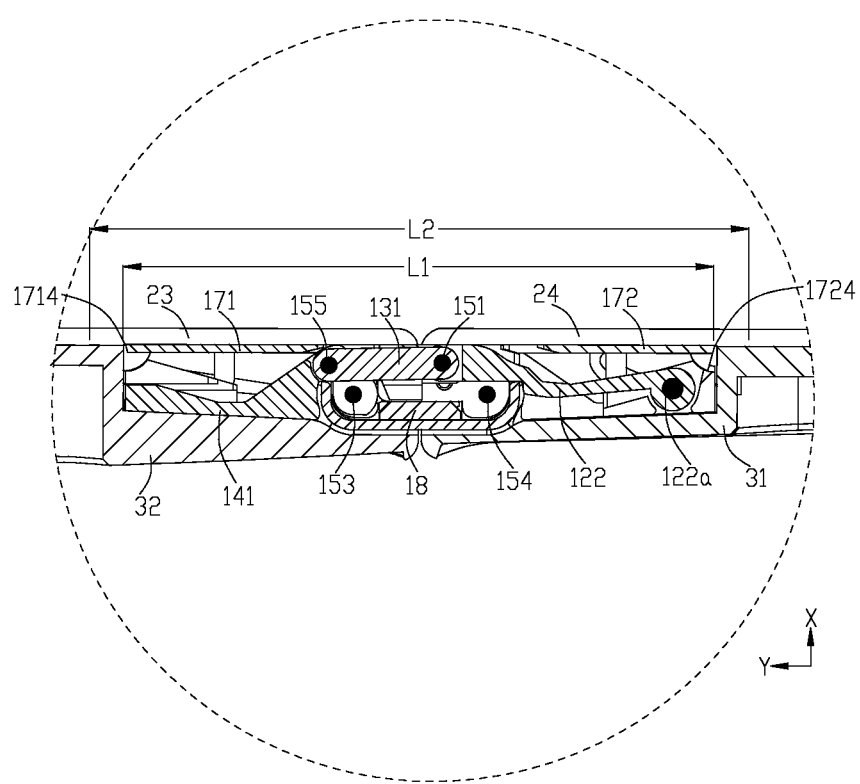
FIG. 9 is a partial enlarged view of part II in FIG. 8.
Figure 10:
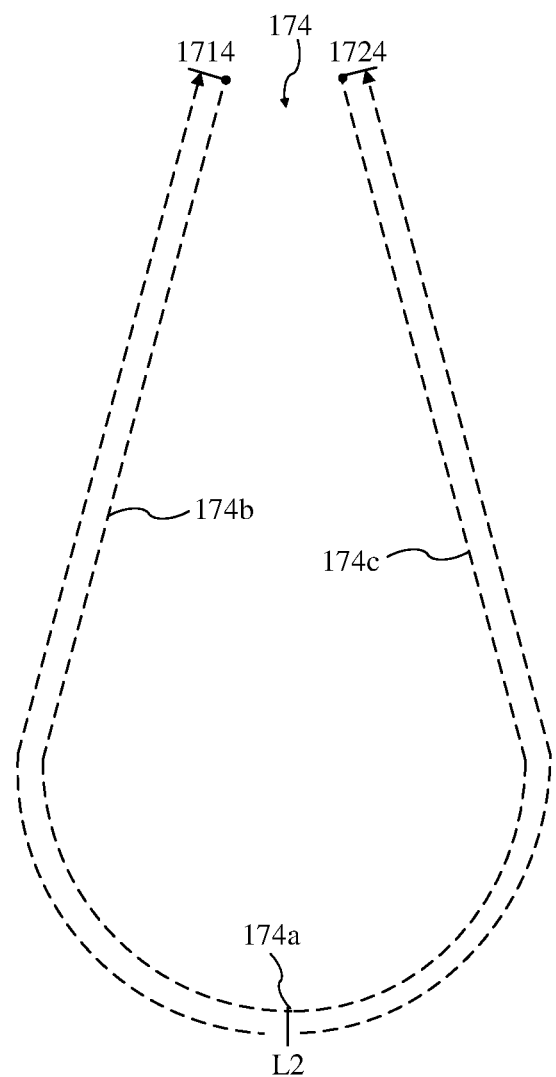
FIG. 10 is a schematic diagram of a shape of an accommodation space in FIG. 9.

Specifically, as shown in FIG. 9, when the foldable apparatus 1 is in the unfolded state, a part that is of the foldable apparatus 1 and that fits the folding part 26 of the flexible screen 2 has a first length L1 along a width direction Y of the mounting bracket 18. As shown in FIG. 10, when the foldable apparatus 1 is in the folded state, the foldable apparatus 1 forms the accommodation space 174 for accommodating the folding part 26 of the flexible screen 2, and a contour length (perimeter) of the accommodation space 174 is a second length L2. As shown in FIG. 9, the first length L1 and the second length L2 meet L1<L2. Therefore, in a process in which the foldable apparatus 1 switches from the unfolded state shown in FIG. 9 to the folded state shown in FIG. 10, the contour length of the part that is of the foldable apparatus 1 and that fits the folding part 26 increases, so that the foldable apparatus 1 can provide sufficient space to accommodate the folding part 26 of the flexible screen 2 in the folded state, to alleviate pulling and squeezing of the folding part 26 in the folding process of the foldable apparatus 1, thereby reducing a risk of a functional failure of the flexible screen 2.

Figure 11:
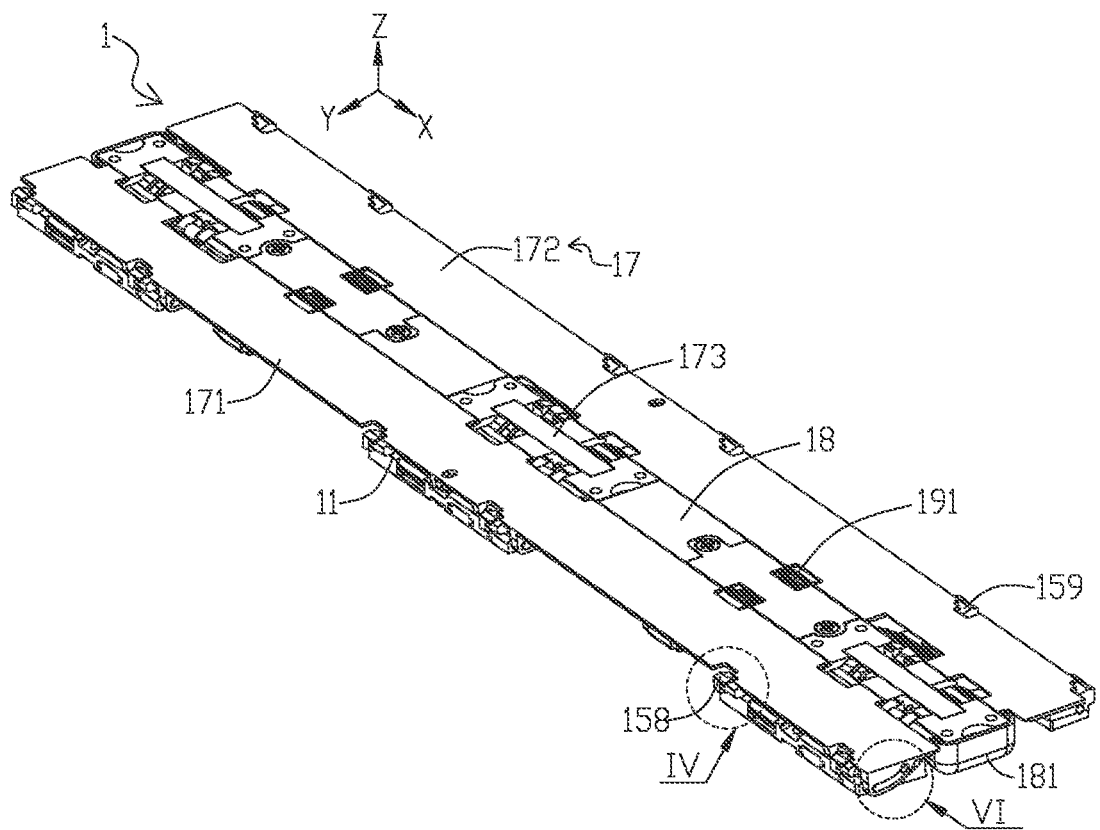
FIG. 11 is a schematic diagram of a structure of the foldable apparatus in FIG. 3 in a first specific embodiment, where the foldable apparatus is in an unfolded state.
Figure 12:
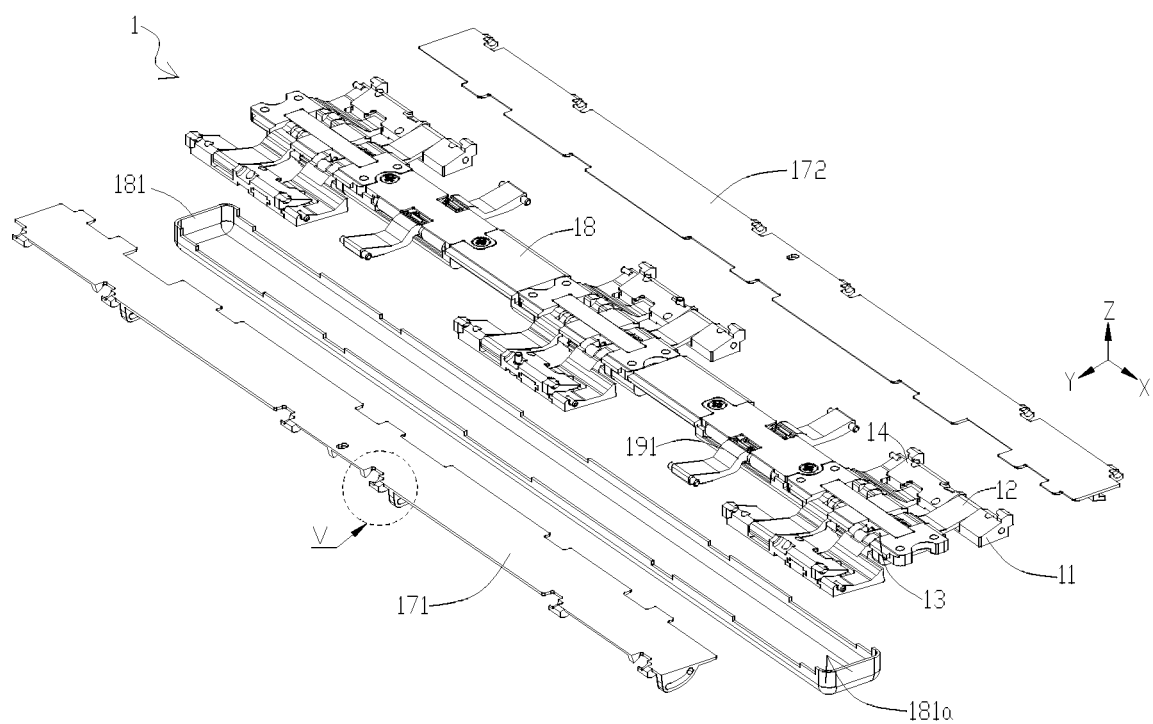
FIG. 12 is an exploded view of FIG. 11.

In this disclosure, specifically, the foldable apparatus 1 is used to prevent the folding part 26 from being squeezed or stretched by an external force in the folding process. Specifically, as shown in FIG. 11 and FIG. 12, the foldable apparatus 1 includes the mounting bracket 18, the mounting bracket 18 is fixed relative to the first housing 31 and the second housing 32 (refer to FIG. 3) of the electronic device, and in the folding and unfolding process of the foldable apparatus 1, the center line O may be a center line of the mounting bracket 18, and an extension direction of the center line O is defined as a length direction X of the mounting bracket 18. In the electronic device in the unfolded state (refer to FIG. 3), an arrangement direction of the first housing 31 and the second housing 32 is defined as the width direction Y of the mounting bracket 18, and a direction perpendicular to both the length direction X and the width direction Y of the mounting bracket 18 is defined as a height direction Z of the mounting bracket 18.

Figure 13:
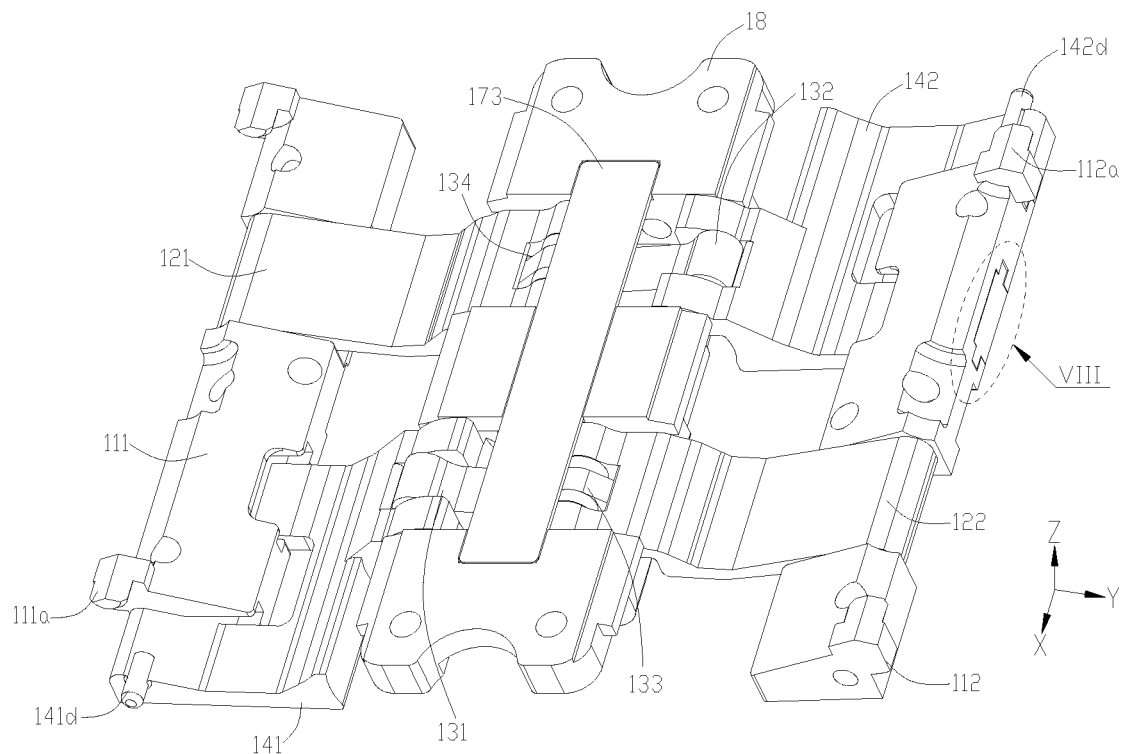
FIG. 13 is a schematic diagram of fitting between a rotating bracket assembly, a mounting bracket, and a transmission assembly in FIG. 11 in the first specific embodiment.
Figure 14:
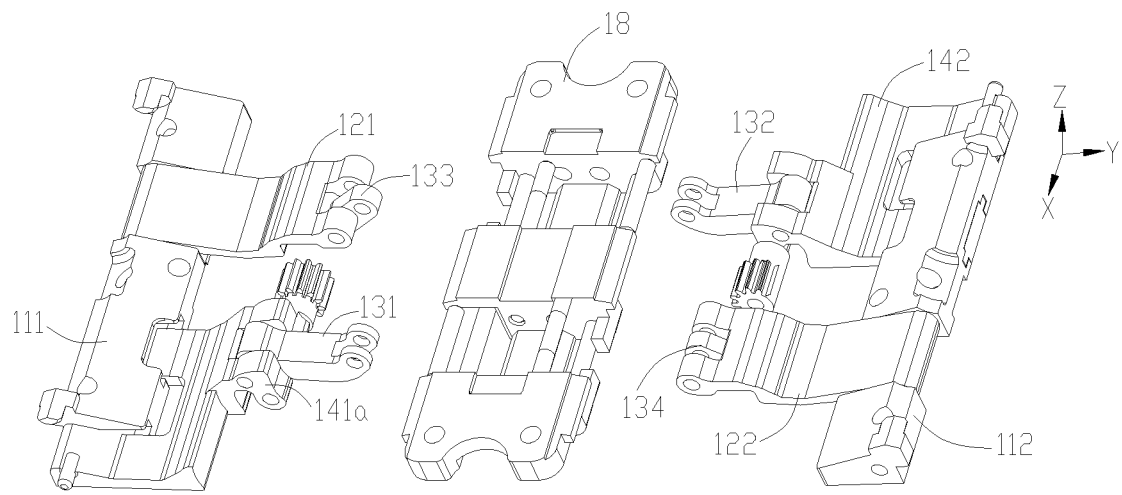
FIG. 14 is a partial exploded view of FIG. 13.
Figure 15:
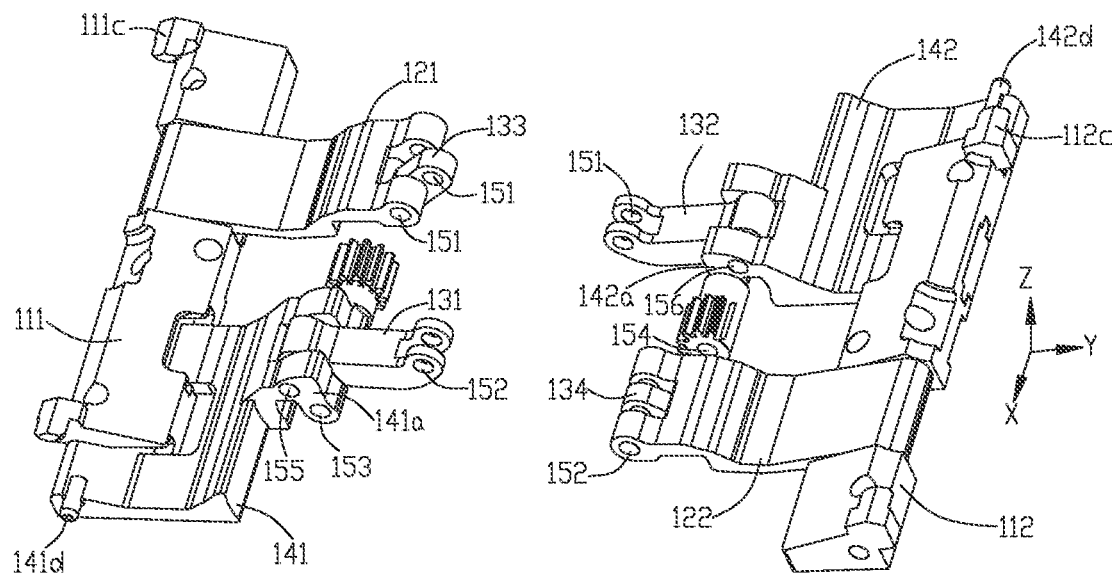
FIG. 15 is a schematic diagram of a structure of the rotating bracket assembly and the transmission assembly in FIG. 14 in the first specific embodiment.

In addition, as shown in FIG. 12, the foldable apparatus 1 further includes a rotating bracket assembly 11. As shown in FIG. 13 to FIG. 15, the rotating bracket assembly 11 includes a first rotating bracket 111 and a second rotating bracket 112 arranged on two sides of the mounting bracket 18 along the width direction Y of the mounting bracket 18. As shown in FIG. 15, the first rotating bracket 111 is rotatably connected to the mounting bracket 18 by using a first rotating shaft 151, and the second rotating bracket 112 is rotatably connected to the mounting bracket 18 by using a second rotating shaft 152. The first rotating bracket 111 is rotatable around the first rotating shaft 151 relative to the mounting bracket 18. The second rotating bracket 112 is rotatable around the second rotating shaft 152 relative to the mounting bracket 18. A position indicated by a reference numeral 151 shown in FIG. 15 indicates a position of an axis of the first rotating shaft 151, and a position indicated by a reference numeral 152 indicates a position of an axis of the second rotating shaft 152.

In this embodiment, when the first rotating bracket 111 and the second rotating bracket 112 are both rotatably connected to the mounting bracket 18, the first rotating bracket 111 and the second rotating bracket 112 can rotate toward each other, and can also rotate away from each other. In addition, in a process in which the first rotating bracket 111 and the second rotating bracket 112 rotate toward each other, the foldable apparatus 1 switches from the unfolded state shown in FIG. 4 to the folded state shown in FIG. 5, and in a process in which the first rotating bracket 111 and the second rotating bracket 112 rotate away from each other, the foldable apparatus 1 switches from the folded state shown in FIG. 5 to the unfolded state shown in FIG. 4.

Specifically, as shown in FIG. 15, in a folding process of the foldable apparatus 1, that is, when the first rotating bracket 111 and the second rotating bracket 112 rotate toward each other, the first rotating shaft 151 and the second rotating shaft 152 move in a direction away from the mounting bracket 18 along the width direction Y of the mounting bracket 18. Therefore, in the process in which the foldable apparatus 1 switches from the unfolded state to the folded state, when rotating toward each other, the first rotating bracket 111 and the second rotating bracket 112 are further movable in a direction away from the mounting bracket 18 under driving of the first rotating shaft 151 and the second rotating shaft 152. Compared with a case in which the first rotating shaft 151 and the second rotating shaft 152 do not move, the accommodation space 174 of the foldable apparatus 1 when the foldable apparatus 1 is in the folded state can be increased. That is, L1<L2 can be facilitated, to alleviate squeezing and stretching of the folding part 26 in the folding process of the foldable apparatus 1, improve reliability and structural strength of the flexible screen 2, lower a requirement on performance of a material of the flexible screen 2, and reduce costs.

Specifically, to enable the first rotating shaft 151 and the second rotating shaft 152 to move away from the mounting bracket 18 along the width direction Y of the mounting bracket 18 in a process in which the first rotating bracket 111 and the second rotating bracket 112 rotate toward each other, the foldable apparatus 1 may further include a transmission assembly and a swing arm assembly, configured to transfer movement of the first rotating bracket 111 and the second rotating bracket 112, to implement linkage of the first rotating bracket 111 and the second rotating bracket 112, and implement movement of the first rotating shaft 151 and the second rotating shaft 152 along the width direction Y.

Specific structures of the transmission assembly and the swing arm assembly are described in detail below.

Figure 21:
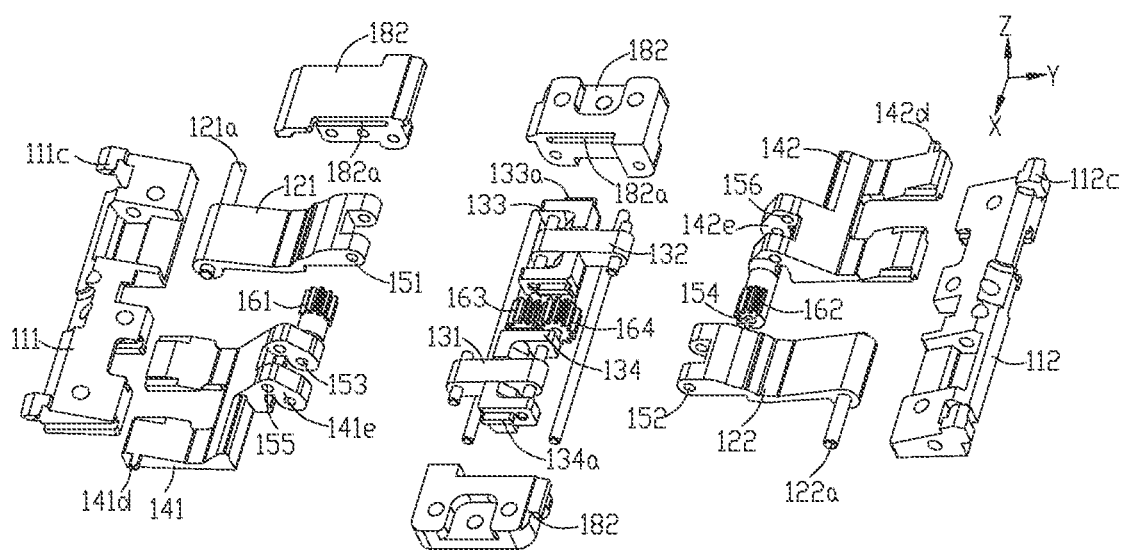
FIG. 21 is an exploded view of FIG. 20.
Figure 23:
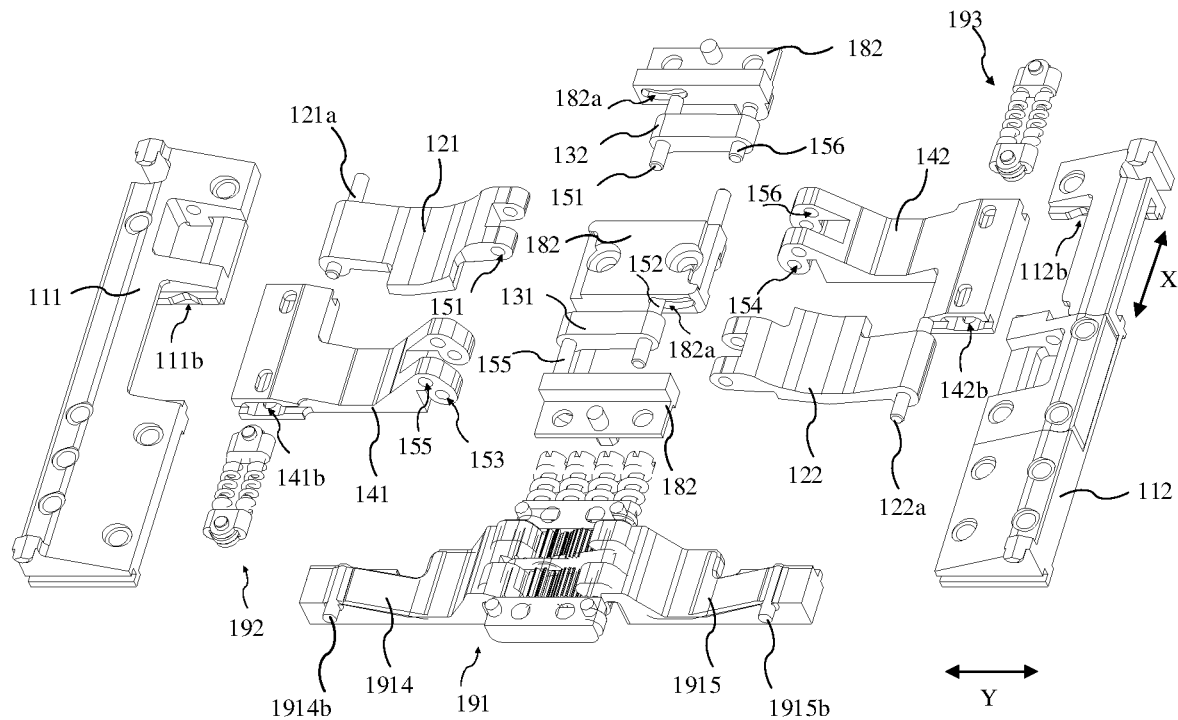
FIG. 23 is an exploded view of FIG. 22.

As shown in FIG. 12, FIG. 13, FIG. 14, FIG. 21, and FIG. 23, the swing arm assembly 12 includes a first swing arm 121 and a second swing arm 122 that are located on two sides of the mounting bracket 18 along the width direction Y of the mounting bracket 18. One end of the first swing arm 121 is slidably connected to the first rotating bracket 111 and is rotatable relative to the first rotating bracket 111, and the other end is rotatably connected to the mounting bracket 18 by using the first rotating shaft 151. One end of the second swing arm 122 is slidably connected to the second rotating bracket 112 and is rotatable relative to the second rotating bracket 112, and the other end is rotatably connected to the mounting bracket 18 by using the second rotating shaft 152. As shown in FIG. 21 and FIG. 23, the first swing arm 121 is rotatably connected to the first rotating bracket 111 by using a ninth rotating shaft 121a, and the second swing arm 122 is rotatably connected to the second rotating bracket 112 by using a tenth rotating shaft 122a. The ninth rotating shaft 121a is a cylindrical protrusion disposed on the first swing arm 121, and the tenth rotating shaft 122a is a cylindrical protrusion disposed on the second swing arm 122.

The transmission assembly includes a transmission group 14 and a push group 13. As shown in FIG. 13 to FIG. 15 and FIG. 20 to FIG. 23, the transmission group 14 includes a first transmission connecting rod 141 and a second transmission connecting rod 142 that are located on two sides of the mounting bracket 18 along the width direction Y of the mounting bracket 18. The first transmission connecting rod 141 is slidably connected to the first rotating bracket 111 and is rotatably connected to the mounting bracket 18, and the second transmission connecting rod 142 is slidably connected to the second rotating bracket 112 and is rotatably connected to the mounting bracket 18. As shown in FIG. 15, FIG. 16, FIG. 21 and FIG. 23, the first transmission connecting rod 141 is rotatably connected to the mounting bracket 18 by using a third rotating shaft 153. As shown in FIG. 15, FIG. 17, FIG. 21, and FIG. 23, the second transmission connecting rod 142 is rotatably connected to the mounting bracket 18 by using a fourth rotating shaft 154. A reference numeral 153 shown in FIG. 15, FIG. 16, FIG. 21, and FIG. 23 indicates a position of an axis of the third rotating shaft 153 after the first transmission connecting rod 141 is rotatably connected to the mounting bracket 18. A reference numeral 154 shown in FIG. 15, FIG. 17, FIG. 21, and FIG. 23 represents a position of an axis of the fourth rotating shaft 154 after the second transmission connecting rod 142 is rotatably connected to the mounting bracket 18.

As shown in FIGS. 13 to 15 and FIGS. 20 to 23, the push group 13 includes a first push member 131 and a second push member 132, the first push member 131 is rotatably connected to the second swing arm 122 by using the second rotating shaft 152, and the first push member 131 is further rotatably connected to the first transmission connecting rod 141, and the second push member 132 is rotatably connected to the first swing arm 121 by using the first rotating shaft 151, and the second push member 132 is further rotatably connected to the second transmission connecting rod 142. The first push member 131 is rotatably connected to the first transmission connecting rod 141 by using a fifth rotating shaft 155, and the second push member 132 is rotatably connected to the second transmission connecting rod 142 by using a sixth rotating shaft 156. A reference numeral 155 shown in FIG. 15, FIG. 16, FIG. 21, and FIG. 23 is a position of an axis of the fifth rotating shaft 155 after the first push member 131 is connected to the first transmission connecting rod 141. A reference numeral 156 shown in FIG. 15, FIG. 17, FIG. 21, and FIG. 23 is a position of an axis of the sixth rotating shaft 156 after the second push member 132 is connected to the second transmission connecting rod 142. The third rotating shaft 153 and the fifth rotating shaft 155 are different axes, and the fourth rotating shaft 154 and the sixth rotating shaft 156 are different axes.

In this embodiment, the first transmission connecting rod 141 is configured to transfer movement of the first rotating bracket 111, and the second transmission connecting rod 142 is configured to transfer movement of the second rotating bracket 112, so that in a process in which the first rotating bracket 111 and the second rotating bracket 112 rotate toward each other, the first rotating bracket 111 drives, by using the first transmission connecting rod 141, the first push member 131 to push the second rotating shaft 152 to move in the direction away from the mounting bracket 18, and the second rotating bracket 112 drives, by using the second transmission connecting rod 142, the second push member 132 to push the first rotating shaft 151 to move in the direction away from the mounting bracket 18, so as to increase the accommodation space 174 of the foldable apparatus 1 when the foldable apparatus 1 is in the folded state. In addition, in the foldable apparatus 1, two ends of the first swing arm 121 are respectively connected to the first rotating bracket 111 and the second push member 132, and two ends of the second swing arm 122 are respectively connected to the second rotating bracket 112 and the first push member 131. Therefore, the first rotating bracket 111 and the second rotating bracket 112 are connected by using the first transmission connecting rod 141, the first push member 131, and the second swing arm 122, and are also connected by using the second transmission connecting rod 142, the second push member 132, and the first swing arm 121. In this case, the first transmission connecting rod 141, the first push member 131, the second swing arm 122, the second transmission connecting rod 142, the second push member 132, and the first swing arm 121 are configured to implement linkage between the first rotating bracket 111 and the second rotating bracket 112.

In embodiments of this disclosure, the transmission assembly may be specifically implemented by using the embodiments shown in FIG. 15, FIG. 21, and FIG. 23. The following separately describes specific structures of the transmission assembly in the three embodiments.

Figure 16:
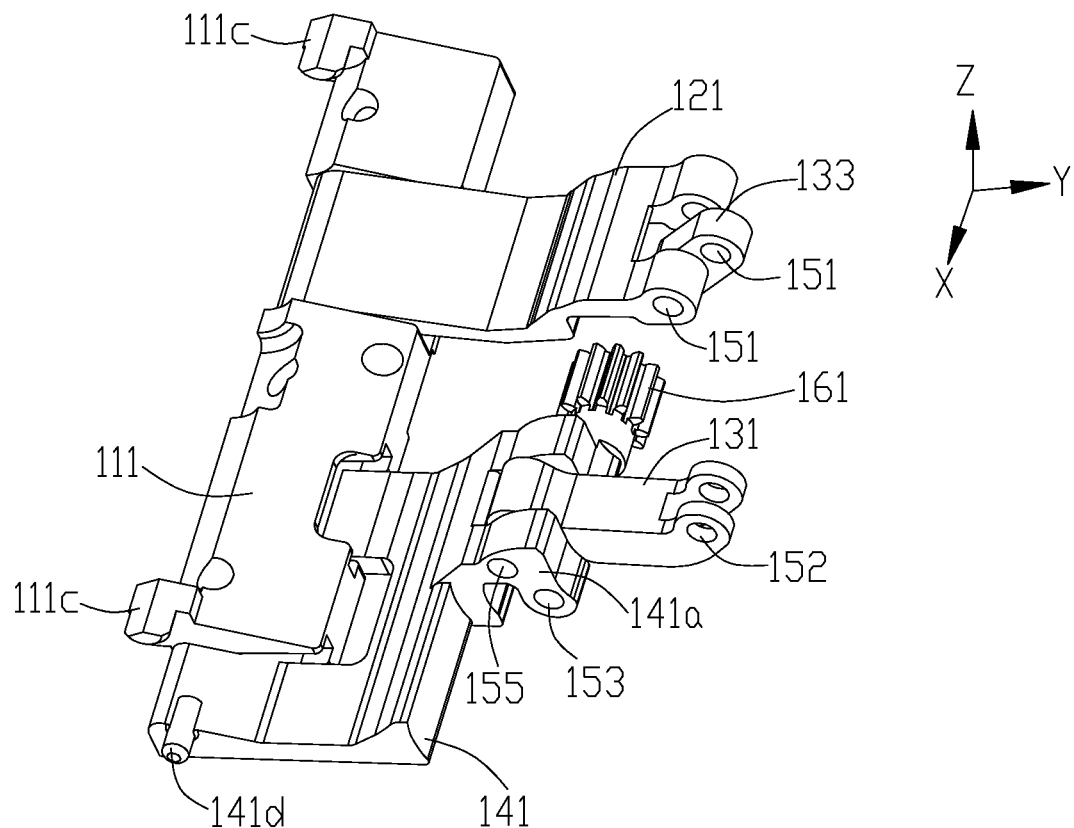
FIG. 16 is a schematic diagram of a structure of fitting between a first rotating bracket and a first transmission connecting rod in FIG. 15 in the first specific embodiment.
Figure 17:
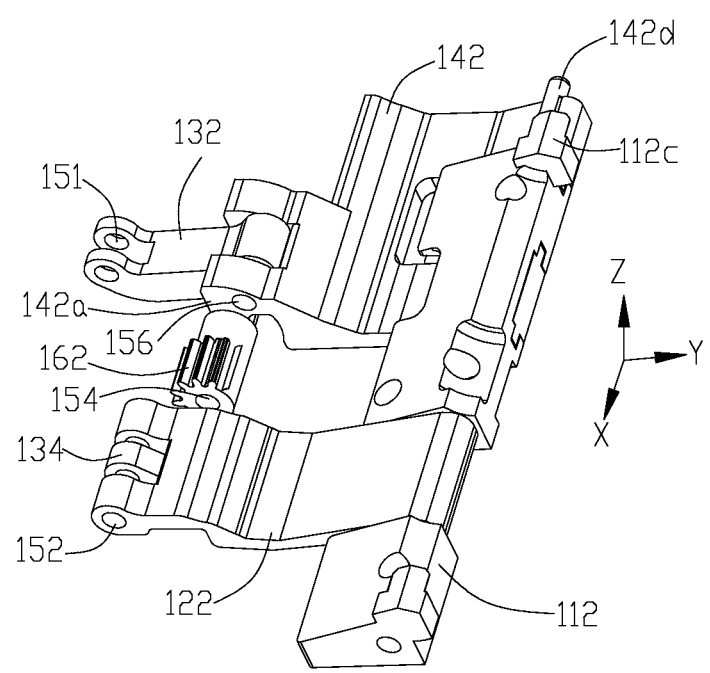
FIG. 17 is a schematic diagram of a structure of fitting between a second rotating bracket and a second transmission connecting rod in FIG. 15 in the first specific embodiment.
Figure 25:
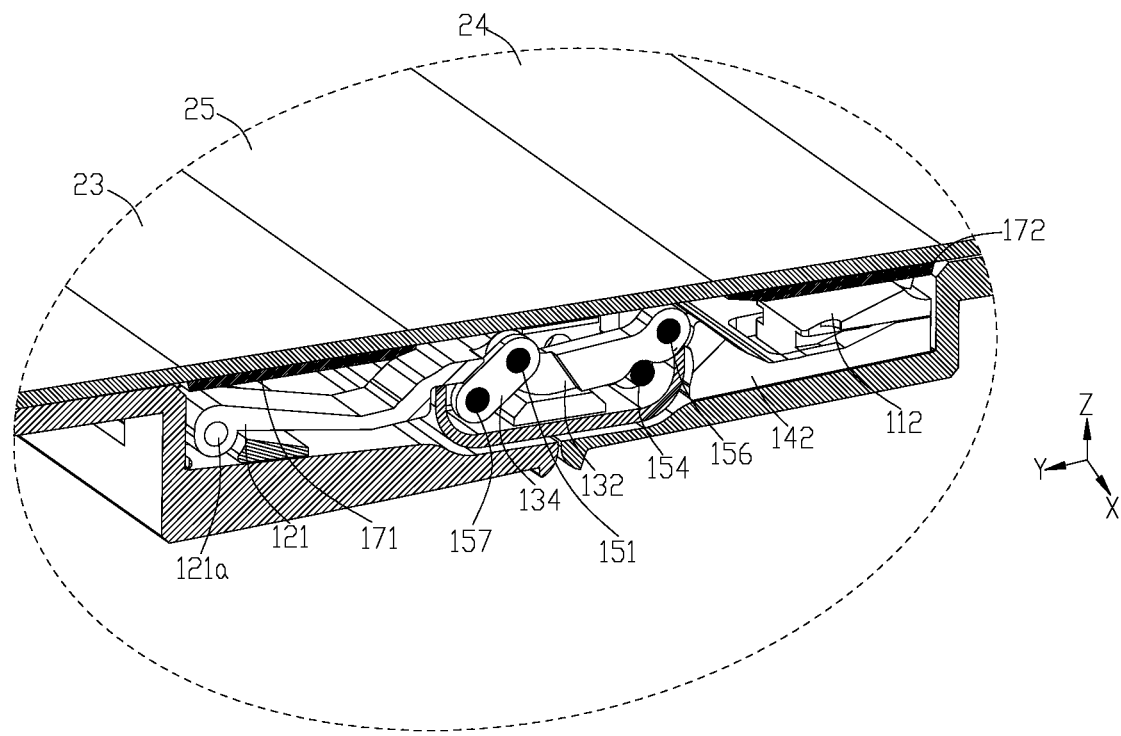
FIG. 25 is a partial enlarged view of part III in FIG. 24.

Further, to improve stability of movement of each component of the transmission assembly, the transmission assembly further includes a limiting group. FIG. 13 to FIG. 17 show an implementation manner of the limiting group. The limiting group includes a first limiting member 133 and a second limiting member 134. One end of the first limiting member 133 is rotatably connected to the mounting bracket 18, and the other end is rotatably connected to the first swing arm 121 and the second push member 132 by using the first rotating shaft 151. One end of the second limiting member 134 is rotatably connected to the mounting bracket 18, and the other end is rotatably connected to the second swing arm 122 and the first push member 131 by using the second rotating shaft 152. As shown in FIG. 25, the second limiting member 134 is rotatably connected to the mounting bracket 18 by using an eighth rotating shaft 157. Correspondingly, the first limiting member 133 is rotatably connected to the mounting bracket 18 by using a seventh rotating shaft (not shown in the figure). The first limiting member 133 is configured to limit movement of the first push member 131 along a first preset track, and the second limiting member 134 is configured to limit movement of the second push member 132 along a second preset track. In addition, the first push member 131 and the second push member 132 move in opposite directions. As shown in FIG. 16, in the first transmission connecting rod 141, a part located between the third rotating shaft 153 and the fifth rotating shaft 155 is a first rocker 141a, and the first rocker 141a is a part of the first transmission connecting rod 141. That is, the first rocker 141a is fastened to or integrally formed with another part of the first transmission connecting rod 141. Similarly, as shown in FIG. 17, in the second transmission connecting rod 142, a part located between the fourth rotating shaft 154 and the sixth rotating shaft 156 is a second rocker 142a, and the second rocker 142a is a part of the second transmission connecting rod 142. That is, the second rocker 142a is fastened to or integrally formed with another part of the second transmission connecting rod 142.

In this embodiment of this disclosure, as shown in FIG. 15, the first rocker 141a of the first transmission connecting rod 141, the first push member 131, the second limiting member 134, and the mounting bracket 18 form a planar four-bar mechanism, and the second rocker 142a, the second push member 132, the first limiting member 133, and the mounting bracket 18 form a planar four-bar mechanism. The planar four-bar mechanism is a mechanism that includes four rigid moving members that move in a same plane. Specifically, the planar four-bar mechanism includes a rack, side links, and a connecting rod. The rack is in a fixed state. A moving member directly connected to the rack is the side link, and a member not connected to the rack is the connecting rod. The planar four-bar mechanism may be specifically implemented by using a double rocker mechanism or a crank-slider mechanism. Two side links of the double rocker mechanism are both rockers, and the connecting rod performs planar movement in a plane in which the planar four bars are located.

Specifically, when the planar four-bar mechanism is implemented by using the double rocker mechanism, the mounting bracket 18 is the rack of the planar four-bar mechanism. Because the first rocker 141a and the second limiting member 134 are both rotatably connected to the mounting bracket 18, the first rocker 141a and the second limiting member 134 are the side links of the planar four-bar mechanism, and the first rocker 141a and the second limiting member 134 swing within a particular angle range. Therefore, the first rocker 141a and the second limiting member 134 are rockers. The first push member 131 is not directly connected to the mounting bracket 18. The first push member 131 is the connecting rod of the planar four-bar mechanism. Therefore, the first rocker 141a, the first push member 131, the second limiting member 134, and the mounting bracket 18 form a first double rocker mechanism. Similarly, the second rocker 142a, the second push member 132, the first limiting member 133, and the mounting bracket 18 form a planar four-bar mechanism, and the mounting bracket 18 is the rack of the planar four-bar mechanism. Because the second rocker 142a and the first limiting member 133 are both rotatably connected to the mounting bracket 18, the second rocker 142a and the first limiting member 133 are the side links of the planar four-bar mechanism, and the second rocker 142a and the first limiting member 133 can swing within a particular angle range. Therefore, the second rocker 142a and the first limiting member 133 are rockers. The second push member 132 is not directly connected to the mounting bracket 18. The second push member 132 is the connecting rod of the planar four-bar mechanism. The second rocker 142a, the second push member 132, the first limiting member 133, and the mounting bracket 18 form a second double rocker mechanism.

Therefore, when the transmission assembly that is configured to transfer the movement of the first rotating bracket 111 and the second rotating bracket 112 and that is of the foldable apparatus 1 is implemented by using the double rocker mechanisms, because all moving members of the double rocker mechanism move in a same plane, complexity of the foldable apparatus 1 can be reduced and movement of the components of the foldable apparatus 1 is simplified, and stability and reliability of movement of the first rotating bracket 111 and the second rotating bracket 112 are improved. In addition, when the transmission assembly of the foldable apparatus 1 is implemented by using the double rocker mechanisms, the first rotating shaft 151 and the second rotating shaft 152 may be connected to connecting rods of the double rocker mechanisms, and when the connecting rods perform planar movement, the first rotating shaft 151 and the second rotating shaft 152 are driven to perform planar movement, to further drive the first rotating shaft 151 and the second rotating shaft 152 to move along the width direction Y of the mounting bracket 18 relative to the mounting bracket 18 (the rack).

In the first double rocker mechanism, the first push member 131 is connected to the first rocker 141a and the second limiting member 134 respectively along two ends of the width direction Y of the mounting bracket 18. In addition, the first rocker 141a and the second limiting member 134 are arranged along the width direction Y of the mounting bracket 18, so that the first push member 131 performs planar movement under driving of the first rocker 141a and the second limiting member 134. In addition, the movement of the first push member 131 includes at least sub-movement along the width direction Y of the mounting bracket 18, so that the second rotating shaft 152 connected to the first push member 131 moves along the width direction Y of the mounting bracket 18. In this embodiment, the first preset track of the first push member 131 may be curved movement or rectilinear movement in a plane in which the first double rocker mechanism is located. In addition, the first preset track has a sub-track along the width direction Y of the mounting bracket 18, and also has a sub-track along a thickness direction Z of the mounting bracket 18. That is, the first push member 131 is movable along the width direction Y of the mounting bracket 18 relative to the mounting bracket 18, and is also movable along the thickness direction Z of the mounting bracket 18.

Similarly, in the second double rocker mechanism, the second push member 132 is connected to the second rocker 142a and the first limiting member 133 respectively along two ends of the width direction Y of the mounting bracket 18. In addition, the second rocker 142a and the first limiting member 133 are arranged along the width direction Y of the mounting bracket 18, so that the second push member 132 performs planar movement under driving of the second rocker 142a and the first limiting member 133. In addition, the movement of the second push member 132 includes at least sub-movement along the width direction Y of the mounting bracket 18, so that the first rotating shaft 151 connected to the second push member 132 moves along the width direction Y of the mounting bracket 18. In this embodiment, the second preset track of the second push member 132 may be curved movement or rectilinear movement in a plane in which the second double rocker mechanism is located. In addition, the second preset track has a sub-track along the width direction Y of the mounting bracket 18, and also has a sub-track along the thickness direction Z of the mounting bracket 18. That is, the second push member 132 is movable along the width direction Y of the mounting bracket 18 relative to the mounting bracket 18, and is also movable along the thickness direction Z of the mounting bracket 18.

Therefore, in the first double rocker mechanism, the first preset track of the movement of the first push member 131 is related to a size relationship between the first rocker 141a and the second limiting member 134, and the second preset track of the movement of the second push member 132 is related to a size relationship between the second rocker 142a and the first limiting member 133. The first preset track and the second preset track are described in detail below.

In a first implementation, in the first double rocker mechanism, when lengths of the first rocker 141a and the second limiting member 134 are the same, it indicates that lengths of two side links of the first double rocker mechanism are the same. In this case, movement of the connecting rod (the first push member 131) of the first double rocker mechanism is translation along the width direction Y of the mounting bracket 18, that is, the first preset track is a straight line extending along the width direction Y of the mounting bracket 18. Similarly, in the second double rocker mechanism, when lengths of the second rocker 142a and the first limiting member 133 are the same, it indicates that lengths of two side links of the second double rocker mechanism are the same. In this case, movement of the connecting rod (the second push member 132) of the second double rocker mechanism is translation along the width direction Y of the mounting bracket 18, that is, the second preset track is a straight line extending along the width direction Y of the mounting bracket 18.

In another specific implementation, in the first double rocker mechanism, if lengths of the first rocker 141a and the second limiting member 134 are different, it indicates that lengths of two side links of the first double rocker mechanism are different. In this case, when moving along the width direction Y of the mounting bracket 18, the connecting rod (the first push member 131) of the first double rocker mechanism is further tilted along the thickness direction Z of the mounting bracket 18. That is, the first preset track of the first push member 131 is rectilinear movement or curved movement in a plane in which the width direction Y and the thickness direction Z of the mounting bracket 18 are located (that is, the first preset track has a sub-track along the width direction Y of the mounting bracket 18 and a sub-track along the thickness direction Z of the mounting bracket 18). Similarly, in the second double rocker mechanism, if lengths of the second rocker 142a and the first limiting member 133 are different, it indicates that lengths of two side links of the second double rocker mechanism are different. In this case, when moving along the width direction Y of the mounting bracket 18, the connecting rod (the second push member 132) of the second double rocker mechanism is further tilted along the thickness direction Z of the mounting bracket 18. That is, the second preset track of the second push member 132 is rectilinear movement or curved movement in a plane in which the width direction Y and the thickness direction Z of the mounting bracket 18 are located (that is, the second preset track has a sub-track along the width direction Y of the mounting bracket 18 and a sub-track along the thickness direction Z of the mounting bracket 18).

Specifically, in the first double rocker mechanism, that the lengths of the first rocker 141a and the second limiting member 134 are different may be specifically that the length of the first rocker 141a is greater than the length of the second limiting member 134, or the length of the first rocker 141a is less than the length of the second limiting member 134. In this case, a requirement on the lengths of the first rocker 134a and the second limiting member 134 is reduced, so that a processing difficulty is reduced. In addition, when the first push member 131 and the second push member 132 are tilted along the thickness direction Z of the mounting bracket 18 when moving along the width direction Y of the mounting bracket 18, jamming between the first push member 131, and the first transmission connecting rod 141 connected to the first push member 131 and the second swing arm 142a can be further prevented, and jamming between the second push member 132, and the second transmission connecting rod 142 connected to the second push member 132 and the first rocker 141a can be prevented.

Specifically, in the first double rocker mechanism, when the first push member 131 moves along the first preset track, one end that is of the first push member 131 and that is along the width direction Y of the mounting bracket 18 moves upward, and the other end moves downward. That is, in one end that is of the first push member 131 and that is connected to the first rocker 141a and one end that is of the first push member 131 and that is connected to the second limiting member 134, one end moves upward, and the other end moves downward.

Similarly, in the second double rocker mechanism, when the second push member 132 moves along the second preset track, one end that is of the second push member 132 and that is along the width direction Y of the mounting bracket 18 moves upward, and the other end moves downward. That is, in one end that is of the second push member 132 and that is connected to the second rocker 142a and one end that is of the second push member 132 and that is connected to the first limiting member 133, one end moves upward, and the other end moves downward.

Therefore, in this embodiment, the foldable apparatus 1 can limit the movement of the first push member 131 along the first preset track and the movement of the second push member 132 along the second preset track by disposing the first double rocker mechanism and the second double rocker mechanism, so as to implement movement of the first rotating shaft 151 and the second rotating shaft 152 along the width direction Y of the mounting bracket 18.

Figure 20:
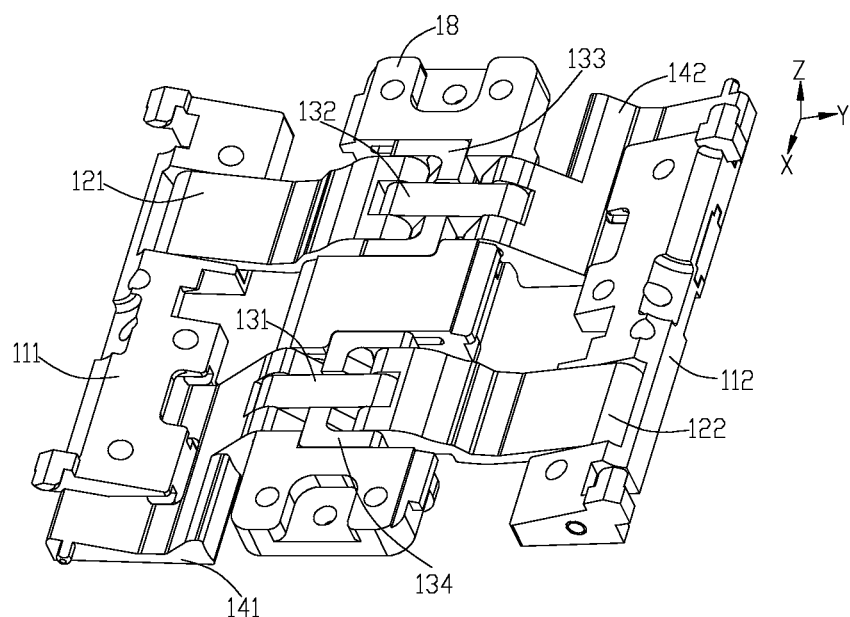
FIG. 20 is a schematic diagram of a structure of fitting between a rotating bracket assembly, a transmission assembly, and a mounting bracket in FIG. 19 in the second specific embodiment.

FIG. 20 to FIG. 21 show another implementation of the limiting group, so that sliding of the first push member 131 and the second push member 132 relative to the mounting bracket 18 can be implemented. Specifically, the first push member 131 is slidable relative to the mounting bracket 18 along the width direction Y of the mounting bracket 18, to drive the second rotating shaft 152 connected to the first push member 131 to move along the width direction Y of the mounting bracket 18; and the second push member 132 is slidable relative to the mounting bracket 18 along the width direction Y of the mounting bracket 18, to drive the first rotating shaft 151 connected to the second push member 132 to move along the width direction Y of the mounting bracket 18. The following describes in detail a specific structure of the limiting group in this embodiment.

In a specific implementation, as shown in FIG. 20 and FIG. 21, the first limiting member 133 of the limiting group is slidably connected to the mounting bracket 18, and the first limiting member 133 is slidable relative to the mounting bracket 18 along the width direction Y of the mounting bracket 18. The first limiting member 133 is rotatably connected to the second push member 132 by using the first rotating shaft 151, and the first limiting member 133 is further rotatably connected to the first swing arm 121. As shown in FIG. 21, the first limiting member 133 is rotatably connected to the first swing arm 121 by using the first rotating shaft 151. In addition, the second limiting member 134 of the limiting group is slidably connected to the mounting bracket 18, and the second limiting member 134 is slidable relative to the mounting bracket 18 along the width direction Y of the mounting bracket 18. The second limiting member 134 is rotatably connected to the first push member 131 by using the second rotating shaft 152, and the second limiting member 134 is rotatably connected to the second swing arm 122 by using the second rotating shaft 152.

In this embodiment, the first limiting member 133 is configured to limit movement of the first push member 131 along a third preset track, and the second limiting member 134 is configured to limit movement of the second push member 132 along a fourth preset track. In addition, the first push member 131 and the second push member 132 move in opposite directions.

As shown in FIG. 21, in the first transmission connecting rod 141, a part located between the third rotating shaft 153 and the fifth rotating shaft 155 is a first crank 141e, and the first crank 141e is a part of the first transmission connecting rod 141. That is, the first crank 141e is fastened to or integrally formed with another part of the first transmission connecting rod 141. Similarly, as shown in FIG. 21, in the second transmission connecting rod 142, a part located between the fourth rotating shaft 154 and the sixth rotating shaft 156 is a second crank 142e, and the second crank 142e is a part of the second transmission connecting rod 142. That is, the second crank 142e is fastened to or integrally formed with another part of the second transmission connecting rod 142.

In the embodiment shown in FIG. 21, the first crank 141e of the first transmission connecting rod 141, the first push member 131, the second limiting member 134, and the mounting bracket 18 form a planar four-bar mechanism, and the second crank 142e of the second transmission connecting rod 142, the second push member 132, the first limiting member 133, and the mounting bracket 18 form a planar four-bar mechanism. The planar four-bar mechanism may also be implemented by using a crank-slider mechanism. The following describes in detail a specific implementation of the crank-slider mechanism.

In this embodiment, as shown in FIG. 21, in the first crank 141e of the first transmission connecting rod 141, the first push member 131, the second limiting member 134, and the mounting bracket 18, the mounting bracket 18 is the rack of the planar four-bar mechanism. Because the first crank 141e is rotatably connected to the mounting bracket 18 (the rack), and the second limiting member 134 is slidably connected to the mounting bracket 18 (the rack), the first crank 141e is a crank of the planar four-bar mechanism, and the second limiting member 134 is a slider of the planar four-bar mechanism. The first push member 131 is not directly connected to the mounting bracket 18 (the rack). The first push member 131 is the connecting rod of the planar four-bar mechanism. The first crank 141e, the first push member 131, the second limiting member 134, and the mounting bracket 18 form a first crank-slider mechanism. Similarly, in the second crank 142e of the second transmission connecting rod 142, the second push member 132, the first limiting member 133, and the mounting bracket 18, the mounting bracket 18 is the rack of the planar four-bar mechanism. Because the second crank 142e is rotatably connected to the mounting bracket 18 (the rack), and the first limiting member 133 is slidably connected to the mounting bracket 18 (the rack), the second crank 142e is a crank of the planar four-bar mechanism, and the first limiting member 133 is a slider of the planar four-bar mechanism. The second push member 132 is not directly connected to the mounting bracket 18 (the rack). The second push member 132 is the connecting rod of the planar four-bar mechanism. The second crank 142e, the second push member 132, the first limiting member 133, and the mounting bracket 18 form a second crank-slider mechanism.

In the first crank-slider mechanism, the first push member 131 is connected to the first crank 141e and the second limiting member 134 respectively along two ends of the width direction Y of the mounting bracket 18. In addition, the first crank 141e and the second limiting member 134 are arranged along the width direction Y of the mounting bracket 18, so that the first push member 131 performs planar movement under driving of the first crank 141e and the second limiting member 134. In addition, the movement of the first push member 131 includes at least sub-movement along the width direction Y of the mounting bracket 18, so that the second rotating shaft 152 connected to the first push member 131 moves along the width direction Y of the mounting bracket 18. In this embodiment, the third preset track of the first push member 131 may be curved movement in a plane in which the first crank-slider mechanism is located. In addition, the third preset track has a sub-track along the width direction Y of the mounting bracket 18, and also has a sub-track along the thickness direction Z of the mounting bracket 18. That is, the first push member 131 is movable along the width direction Y of the mounting bracket 18 relative to the mounting bracket 18, and is also movable along the thickness direction Z of the mounting bracket 18.

Similarly, in the second crank-slider mechanism, the second push member 132 is connected to the second crank 142e and the first limiting member 133 respectively along two ends of the width direction Y of the mounting bracket 18. In addition, the second crank 142e and the first limiting member 133 are arranged along the width direction Y of the mounting bracket 18, so that the second push member 132 performs planar movement under driving of the second crank 142e and the first limiting member 133. In addition, the movement of the second push member 132 includes at least sub-movement along the width direction Y of the mounting bracket 18, so that the first rotating shaft 151 connected to the second push member 132 moves along the width direction Y of the mounting bracket 18. In this embodiment, the fourth preset track of the second push member 132 may be curved movement in a plane in which the second crank-slider mechanism is located. In addition, the fourth preset track has a sub-track along the width direction Y of the mounting bracket 18, and also has a sub-track along the thickness direction Z of the mounting bracket 18. That is, the second push member 132 is movable along the width direction Y of the mounting bracket 18 relative to the mounting bracket 18, and is also movable along the thickness direction Z of the mounting bracket 18.

Specifically, as shown in FIG. 21, to implement curved movement of the first push member 131, a first mounting groove is provided in the second limiting member 134, and the first push member 131 is movably mounted in the first mounting groove, so that the first push member 131 is movable relative to the second limiting member 134 along the thickness direction Z of the mounting bracket 18, and the second limiting member 134 drives, in a process of moving along the width direction Y of the mounting bracket 18, the first push member 131 to move along the width direction Y of the mounting bracket 18. Similarly, to implement curved movement of the second push member 132, a second mounting groove is provided in the first limiting member 133, and the second push member 132 is movably mounted in the second mounting groove, so that the second push member 132 is movable relative to the first limiting member 133 along the thickness direction Z of the mounting bracket 18, and the first limiting member 133 drives, in a process of moving along the width direction Y of the mounting bracket 18, the second push member 132 to move along the width direction Y of the mounting bracket 18.

In addition, both the first mounting groove and the second mounting groove are recessed along the thickness direction Z of the mounting bracket 18, so that a thickness of the first push member 131 when being mounted in the first mounting groove and a thickness of the second push member 132 when being mounted in the second mounting groove can be reduced, to reduce a size of the foldable apparatus 1 along the thickness direction Z of the mounting bracket 18, thereby helping implement miniaturization and a light and thin design of the foldable apparatus 1 and the electronic device.

In the embodiment shown in FIG. 20 and FIG. 21, sliding of the slider (the second limiting member 134) of the first crank-slider mechanism and the slider (the first limiting member 133) of the second crank-slider mechanism relative to the rack (the mounting bracket 18) is implemented by using the following structure. As shown in FIG. 21, the mounting bracket 18 includes a plurality of fixed blocks 182 disposed separately, and the plurality of fixed blocks 182 are disposed at intervals along the length direction X of the mounting bracket 18. The first limiting member 133 and the second limiting member 134 in the foregoing two crank-slider mechanisms are located between adjacent fixed blocks 182. In addition, the fixed block is provided with a chute 182a, and the chute 182a extends along the width direction Y of the mounting bracket 18.

As shown in FIG. 21, a first convex part 133a is disposed on the first limiting member 133, and first convex parts 133a are disposed on two sides of the first limiting member 133 along the length direction X of the mounting bracket 18. The first convex parts 133a respectively fit the chutes 182a of the fixed blocks 182 located on the two sides of the first limiting member 133 along the length direction X of the mounting bracket 18. In this way, the first limiting member 133 is slidable along the width direction Y of the mounting bracket 18 by means of fitting between the first convex parts 133a and the chutes 182a. In addition, a second convex part 134a is disposed on the second limiting member 134, and second convex parts 134a are disposed on two sides of the second limiting member 134 along the length direction X of the mounting bracket 18. The second convex parts 134a respectively fit the chutes 182a of the fixed blocks 182 located on the two sides of the second limiting member 134 along the length direction X of the mounting bracket 18. In this way, the second limiting member 134 is slidable along the width direction Y of the mounting bracket 18 by means of fitting between the second convex parts 134a and the chutes 182a.

Certainly, the first limiting member 133 and the second limiting member 134 may also be provided with chutes that extend along the width direction Y of the mounting bracket 18. Correspondingly, the fixed block 182 may also be provided with the first convex part and the second convex part.

Figure 22:
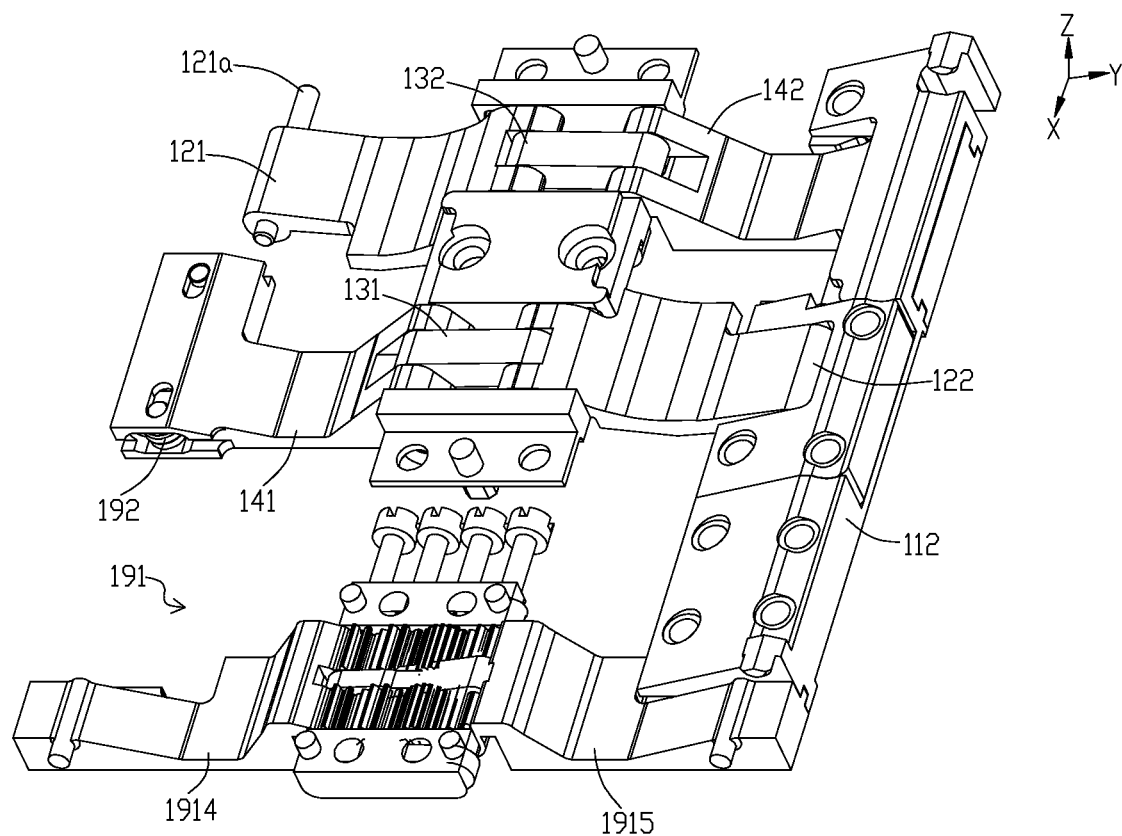
FIG. 22 is a schematic diagram of a structure of fitting between the rotating bracket assembly, the transmission assembly, the mounting bracket, and a first damping assembly in FIG. 19 in a third specific embodiment.

In some other specific implementations, in the embodiment shown in FIG. 22 and FIG. 23, when the first push member 131 is slidably connected to the mounting bracket 18, and the second push member 132 is slidably connected to the mounting bracket 18, the transmission assembly of the foldable apparatus 1 may alternatively not include the first limiting member and second limiting member. In this case, the first rotating shaft 151 and the second rotating shaft 152 may be used to limit the movement of the second push member 132 and the first push member 131.

Specifically, as shown in FIG. 23, the second rotating shaft 152 is disposed on the first push member 131, that is, the second rotating shaft 152 is fastened to the first push member 131, and the first swing arm 121 is rotatably connected to the second rotating shaft 152, that is, the first swing arm 121 is rotatable relative to the second rotating shaft 152; and the first rotating shaft 151 is disposed on the second push member 132, and the second swing arm 122 is rotatably connected to the first rotating shaft 151, that is, the second swing arm 122 is rotatable relative to the first rotating shaft 151. To implement a slidable connection between the first push member 131 and the mounting bracket 18 and a slidable connection between the second push member 132 and the mounting bracket 18, the mounting bracket 18 includes a plurality of fixed blocks 182 disposed separately, and the plurality of fixed blocks 182 are disposed at intervals along the length direction X of the mounting bracket 18. The fixed block 182 is provided with a plurality of chutes 182a extending along the width direction Y of the mounting bracket 18. The second rotating shaft 152 disposed on the first push member 131 is slidably connected to the corresponding chute 182a, so that the second rotating shaft 152 is slidable along the chute 182a, to implement movement of the second rotating shaft 152 along the width direction Y of the mounting bracket 18. The first rotating shaft 151 disposed on the second push member 132 is slidably connected to the corresponding chute 182a, so that the first rotating shaft 151 is slidable along the chute 182a, to implement movement of the first rotating shaft 151 along the width direction Y of the mounting bracket 18.

In this embodiment, the first rotating shaft 151 and the chute 182a that fit each other can limit the movement of the second push member 132, so that the second push member 132 moves along a fifth preset track. The fifth preset track of the second push member 132 may be curved movement or rectilinear movement in a plane in which the width direction Y and the thickness direction Z of the mounting bracket 18 are located. The fifth preset track includes a sub-track along the width direction Y of the mounting bracket 18, and also includes a sub-track along the thickness direction Z of the mounting bracket 18. That is, the second push member 132 is enabled to be movable along the width direction Y of the mounting bracket 18 relative to the mounting bracket 18, and also movable along the thickness direction Z of the mounting bracket 18. In addition, the second rotating shaft 152 and the chute 182a that fit each other can limit the movement of the first push member 131, so that the first push member 131 moves along a sixth preset track. The sixth preset track of the first push member 131 may be curved movement or rectilinear movement in a plane in which the width direction Y and the thickness direction Z of the mounting bracket 18 are located. The sixth preset track includes a sub-track along the width direction Y of the mounting bracket 18, and also includes a sub-track along the thickness direction Z of the mounting bracket 18. That is, the first push member 131 is enabled to be movable along the width direction Y of the mounting bracket 18 relative to the mounting bracket 18, and also movable along the thickness direction Z of the mounting bracket 18.

Based on this, in the embodiment shown in FIG. 23, the chute 182a may be obliquely disposed or arcuate. When the chute 182a is obliquely disposed or arcuate, along the thickness direction Z of the mounting bracket 18, heights of the chute 182a are different, so as to implement the movement of the first push member 131 and the second push member 132 along the width direction Y and the thickness direction Z of the mounting bracket 18. When the first push member 131 and the second push member 132 are tilted along the thickness direction Z of the mounting bracket 18 when moving along the width direction Y of the mounting bracket 18, jamming between the first push member 131, and the first transmission connecting rod 141 connected to the first push member 131 and the second swing arm 142a can be further prevented, and jamming between the second push member 132, and the second transmission connecting rod 142 connected to the second push member 132 and the first rocker 141a can be prevented.

Figure 26:
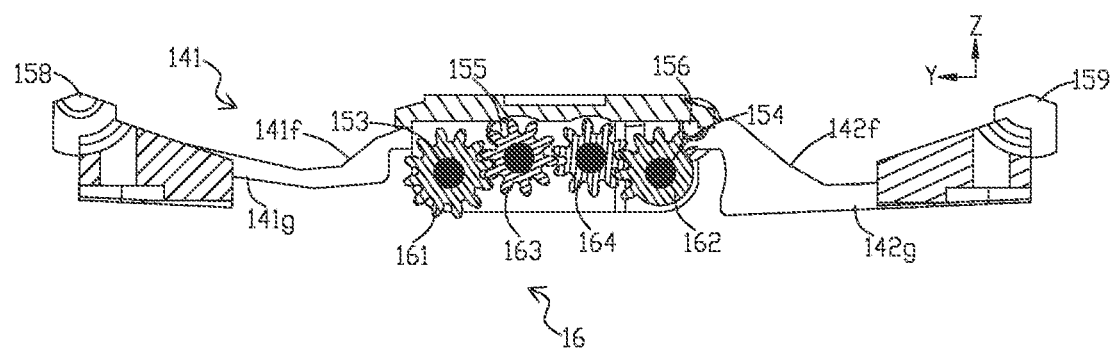
FIG. 26 is a cutaway drawing of the foldable apparatus in FIG. 18 at a synchronous gear set, where a support plate assembly is removed from the foldable apparatus.
Figure 27:
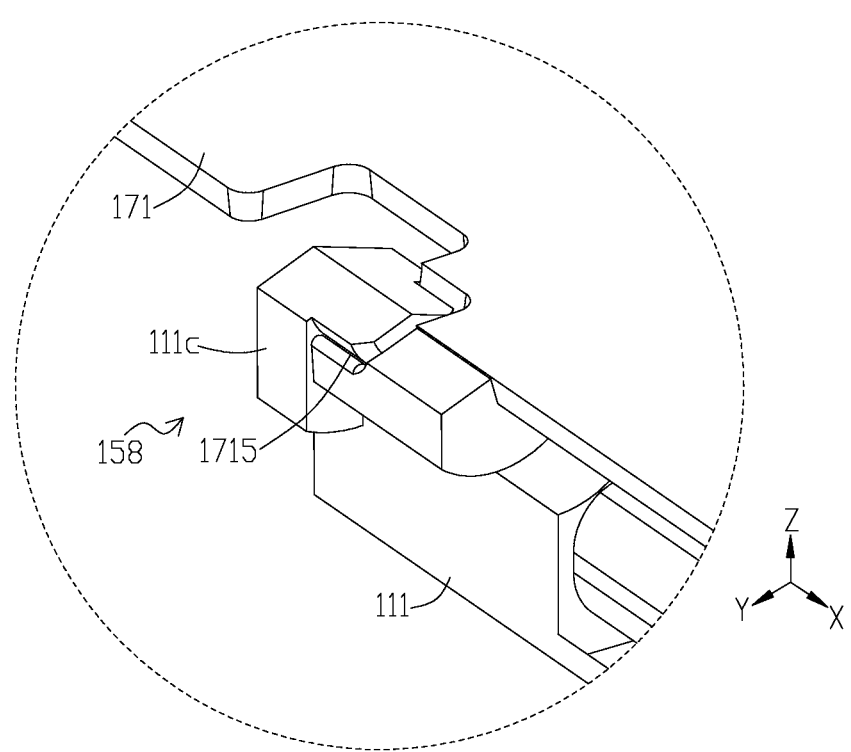
FIG. 27 is a partial enlarged view of part IV in FIG. 11.

In the foregoing embodiments, as shown in FIG. 21 and FIG. 26, the foldable apparatus 1 may further include a synchronous gear set 16. The synchronous gear set 16 is configured to transfer movement between the first rotating bracket 111 and the second rotating bracket 112, so that in a folding and unfolding process, the first transmission connecting rod 141 and the second transmission connecting rod 142 move synchronously, to improve stability and reliability of the foldable apparatus 1 and the electronic device in the unfolding and folding process.

Specifically, as shown in FIG. 21 and FIG. 26, the synchronous gear set 16 includes a second gear 161 and a third gear 162 that mesh with each other. The second gear 161 is connected to the first transmission connecting rod 141 by using the third rotating shaft 153. In a rotation process of the second gear 161, the first transmission connecting rod 141 is rotatable around the third rotating shaft 153. A reference numeral 153 in FIG. 21 represents a position of an axis of the third rotating shaft 153. Similarly, as shown in FIG. 21 and FIG. 26, the third gear 162 is connected to the second transmission connecting rod 142 by using the fourth rotating shaft 154. In a rotation process of the third gear 162, the second transmission connecting rod 142 is rotatable around the fourth rotating shaft 154. A reference numeral 154 in FIG. 21 represents a position of an axis of the fourth rotating shaft 154.

In this embodiment, the second gear 161 and the first transmission connecting rod 141 rotate around a same rotating shaft (the third rotating shaft 153), and the third gear 162 and the second transmission connecting rod 142 rotate around a same rotating shaft (the fourth rotating shaft 154), so as to implement synchronous rotation of the second gear 161 and the first transmission connecting rod 141 and synchronous rotation of the third gear 162 and the second transmission connecting rod 142, and the first transmission connecting rod 141 is connected to the first rotating bracket 111, and the second transmission connecting rod 142 is connected to the second rotating bracket 112, to further implement synchronous rotation of the first rotating bracket 111 and the second rotating bracket 112.

As shown in FIG. 21 and FIG. 26, the synchronous gear set 16 further includes a fourth gear 163 and a fifth gear 164 that mesh with each other. The fourth gear 163 meshes with the second gear 161, the fifth gear 164 meshes with the third gear 162, and the second gear 161, the fourth gear 163, the fifth gear 164, and the third gear 162 are arranged along the width direction Y of the mounting bracket 18.

In this embodiment, by adding the fourth gear 163 and the fifth gear 164 that mesh with the second gear 161 and the third gear 162, diameters of the second gear 161 and the third gear 162 can be further reduced when the second gear 161 meshes with the third gear 162, so as to reduce a space occupied by the synchronous gear set 16 along the width direction Y and the thickness direction Z of the mounting bracket 18, thereby helping implement miniaturization and a light and thin design of the foldable apparatus 1.

It should be noted that, as shown in FIG. 11, FIG. 12, FIG. 18, and FIG. 19, the foldable apparatus 1 may include a plurality of rotating bracket assemblies 11, a plurality of swing arm assemblies 12, a plurality of push groups 13, and a plurality of transmission groups 14. In addition, the plurality of rotating bracket assemblies 11 are distributed along the length direction X of the mounting bracket 18, the plurality of swing arm assemblies 12 are distributed along the length direction X of the mounting bracket 18, the plurality of push groups 13 are distributed along the length direction X of the mounting bracket 18, and the plurality of transmission groups 14 are distributed along the length direction X of the mounting bracket 18.

In the foregoing embodiments, as shown in FIG. 9, FIG. 11, and FIG. 12, the foldable apparatus 1 may further include a support plate assembly 17. The support plate assembly 17 is configured to connect to the flexible screen 2 of the electronic device, so that the flexible screen 2 can be folded or unfolded under driving of the foldable apparatus 1. A specific structure of the support plate assembly 17 is described in detail below.

The support plate assembly 17 includes a first support plate 171 and a second support plate 172 that are arranged on the two sides of the mounting bracket 18 along the width direction Y of the mounting bracket 18. The first support plate 171 and the second support plate 172 are configured to connect to the flexible screen 2 of the electronic device. Specifically, the first support plate 171 and the second support plate 172 are configured to connect to the folding part 26 of the flexible screen 2 (a connection manner may be adhesion). The first support plate 171 is rotatably connected to the first rotating bracket 111, that is, the first support plate 171 is rotatable relative to the first rotating bracket 111. In addition, the first support plate 171 is slidably connected to the first transmission connecting rod 141 and is rotatable relative to the first transmission connecting rod 141. The second support plate 172 is rotatably connected to the second rotating bracket 112, that is, the second support plate 172 is rotatable relative to the second rotating bracket 112. In addition, the second support plate 172 is slidably connected to the second transmission connecting rod 142 and is rotatable relative to the second transmission connecting rod 142. In addition, the support plate assembly 17 may further include a third support plate 173. The third support plate 173 is fastened to the mounting bracket 18, and along the width direction Y of the mounting bracket 18, the third support plate 173 is located between the first support plate 171 and the second support plate 172.

Figure 18:
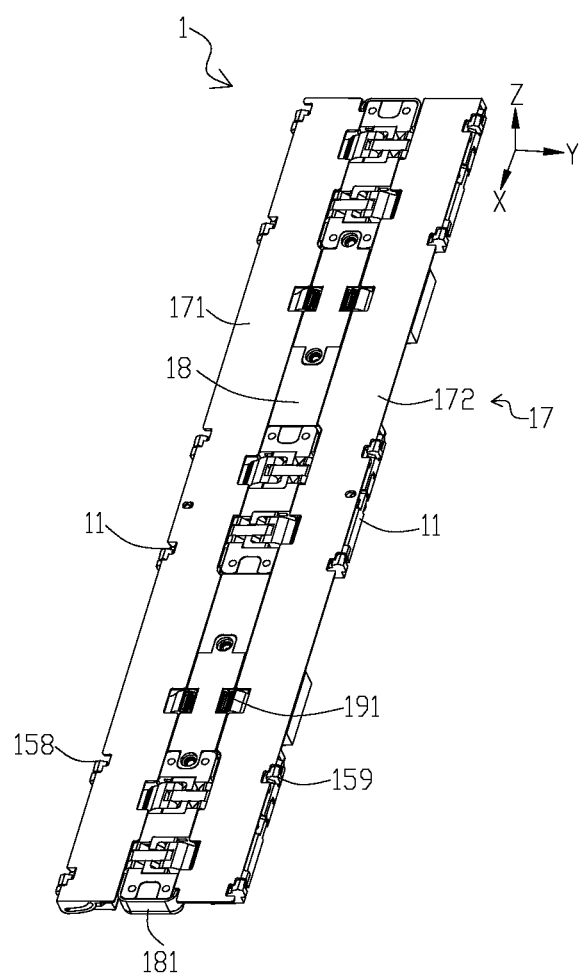
FIG. 18 is a schematic diagram of a structure of the foldable apparatus in FIG. 3 in a second specific embodiment, where the foldable apparatus is in an unfolded state.
Figure 19:
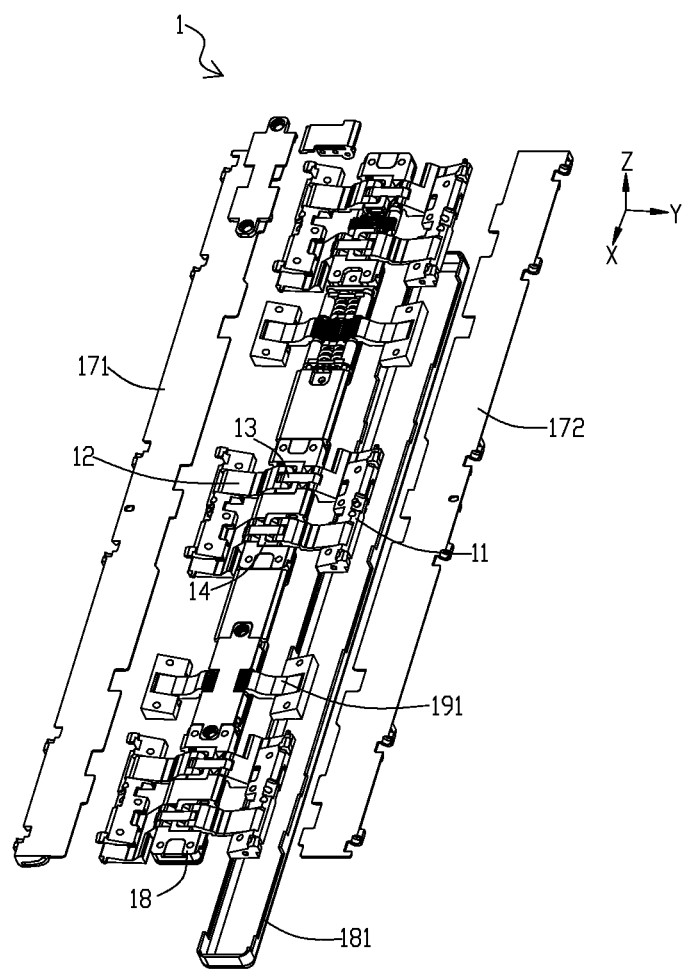
FIG. 19 is an exploded view of FIG. 18.

Specifically, as shown in FIG. 11 and FIG. 18, the first support plate 171 is rotatably connected to the first rotating bracket 111 by using an eleventh rotating shaft 158, so as to implement relative rotation between the first support plate 171 and the first rotating bracket 111; and the second support plate 172 is rotatably connected to the second rotating bracket 112 by using a twelfth rotating shaft 159, so as to implement relative rotation between the second support plate 172 and the second rotating bracket 112. In this embodiment, when the first rotating bracket 111 rotates relative to the first support plate 171, and the second rotating bracket 112 rotates relative to the second support plate 172, in the folding or unfolding process of the foldable apparatus 1, jamming between the first support plate 171 and the first rotating bracket 111 can be prevented, and jamming between the second support plate 172 and the second rotating bracket 112 can be prevented.

Figure 28:
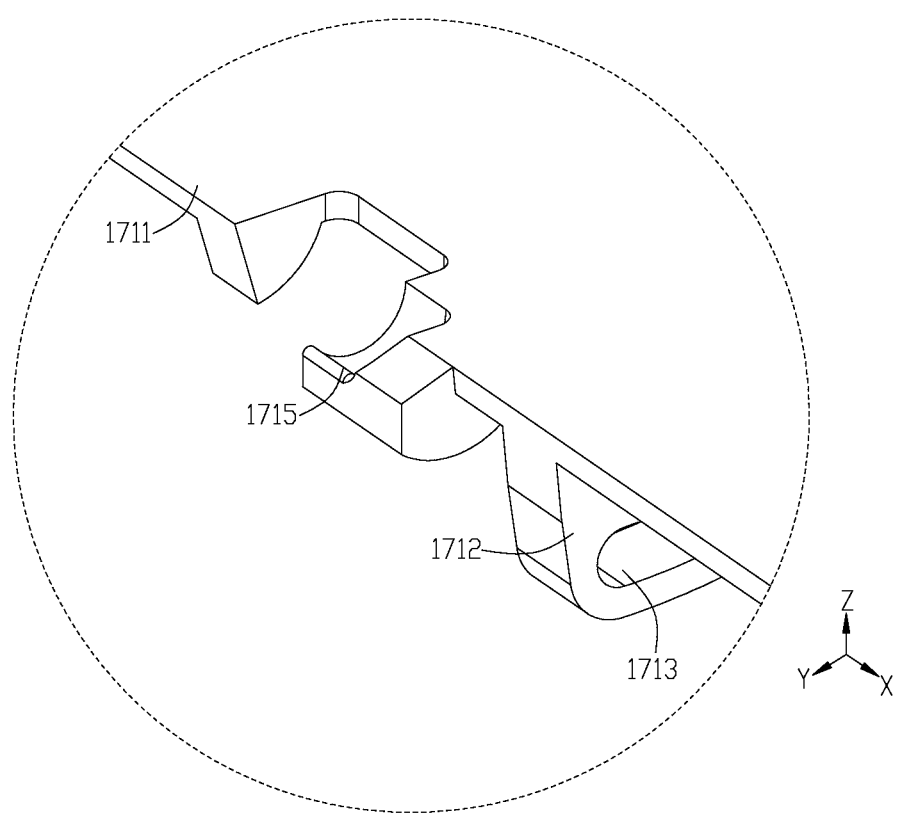
FIG. 28 is a partial enlarged view of part V in FIG. 12.

More specifically, as shown in FIG. 28, the first support plate 171 includes a first body part 1711, and a first arcuate groove 1715 is provided in the first body part 1711. Correspondingly, as shown in FIG. 15, FIG. 16, and FIG. 21, the first rotating bracket 111 includes a third convex part 111c. At least one part of the third convex part 111c is located in the first arcuate groove 1715, and is rotatable relative to the first arcuate groove 1715, so as to implement relative rotation between the first support plate 171 and the first rotating bracket 111. Similarly, the second support plate 172 includes a second body part (a structure of the second body part may be the same as that of the first body part 1711), and a second arcuate groove (not shown in the figure) is provided in the second body part. Correspondingly, as shown in FIG. 15, FIG. 17, and FIG. 21, the second rotating bracket 112 includes a fourth convex part 112c. At least one part of the fourth convex part 112c is located in the second arcuate groove, and is rotatable relative to the second arcuate groove, so as to implement relative rotation between the second support plate 172 and the second rotating bracket 112.

Further, in the foldable apparatus 1, a slidable connection and relative rotation between the first support plate 171 and the first transmission connecting rod 141 and a slidable connection and relative rotation between the second support plate 172 and the second transmission connecting rod 142 are implemented by using the following structure.

Figure 29:
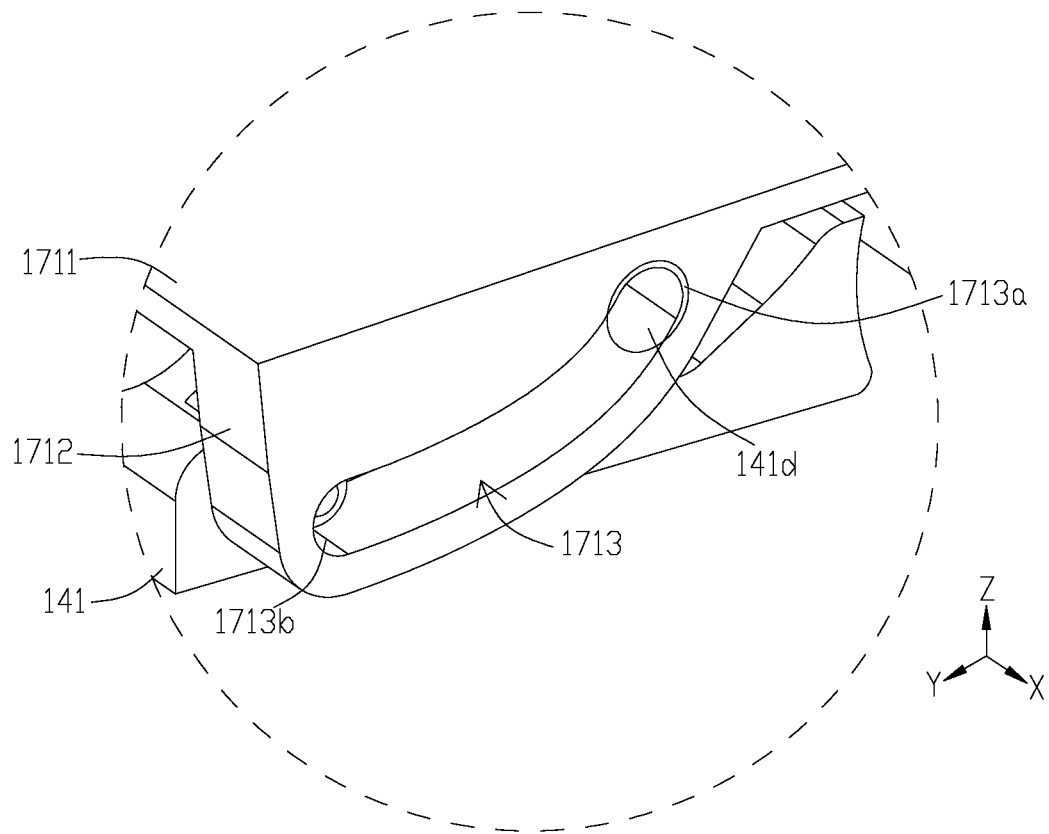
FIG. 29 is a partial enlarged view of part VI in FIG. 27.
Figure 30:
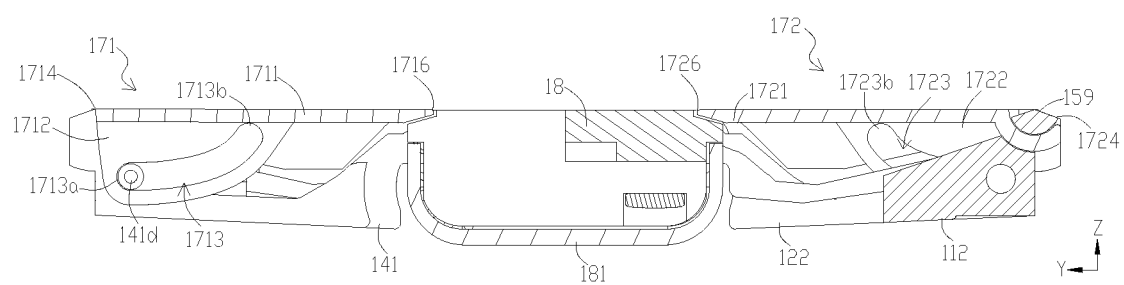
FIG. 30 is a cutaway drawing of the foldable apparatus in FIG. 18.
Figure 31:
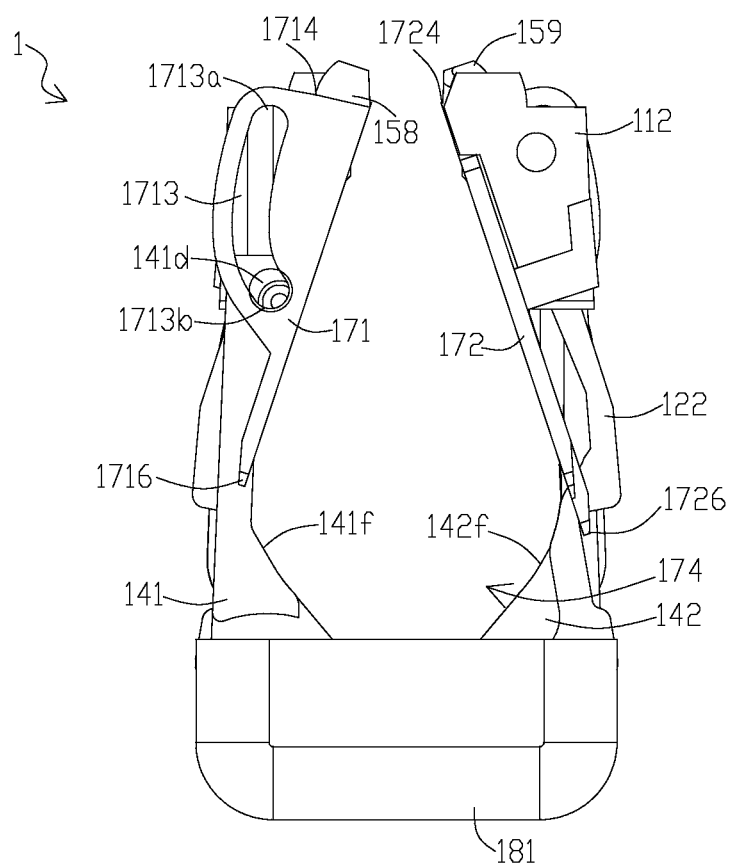
FIG. 31 is a side view of the foldable apparatus in FIG. 18 in a folded state.

Specifically, as shown in FIG. 29 to FIG. 31, the first support plate 171 further includes a first extension part 1712, the first extension part 1712 is fastened to or integrally formed with the first body part 1711, and the first extension part 1712 extends towards a direction of the first rotating bracket 111 relative to the first body part 1711. One of the first transmission connecting rod 141 and the first extension part 1712 of the first support plate 171 is provided with a first track 1713, and the other is provided with a first slider 141d. The first slider 141d is slidable along the first track 1713, so as to implement relative sliding between the first support plate 171 and the first transmission connecting rod 141. In addition, as shown in FIG. 30, the second support plate 172 includes a second body part 1721 and a second extension part 1722. The second extension part 1722 is fastened to or integrally formed with the second body part 1721, and the second extension part 1722 extends towards a direction of the second rotating bracket 112 relative to the second body part 1721. One of the second extension part 1722 of the second support plate 172 is provided with a second track 1723, and the other is provided with a second slider 142d. The second slider 142d is slidable along the second track 1723, so as to implement relative sliding between the second support plate 172 and the second transmission connecting rod 142.

In the embodiment shown in FIG. 29 and FIG. 30, the first track 1713 is disposed on the first extension part 1712 of the first support plate 171, and the first slider 141d is disposed on the first transmission connecting rod 141. Certainly, the first track may alternatively be disposed on the first transmission connecting rod 141, and the first slider may alternatively be disposed on the first extension part 1712 of the first support plate 171. In the embodiment shown in FIG. 21 and FIG. 30, the second track 1723 is disposed on the second extension part 1722 of the second support plate 172. As shown in FIG. 21, the second slider 142d is disposed on the second transmission connecting rod 142. Certainly, the second track may alternatively be disposed on the second transmission connecting rod 142, and the second slider may alternatively be disposed on the second extension part 1722 of the second support plate 172.

In addition, along the length direction X of the mounting bracket 18, the first support plate 171 may be provided with a plurality of first tracks 1713. Correspondingly, the first transmission connecting rod 141 may be provided with a plurality of first sliders 141d, and the first sliders 141d correspondingly fit the first tracks 1713, so that reliability of the slidable connection between the first support plate 171 and the first transmission connecting rod 141 can be improved. Along the length direction X of the mounting bracket 18, the second support plate 172 may be provided with a plurality of second tracks 1723. The second transmission connecting rod 142 may be provided with a plurality of second sliders 142d, and the second sliders 142d correspondingly fit the second tracks 1723, so that reliability of the slidable connection between the second support plate 172 and the second transmission connecting rod 142 can be improved. As shown in FIG. 9 and FIG. 30, along the width direction Y of the mounting bracket 18, the first support plate 171 has a first end 1714 and a second end 1716 that are oppositely disposed. The first end 1714 is far away from the mounting bracket 18, and the second end 1716 is close to the mounting bracket 18. Similarly, the second support plate 172 has a third end 1724 and a fourth end 1726 that are oppositely disposed. The third end 1724 is far away from the mounting bracket 18, and the fourth end 1726 is close to the mounting bracket 18. When the foldable apparatus 1 is in the unfolded state shown in FIG. 9, the first rotating bracket 111 and the second rotating bracket 112 are located at a second position (an unfolding position), the second end 1716 of the first support plate 171 and the fourth end 1726 of the second support plate 172 abut against each other or there is a preset gap therebetween, and a distance between the first end 1714 of the first support plate 171 and the third end 1724 of the second support plate 172 is the first length L1 by which the foldable apparatus 1 fits the folding part 26 of the flexible screen 2.

In a folding process of the foldable apparatus 1 (switching from a state shown in FIG. 30 to a state shown in FIG. 31), the first rotating bracket 111 and the second rotating bracket 112 rotate toward each other, and the first rotating bracket 111 rotates around the first rotating shaft 151, and the second rotating bracket 112 rotates around the second rotating shaft 152. By disposing the transmission assembly in the foregoing embodiments, the first rotating shaft 151 and the second rotating shaft 152 move in a direction away from the mounting bracket 18. Therefore, the movement of the first rotating bracket 111 and the second rotating bracket 112 includes rotation and movement. That is, the first rotating bracket 111 further moves in the direction away from the mounting bracket 18 when rotating around the first rotating shaft 151, and the second rotating bracket 112 further moves in the direction away from the mounting bracket 18 when rotating around the second rotating shaft 152.

In addition, the first rotating bracket 111 is connected to the first support plate 171, and the second rotating bracket 112 is connected to the second support plate 172. Therefore, in a rotation and movement process of the first rotating bracket 111, the first support plate 171 can be driven to move and rotate, that is, the first support plate 171 rotates around the eleventh rotating shaft 158, and in a rotation and movement process of the second rotating bracket 112, the second support plate 172 can be driven to rotate around the twelfth rotating shaft 159. Under driving of the movement of the first rotating bracket 111 and the second rotating bracket 112, the second end 1716 of the first support plate 171 and the fourth end 1726 of the second support plate 172 are made away from each other, so that the foldable apparatus 1 switches from the unfolded state shown in FIG. 30 to the folded state shown in FIG. 31. In the folded state, the first rotating bracket 111 and the second rotating bracket 112 are located at a first position (a folding position). Similarly, because the first support plate 171 is slidably connected to the first transmission connecting rod 141, and the second support plate 172 is slidably connected to the second transmission connecting rod 142, in a process in which the first support plate 171 and the second support plate 172 rotate under driving of the first rotating bracket 111 and the second rotating bracket 112, the first support plate 171 is slidable and rotatable relative to the first transmission connecting rod 141, where a sliding track of the first support plate 171 is the first track 1713, and the second support plate 172 is slidable and rotatable relative to the second transmission connecting rod 142, where a sliding track of the second support plate 172 is the second track 1723. Therefore, the first track 1713 is used to guide the relative sliding between the first support plate 171 and the first transmission connecting rod 141, and the second track 1723 is used to guide the relative sliding between the second support plate 172 and the second transmission connecting rod 142.

In this embodiment, as shown in FIG. 31, when the first rotating bracket 111 and the second rotating bracket 112 are located at the first position, the first support plate 171, the second support plate 172, the first transmission connecting rod 141, the second transmission connecting rod 142, and the mounting bracket 18 form the accommodation space 174. With reference to FIG. 7 and FIG. 31, the accommodation space 174 is used to accommodate the folding part 26 of the flexible screen 2. When the first rotating bracket 111 drives the first support plate 171 to rotate and move in the direction away from the mounting bracket 18, and the second rotating bracket 112 drives the second support plate 172 to rotate and move in the direction away from the mounting bracket 18, compared with a case in which the first rotating bracket 111 drives only the first support plate 171 to rotate, and the second rotating bracket 112 drives only the second support plate 172 to rotate, when the foldable apparatus 1 is in the folded state shown in FIG. 31, a distance between the first support plate 171 and the mounting bracket 18 and a distance between the second support plate 172 and the mounting bracket 18 are larger, so that a second length L2 of a contour of the accommodation space 174 of the foldable apparatus 1 can be increased, to help implement L1<L2, alleviate squeezing and pulling of the folding part 26 by the foldable apparatus 1 in the folding process, improve reliability and structural strength of the flexible screen 2, and lower a requirement on performance of a material of the flexible screen 2, thereby reducing costs.

Further, when the foldable apparatus 1 is in the folded state, the first transmission connecting rod 141 and the second transmission connecting rod 142 both participate in forming the accommodation space 174 through enclosure. Specific structures of the first transmission connecting rod 141 and the second transmission connecting rod 142 are described in detail below.

Specifically, as shown in FIG. 26 and FIG. 31, the first transmission connecting rod 141 includes a first arcuate section 141f and a first straight section 141g, and the first arcuate section 141f and the first straight section 141g are distributed along the width direction Y of the mounting bracket 18, and are fastened to each other or integrally formed. The first arcuate section 141f is rotatably connected to the mounting bracket 18 by using the third rotating shaft 153, and the first straight section 141g is slidably connected to the first support plate 171. The second transmission connecting rod 142 includes a second arcuate section 142f and a second straight section 142g, and the second arcuate section 142f and the second straight section 142g are distributed along the width direction Y of the mounting bracket 18, and are fastened to each other or integrally formed. The second arcuate section 142f is rotatably connected to the mounting bracket 18 by using the fourth rotating shaft 154, and the second straight section 142g is slidably connected to the second support plate 172.

In this embodiment, as shown in FIG. 31, when the foldable apparatus 1 is in the folded state, the first support plate 171, the second support plate 172, the first arcuate section 141f of the first transmission connecting rod 141, the second arcuate section 142f of the second transmission connecting rod 142, and the mounting bracket 18 (or the third support plate 173) form the accommodation space 174 through enclosure. As shown in FIG. 10, the accommodation space 174 includes a third arcuate section 174a, a third straight section 174b, and a fourth straight section 174c, and the third arcuate section 174a is located between the third straight section 174b and the fourth straight section 174c. The first arcuate section 141f of the first transmission connecting rod 141 and the second arcuate section 142f of the second transmission connecting rod 142 form the third arcuate section 174a of the accommodation space 174 through enclosure, the first straight section 141g of the first support plate 171 forms the third straight section 174*b* of the accommodation space 174, and the second straight section 142*g* of the second support plate 172 forms the fourth straight section 174*c* of the accommodation space 174, so as to form the "water drop-shaped" accommodation space 174 through enclosure. In this case, a difference between L2 and L1 is a perimeter of the first arcuate section 141*f* plus a perimeter of the second arcuate section 142*f*.

In addition, in the accommodation space 174, the third arcuate section 174*a* fits a folded semi-circular arcuate fifth region 25, the third straight section 174*b* fits a folded planar third region 23, and the fourth straight section 174*c* fits a folded planar fourth region 24.

In the process in which the foldable apparatus 1 switches from the unfolded state to the folded state, that is, the first rotating bracket 111 switches from the second position to the first position, when rotating toward each other, the first rotating bracket 111 and the second rotating bracket 112 can drive the first support plate 171 to move in the direction away from the mounting bracket 18, to expose the first arcuate section 141*f* of the first transmission connecting rod 141, and can drive the second support plate 172 to move in the direction away from the mounting bracket 18, to expose the second arcuate section 142*f* of the second transmission connecting rod 142, so that the first arcuate section 141*f* and the second arcuate section 142*f* form the third arcuate section 174*a* of the accommodation space 174 through enclosure, to accommodate the fifth part 25 of the folding part 26. In this case, compared with a case in which the accommodation space 174 is formed through enclosure by the first support plate 171 and the second support plate 172 that are both in a slabbed structure, the first arcuate section 141*f* and the second arcuate section 142*f* can alleviate squeezing on the fifth part 25 of the folding part 26, so as to alleviate squeezing of the flexible screen 2 by the foldable apparatus 1 (the first transmission connecting rod 141 and the second transmission connecting rod 142) in the folding process, and further improve reliability and structural strength of the flexible screen 2.

Radians and lengths of the first arcuate section 141*f* and the second arcuate section 142*f* may be specifically set based on a shape and a size of the fifth part 25 of the flexible screen 2 in the folded state, so that the first arcuate section 141*f* and the second arcuate section 142*f* can fit the fifth part 25, to further alleviate squeezing of the folding part 26 of the flexible screen 2 by the foldable apparatus 1 in the folding process, and improve flatness of the folding part 26 in the folded state.

Figure 24:
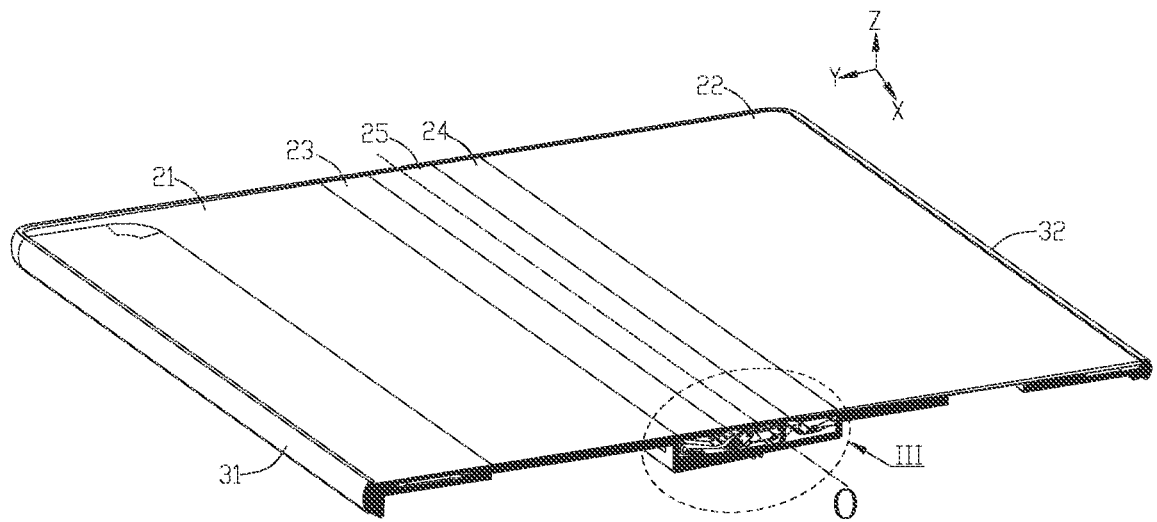
FIG. 24 is a cross-sectional diagram of FIG. 2.

In the foregoing embodiments, a fitting relationship between the foldable apparatus 1 and the flexible screen 2 in the unfolded state and the folded state is described as follows. As shown in FIG. 24, FIG. 25, and FIG. 30, when the foldable apparatus 1 is in the unfolded state (the electronic device is in the unfolded state), an upper end surface of the first support plate 171, an upper end surface of the mounting bracket 18 (or an upper end surface of the third support plate 173), and an upper end surface of the second support plate 173 are located in a same plane. In this case, along the width direction of the mounting bracket 18, the second end 1716 of the first support plate 171 is in lap-joint to the mounting bracket 18, and the fourth end 1726 of the second support plate 172 is connected to the mounting bracket 18. In this case, the upper end surface of the first support plate 171, the upper end surface of the second support plate 172, and the upper end surface of the mounting bracket 18 (or the upper end surface of the third support plate 173) jointly support the folding part 26 (including the third region 23, the fourth region 24, and the fifth region 25) of the flexible screen 2 in a flat shape, so that the folding part 26 of the flexible screen 2 is maintained in a flat state. When the folding part 26 of the flexible screen 2 is subjected to an external force (for example, the user performs an operation such as pressing or touching on the folding part 26 of the flexible screen 2, or the user holds the electronic device and applies an acting force to the folding part 26 of the flexible screen 2), the flexible screen 2 has a low risk of collapse or indentation. The flexible screen 2 has high reliability and a long service life. In addition, appearance and hand feeling of the flexible screen 2 are also improved.

As shown in FIG. 31, when the foldable apparatus 1 is in the folded state (the electronic device is in the folded state), the first support plate 171 rotates and slides under driving of the first rotating bracket 111, and the second support plate 172 rotates and slides under driving of the second rotating bracket 112. In addition, in the movement process of the first support plate 171 and the second support plate 172, the first arcuate section 141*f* of the first transmission connecting rod 141 and the second arcuate section 142*f* of the second transmission connecting rod 142 are exposed, to form the accommodation space 174 for accommodating the folding part 26 of the flexible screen 2. In addition, the first arcuate section 141*f* and the second arcuate section 142*f* are configured to accommodate the fifth part 25 of the flexible screen 2, and fit the fifth part 25, so that the fifth part 25 has a naturally bent semi-circular arcuate structure, that is, the fifth part 25 is not squeezed or pulled, so that reliability of the fifth part 25 in the folding process is improved. In addition, the accommodation space 174 further has sufficient space, so that the folding part 26 of the flexible screen 2 can be prevented from arching in the accommodation space 174, and flatness of the flexible screen 2 in the folded state can be improved.

The following describes in detail specific structures of the first track 1713 and the first slider 141*d* for implementing the slidable connection between the first transmission connecting rod 141 and the first support plate 171, and specific structures of the second track 1723 and the second slider 142*d* for implementing the slidable connection between the second transmission connecting rod 142 and the second support plate 172. In a specific embodiment, as shown in FIG. 29 to FIG. 31, the first track 1713 has a fifth end 1713*a* and a sixth end 1713*b* that are oppositely disposed, and the second track 1723 has a seventh end (not shown in the figure) and an eighth end 1723*b* that are oppositely disposed. When the foldable apparatus 1 is in the unfolded state shown in FIG. 30, the first slider 141*d* of the first transmission connecting rod 141 fits the first track 1713 at the fifth end 1713*a*, and the second slider 142*d* of the second transmission connecting rod 142 fits the second track 1723 at the seventh end. When the foldable apparatus 1 is in the folded state shown in FIG. 31, the first slider 141*d* of the first transmission connecting rod 141 fits the first track 1713 at the sixth end 1713*b*, and the second slider 142*d* of the second transmission connecting rod 142 fits the second track 1723 at the eighth end 1723*b*.

When the foldable apparatus 1 switches from the unfolded state shown in FIG. 30 to the folded state shown in FIG. 31, that is, in the process in which the first rotating bracket 111 and the second rotating bracket 112 rotate toward each other, the first slider 141*d* of the first transmission connecting rod 141 is slidable from the fifth end 1713*a* to the sixth end 1713*b* of the first track 1713, and the second slider 142*d* of the second transmission connecting rod 142 is slidable from the seventh end to the eighth end 1723*b* of the second track 1723. When the foldable apparatus 1 switches from the folded state shown in FIG. 31 to the unfolded state shown in FIG. 30, that is, in the process in which the first rotating bracket 111 and the second rotating bracket 112 rotate away from each other, the first slider 141d of the first transmission connecting rod 141 is slidable from the sixth end 1713b to the fifth end 1713a of the first track 1713, and the second slider 142d of the second transmission connecting rod 142 is slidable from the eighth end 1723b to the seventh end of the second track 1723.

In addition, the sixth end 1713b of the first track 1713 is closer, than the fifth end 1713a, to the mounting bracket 18, and the eighth end 1723b of the second track 1723 is closer, than the seventh end, to the mounting bracket 18. Therefore, in the process in which the foldable apparatus 1 switches from the unfolded state shown in FIG. 30 to the folded state shown in FIG. 31, that is, in the process in which the first rotating bracket 111 and the second rotating bracket 112 rotate toward each other, the first support plate 171 is slidable relative to the first transmission connecting rod 141 in the direction away from the mounting bracket 18, that is, the second end 1716 of the first support plate 171 moves in the direction away from the mounting bracket 18, so as to expose the first arcuate section 141f of the first transmission connecting rod 141. In addition, the second support plate 172 is slidable relative to the second transmission connecting rod 142 in the direction away from the mounting bracket 18, that is, the fourth end 1726 of the second support plate 172 moves in the direction away from the mounting bracket 18, so as to expose the second arcuate section 142f of the second transmission connecting rod 142. In this case, the first support plate 171, the first arcuate section 141f, the mounting bracket 18, the second arcuate section 142f, and the second support plate 172 form the accommodation space 174 through enclosure. Therefore, in this embodiment, by disposing the first track 1713 and the second track 1723, the first support plate 171 and the second support plate 172 can move in the direction away from the mounting bracket 18 in the folding process of the foldable apparatus 1.

Specifically, in the embodiment shown in FIG. 29 to FIG. 31, the first track 1713 is of an arcuate structure or an oblique structure, and the second track 1723 is of an arcuate structure or an oblique structure. In this case, the first track 1713 enables the first support plate 171 to rotate relatively when sliding relative to the first transmission connecting rod 141, to prevent jamming between the first support plate 171 and the first transmission connecting rod 141, and the second track 1723 enables the second support plate 172 to rotate relatively when sliding relative to the second transmission connecting rod 142, to prevent jamming between the second support plate 172 and the second transmission connecting rod 142. In the foregoing embodiments, as shown in FIG. 18, the foldable apparatus 1 may further include a rotating shaft cover 181. The mounting bracket 18 is mounted in an accommodation cavity 181a of the rotating shaft cover 181, and at least one part of the rotating bracket assembly 11 out of the rotating shaft cover 181.

In this embodiment, when the foldable apparatus 1 is in the folded state shown in FIG. 2, the rotating shaft cover 181 wraps components such as the mounting bracket 18, so as to improve an appearance effect of the electronic device, and the rotating shaft cover 181 can protect the foldable apparatus 1. In addition, when the foldable apparatus 1 is in the unfolded state shown in FIG. 3, the rotating shaft cover 3 can be hidden inside the first housing 31 and the second housing 32.

In the foregoing embodiments, to maintain the foldable apparatus 1 in the unfolded state or the folded state, the foldable apparatus 1 may also be provided with a damping assembly, configured to provide a damping force for the first rotating bracket 111 and the second rotating bracket 112. A specific structure of the damping assembly is described in detail below.

Specifically, as shown in FIG. 23, the foldable apparatus 1 further includes a first damping assembly 191 connected to the mounting bracket 18. The first damping assembly 191 and the transmission assembly are arranged along the length direction X of the mounting bracket 18, and the first damping assembly 191 is connected to the first rotating bracket 111 and the second rotating bracket 112 (including direct connection or indirect connection).

When the foldable apparatus 1 is in the unfolded state, the first damping assembly 191 can provide a first damping force, and the first damping force can act on the first rotating bracket 111 and the second rotating bracket 112, so as to provide resistance against rotation of the first rotating bracket 111 and the second rotating bracket 112 toward each other, so that the foldable apparatus 1 can be maintained in the unfolded state, and when the foldable apparatus 1 needs to switch from the unfolded state to the folded state, the user needs to apply, to the first rotating bracket 111 and the second rotating bracket 112, a driving force capable of overcoming the first damping force, so that the first rotating bracket 111 and the second rotating bracket 112 can overcome the first damping force, thereby enabling the foldable apparatus 1 to switch to the folded state. When the foldable apparatus 1 is in the folded state, the first damping assembly 191 can provide a second damping force, and the second damping force can act on the first rotating bracket 111 and the second rotating bracket 112, so as to provide resistance against rotation of the first rotating bracket 111 and the second rotating bracket 112 away from each other, so that the foldable apparatus 1 can be maintained in the folded state, and when the foldable apparatus 1 needs to switch from the folded state to the unfolded state, the user needs to apply, to the first rotating bracket 111 and the second rotating bracket 112, a driving force capable of overcoming the second damping force, so that the first rotating bracket 111 and the second rotating bracket 112 can overcome the second damping force, thereby enabling the foldable apparatus 1 to switch to the unfolded state. In addition, in the folding or unfolding process of the foldable apparatus 1 (in the process in which the first rotating bracket 111 and the second rotating bracket 112 rotate toward each other or away from each other), the first damping assembly 191 can further provide a third damping force, so as to provide a torque for the electronic device in the unfolding and folding process, and improve user experience in the unfolding and folding process.

The foldable apparatus 1 may include a plurality of first damping assemblies 191, and the first damping assemblies 191 are arranged at intervals along the length direction X of the mounting bracket 18. Along the length direction X of the mounting bracket 18, the first damping assembly 191 is located between adjacent synchronous gear sets 16.

Figure 32:
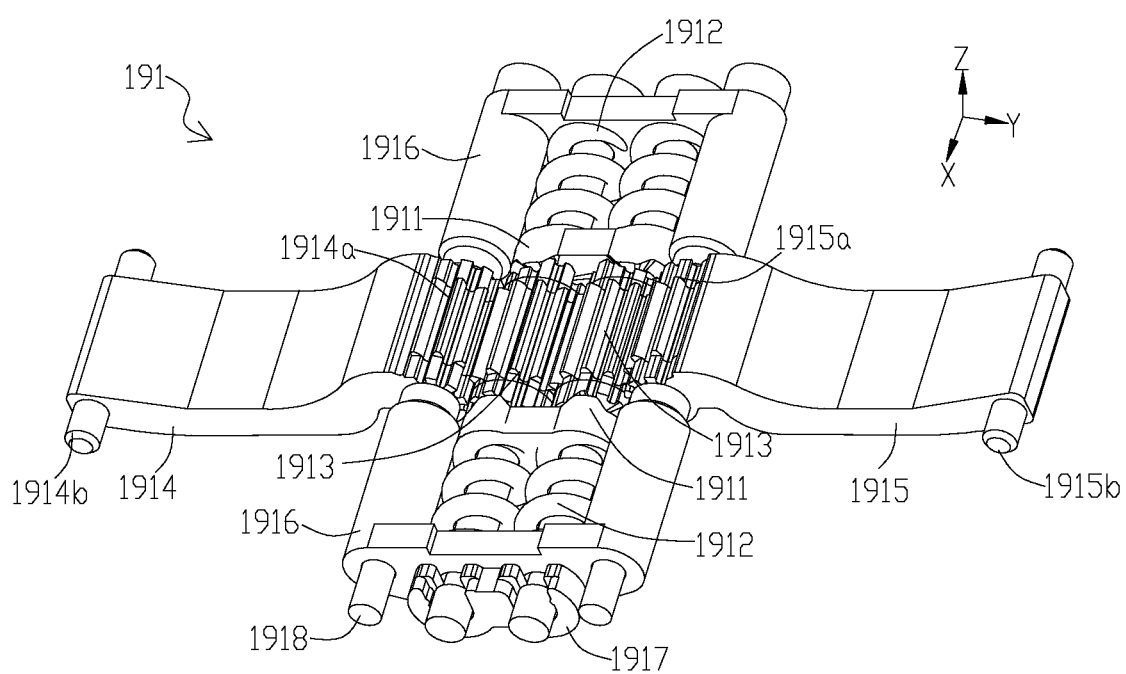
FIG. 32 is a schematic diagram of a structure of the first damping assembly in FIG. 23 in a specific embodiment.
Figure 33:
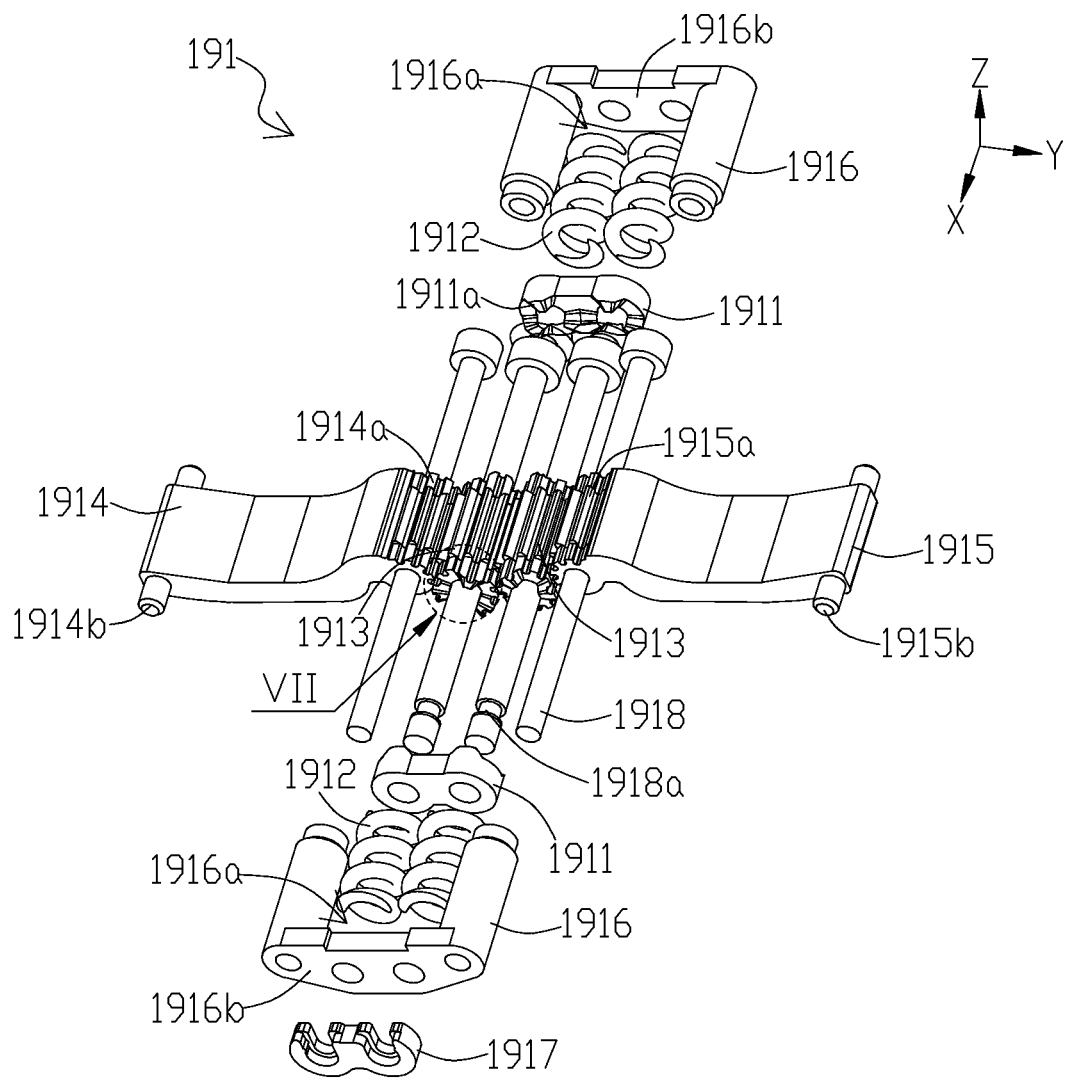
FIG. 33 is an exploded view of FIG. 32.
Figure 34:
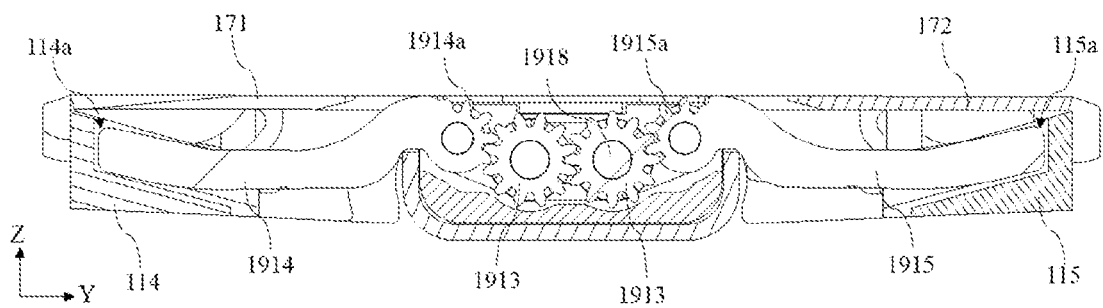
FIG. 34 is a cutaway drawing of FIG. 18 at the first damping assembly.

Specifically, a specific structure of the first damping assembly 191 is described as follows. As shown in FIG. 32 to FIG. 34, the first damping assembly 191 includes a first rotating arm 1914 and a second rotating arm 1915, and the first rotating arm 1914 and the second rotating arm 1915 are distributed along the width direction Y of the mounting bracket 18. The rotating bracket assembly 11 of the foldable apparatus 1 further includes a third rotating bracket 114 and a fourth rotating bracket 115, the third rotating bracket 114 and the fourth rotating bracket 115 are located on the two sides of the mounting bracket 18 along the width direction Y, and the third rotating bracket 114 is fastened to the first rotating bracket 111. The third rotating bracket 114 and the first rotating bracket 111 may be directly fastened to each other, or may be indirectly connected to each other by using the first support plate 171. The fourth rotating bracket 115 is fastened to the second rotating bracket 112. The fourth rotating bracket 115 and the second rotating bracket 112 may be directly fastened to each other, or may be indirectly connected to each other by using the second support plate 172. Magnitudes of the first damping force and the second damping force may be the same or different, and the third damping force may be less than the first damping force and the second damping force.

As shown in FIG. 32 and FIG. 33, a thirteenth rotating shaft 1914b is disposed on the first rotating arm 1914, and the first rotating arm 1914 is rotatably connected to the third rotating bracket 114 by using the thirteenth rotating shaft 1914b. In addition, as shown in FIG. 34, the third rotating bracket 114 has a first sliding space 114a, and one end that is of the first rotating arm 1914 and that is provided with the thirteenth rotating shaft 1914b extends into the first sliding space 114a and is slidable in the first sliding space 114a. That is, the first rotating arm 1914 is slidably connected to the third rotating bracket 114, and is rotatable relative to the third rotating bracket 114, so that the first rotating arm 1914 is rotatable with the first rotating bracket 111 under driving of the third rotating bracket 114. As shown in FIG. 32 and FIG. 33, a fourteenth rotating shaft 1915b is disposed on the second rotating arm 1915, and the second rotating arm 1915 is rotatably connected to the fourth rotating bracket 115 by using the fourteenth rotating shaft 1915b. In addition, as shown in FIG. 34, the fourth rotating bracket 115 has a second sliding space 115a, and one end that is of the second rotating arm 1915 and that is provided with the fourteenth rotating shaft 1915b extends into the second sliding space 115a and is slidable in the second sliding space 115a. That is, the second rotating arm 1915 is slidably connected to the fourth rotating bracket 115, and is rotatable relative to the fourth rotating bracket 115, so that the second rotating arm 1915 is rotatable with the second rotating bracket 112 under driving of the fourth rotating bracket 115, to prevent the first rotating arm 1914 and the second rotating arm 1915 from affecting relative rotation of the first rotating bracket 111 and the second rotating bracket 112.

In addition, the first damping assembly 191 further includes at least two first gears 1913 that mesh with each other, the at least two first gears 1913 are distributed along the width direction Y of the mounting bracket 18 and mesh with each other. In addition, a first tooth part 1914a is disposed at one end that is of the first rotating arm 1914 and that is away from the thirteenth rotating shaft 1914b, and a second tooth part 1915a is disposed at one end that is of the second rotating arm 1915 and that is away from the fourteenth rotating shaft 1915b. The first tooth part 1914a and the second tooth part 1915a respectively mesh with the corresponding first gears 1913. In this embodiment, by disposing the first gears 1913, and the first tooth part 1914a and the second tooth part 1915a that mesh with the first gears 1913, synchronous rotation of the first rotating arm 1914 and the second rotating arm 1915 can be implemented.

Figure 35:
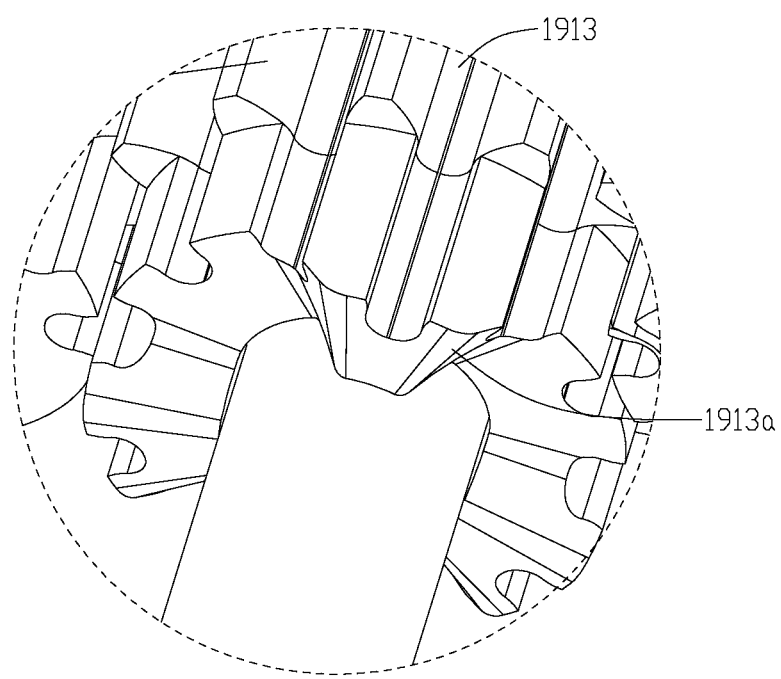
FIG. 35 is a partial enlarged view of part VII in FIG. 33.

Specifically, as shown in FIG. 33, the first damping assembly 191 further includes a cam 1911, the cam 1911 and the first gear 1913 are distributed along the length direction X of the mounting bracket 18, and cams 1911 may be disposed on two sides of the first gear 1913 along the length direction X of the mounting bracket 18. In addition, the cam 1911 and the first gear 1913 are disposed oppositely along the length direction X of the mounting bracket 18. As shown in FIG. 33, an end part that is of the cam 1911 and that faces the first gear 1913 along the length direction X of the mounting bracket 18 has a first concave-convex surface 1911a. Correspondingly, as shown in FIG. 35, an end part that is of the first gear 1913 and that faces the cam 1911 along the width direction Y of the mounting bracket 18 has a second concave-convex surface 1913a. The first concave-convex surface 1911a can mesh with the second concave-convex surface 1913a.

In addition, as shown in FIG. 32 and FIG. 33, the first damping assembly 191 may further include a first elastic member 1912. An elastic deformation direction of the first elastic member 1912 is parallel to the length direction X of the mounting bracket 18. In addition, the first elastic member 1912 is located on one side that is of the cam 1911 and that is away from the first gear 1913, and one end along the length direction Y of the mounting bracket 18 is connected to the cam 1911, and the other end is connected to the mounting bracket 18. That is, when the first elastic member 1912 is elastically deformed, an elastic force along the length direction X of the mounting bracket 18 can be applied to the cam 1911. When the first gear 1913 has the cams 1911 on both the two sides along the length direction X of the mounting bracket 18, the first damping assembly 191 includes two first elastic members 1912, and the two first elastic members 1912 respectively fit the two cams 1911. The first elastic member 1912 is in a compressed state.

It may be understood that, a process in which the first concave-convex surface 1911a of the cam 1911 meshes with the second concave-convex surface 1913a of the first gear 1913 includes at least the following three cases. In a first case, a convex surface of the first concave-convex surface 1911a fits a convex surface of the second concave-convex surface 1913a. In this case, the cam 1911 moves towards a direction of the corresponding first elastic member 1912, and compresses the first elastic member 1912, so that the first elastic member 1912 has a first deformation amount. In this case, the first elastic member 1912 in the compressed state can apply a first elastic force to the first gear 1913 by using the cam 1911. In a second case, the convex surface of the first concave-convex surface 1911a fits a concave surface of the second concave-convex surface 1913a, or a concave surface of the first concave-convex surface 1911a fits the convex surface of the second concave-convex surface 1913a. In this case, the first elastic member 1912 in the compressed state can apply a second elastic force to the first gear 1913 by using the cam 1911. The first elastic member 1912 has a second deformation amount, the second deformation amount is less than the first deformation amount, and the second elastic force is less than the first elastic force. In a third case, the concave surface of the first concave-convex surface 1911a fits the concave surface of the second concave-convex surface 1913a. In this case, the first elastic member 1912 in the compressed state can apply a third elastic force to the first gear 1913 by using the cam 1911. The first elastic member 1912 has a third deformation amount. In addition, the third deformation amount is less than the first deformation amount and less than the second deformation amount, and the third elastic force is less than the first elastic force and less than the second elastic force.

In this embodiment, a magnitude of the damping force applied by the first damping assembly 191 is determined by a magnitude of the elastic force of the first elastic member 1912. In addition, in a process in which the first rotating bracket 111 and the second rotating bracket 112 drive the first rotating arm 1914 and the second rotating arm 1915 to rotate, the first gear 1913 is rotatable accordingly, so that a position of fitting between the first concave-convex surface 1911a and the second concave-convex surface 1913a is changed, and the position of fitting between the first concave-convex surface 1911a and the second concave-convex surface 1913a switches in the foregoing three cases.

In a first specific embodiment, when the foldable apparatus 1 is in the folded state or the unfolded state, the foregoing first case may occur. In this case, when the foldable apparatus 1 needs to switch between the folded state and the unfolded state, the applied external force needs to be capable of overcoming the first elastic force of the first elastic member 1912. In addition, in the process in which the foldable apparatus 1 switches between the folded state and the unfolded state, the foregoing second case or third case may occur. That is, in the folding or unfolding process, the first damping assembly 191 can provide a damping force of the same magnitude as the second elastic force or the third elastic force. In a second specific embodiment, when the foldable apparatus 1 is in the folded state or the unfolded state, the foregoing second case may occur. In this case, when the foldable apparatus 1 needs to switch between the folded state and the unfolded state, the applied external force needs to be capable of overcoming the second elastic force of the first elastic member 1912. In addition, in the process in which the foldable apparatus 1 switches between the folded state and the unfolded state, the foregoing third case may occur. That is, in the folding or unfolding process, the first damping assembly 191 can provide a damping force of the same magnitude as the third elastic force.

In addition, in a process in which the first concave-convex surface 1911a meshes with the second concave-convex surface 1913a, the first concave-convex surface 1911a and the second concave-convex surface 1913a fit each other by using bevels, that is, an interaction force between the first concave-convex surface 1911a and the second concave-convex surface 1913a is perpendicular to the bevels (the concave surfaces or the convex surfaces) of the first concave-convex surface 1911a and the second concave-convex surface 1913a. This interaction force acting on the bevels (the concave surfaces or the convex surfaces) can generate a component force that drives the first gear 1913 to rotate, so as to generate a driving force that drives the first rotating arm 1914 and the second rotating arm 1915 to rotate toward each other or away from each other, so that the foldable apparatus 1 can be automatically folded or unfolded.

The first damping assembly 191 may include a plurality of cams 1911, and a quantity of the cams 1911 may be the same as a quantity of the first gears 1913, so that each first gear 1913 can be subjected to a damping force.

Specifically, as shown in FIG. 32 and FIG. 33, the first damping assembly 191 may further include a mounting member 1916. In addition, when the first damping assembly 191 includes two cams 1911 and two first elastic members 1912, there are also two mounting members 1916. In addition, the two mounting members 1916 are distributed along the length direction X of the mounting bracket 18, and are located on the two sides of the first gear 1913 along the length direction X of the mounting bracket 18. The mounting member 1916 has a mounting space 1916a, and the cam 1911 and the first elastic member 1912 are located in the corresponding mounting space 1916a. In this case, the mounting member 1916 is configured to mount the cam 1911 and the first elastic member 1912.

In addition, as shown in FIG. 32 to FIG. 34, the first damping assembly 191 further includes a pin shaft 1918 extending along the length direction X of the mounting bracket 18, and the pin shaft 1918 runs through the first gear 1913, so that the first gear 1913 is rotatable around the pin shaft 1918, and the cam 1911 and the first elastic member 1912 are sleeved over the pin shaft 1918. In addition, as shown in FIG. 32 and FIG. 33, the mounting member 1916 includes a press plate 1916b, and the press plate 1916b participates in forming the mounting space 1916a through enclosure. The press plate 1916b is provided with a rotating hole, and the pin shaft 1918 can run through the rotating hole, and is rotatable in the rotating hole. In addition, the pin shaft 1918 protrudes out of the mounting member 1916 through the rotating hole, and a part that is of the pin shaft 1918 and that protrudes out of the mounting member 1916 is provided with a clamping slot 1918a. The clamping slot 1918a is used for clamping with a clamping member 1917, so that each component of the first damping assembly 191 is clamped tightly by using the clamping member 1917, and the first elastic member 1912 is enabled to be in a compressed state. Two ends of the first elastic member 1912 elastically abut against the press plate 1916b and the cam 1911 respectively.

In addition, in the embodiment shown in FIG. 32 to FIG. 34, the first tooth part 1914a and the second tooth part 1915a are also provided with pin shafts 1918, so that the first tooth part 1914a rotates around the pin shaft 1918 running through the first tooth part 1914a, and the second tooth part 1915a rotates around the pin shaft 1918 running through the second tooth part 1915a.

With reference to FIG. 26 and FIG. 34, the third rotating shaft 153 of the second gear 161 in the synchronous gear set 16 is coaxial with the pin shaft 1918 of the first tooth part 1914a in the first damping assembly 191, that is, the second gear 161 and the first tooth part 1914a rotate around the same rotating shaft. The fourth rotating shaft 154 of the third gear 162 in the synchronous gear set 16 is coaxial with the pin shaft 1918 of the second tooth part 1915a in the first damping assembly 191, that is, the third gear 162 and the second tooth part 1915a rotate around the same rotating shaft. Rotating shafts of the fourth gear 163 and the fifth gear 164 in the synchronous gear set 16 are respectively coaxial with the pin shafts 1918 of the two first gears 1913 in the first damping assembly 191, that is, the fourth gear 164 and the fifth gear 165 rotate around the same rotating shaft respectively with the two first gears 1913. In this embodiment, synchronous rotation of the first rotating bracket 111 and the third rotating bracket 114 can be implemented, and synchronous rotation of the second rotating bracket 112 and the fourth rotating bracket 115 can be implemented.

In the foregoing embodiments, the foldable apparatus 1 may further include a second damping assembly 192 and a third damping assembly 193. As shown in FIG. 23, the second damping assembly 192 is connected to the first rotating bracket 111, and is configured to provide a damping force for the first rotating bracket 111, and the third damping assembly 193 is connected to the second rotating bracket 112, and is configured to provide a damping force for the second rotating bracket 112.

Specifically, when the foldable apparatus 1 is in the unfolded state, the second damping assembly 192 can provide a fourth damping force that can act on the first rotating bracket 111, so as to provide resistance against rotation of the first rotating bracket 111. The third damping assembly 193 can provide a fifth damping force that can act on the second rotating bracket 112, so as to provide resistance against rotation of the second rotating bracket 112, so that the first rotating bracket 111 and the second rotating bracket 112 can be maintained at an unfolding position, that is, the foldable apparatus 1 can be maintained in the unfolded state. In addition, when the foldable apparatus 1 needs to switch from the unfolded state to the folded state, the user needs to apply, to the first rotating bracket 111, a driving force capable of overcoming the fourth damping force, and apply, to the second rotating bracket 112, a driving force capable of overcoming the fifth damping force, so that the first rotating bracket 111 and the second rotating bracket 112 can rotate toward each other, thereby enabling the foldable apparatus 1 to switch from the unfolded state to the folded state.

When the foldable apparatus 1 is in the folded state, the second damping assembly 192 can provide a sixth damping force that can act on the first rotating bracket 111, so as to provide resistance against rotation of the first rotating bracket 111. The third damping assembly 193 can provide a seventh damping force that can act on the second rotating bracket 112, so as to provide resistance against rotation of the second rotating bracket 112, so that the first rotating bracket 111 and the second rotating bracket 112 can be maintained at a folding position, that is, the foldable apparatus 1 can be maintained in the folded state. When the foldable apparatus 1 needs to switch from the folded state to the unfolded state, the user needs to apply, to the first rotating bracket 111, a driving force capable of overcoming the sixth damping force, and apply, to the second rotating bracket 112, a driving force capable of overcoming the seventh damping force, so that the first rotating bracket 111 and the second rotating bracket 112 can rotate away from each other, thereby enabling the foldable apparatus 1 to switch from the folded state to the unfolded state. In addition, in the folding or unfolding process of the foldable apparatus 1 (in the process in which the first rotating bracket 111 and the second rotating bracket 112 rotate toward each other or away from each other), the second damping assembly 192 can apply an eighth damping force to the first rotating bracket 111, and the third damping assembly 193 can apply a ninth damping force to the second rotating bracket 112, so as to provide a torque for the electronic device in the unfolding and folding process, and improve user experience in the folding and unfolding process.

The foldable apparatus 1 may include one or more second damping assemblies 192, that is, all of the first rotating brackets 111 or some of the first rotating brackets 111 are provided with the second damping assemblies 192, and may also include one or more third damping assemblies 193, that is, all of the second rotating brackets 112 or some of the second rotating brackets 112 are provided with the third damping assemblies 193. In addition, the foldable apparatus 1 may alternatively include only the second damping assembly 192, or may include only the third damping assembly 193. When the foldable apparatus 1 includes the second damping assembly 192 and the third damping assembly 193, both the first rotating bracket 111 and the second rotating bracket 112 can be subjected to a damping force, so as to improve synchronization of the first rotating bracket 111 and the second rotating bracket 112.

Specific structures of the second damping assembly 192 and the third damping assembly 193 are described in detail below, and only the structure and a movement relationship of the second damping assembly 192 are used as an example for description. The structure and a movement relationship of the third damping assembly 193 are similar to those of the second damping assembly 192. The only difference lies in that the third damping assembly 193 fits the second rotating bracket 112 and is mounted on the second transmission connecting rod 142, so as to provide a damping force for the second rotating bracket 112.

Figure 37:
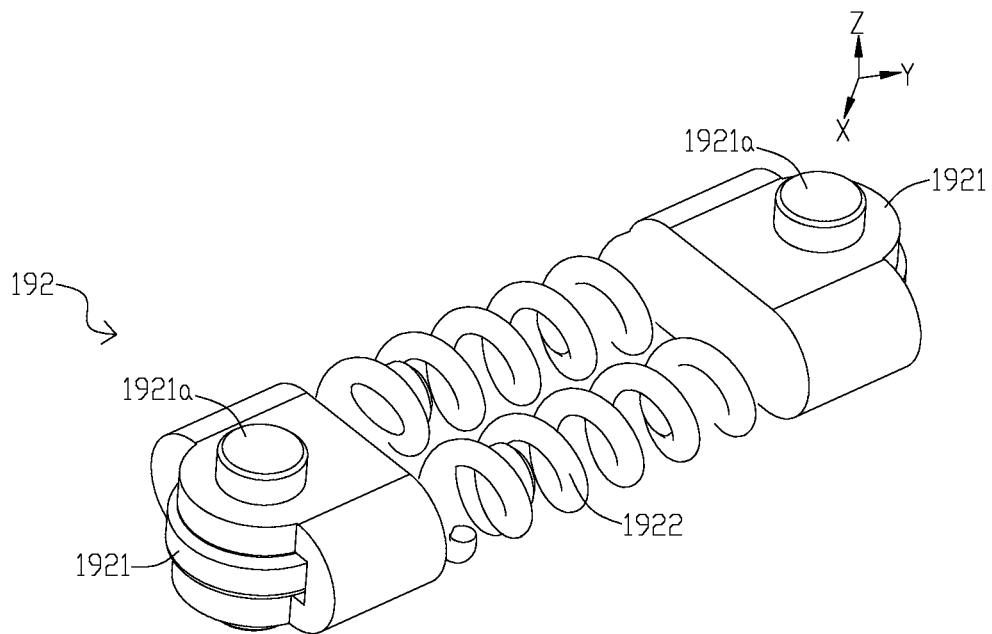
FIG. 37 is a schematic diagram of a structure of the second damping assembly in FIG. 36.

Specifically, as shown in FIG. 37, the second damping assembly 192 includes a first moving member 1921 and a second elastic member 1922. Along the length direction X of the mounting bracket 18, the second elastic member 1922 is connected to the first moving member 1921. In addition, the second elastic member 1922 is deformable along the length direction X of the mounting bracket 18, and in a deformation process of the second elastic member 1922, the first moving member 1921 can be driven to move relative to the second elastic member 1922 along the length direction X of the mounting bracket 18. The second damping assembly 192 may include two first moving members 1921, and the two first moving members 1921 are distributed along the length direction X of the mounting bracket 18. The second elastic member 1922 is located between the two first moving members 1921, and is connected to (abuts against or is fastened to) the two first moving members 1921. Therefore, when the second elastic member 1922 is deformed, the two first moving members 1921 can approach each other or move away from each other. The second elastic member 1922 is in a compressed state between the two first moving members 1921.

Figure 38:
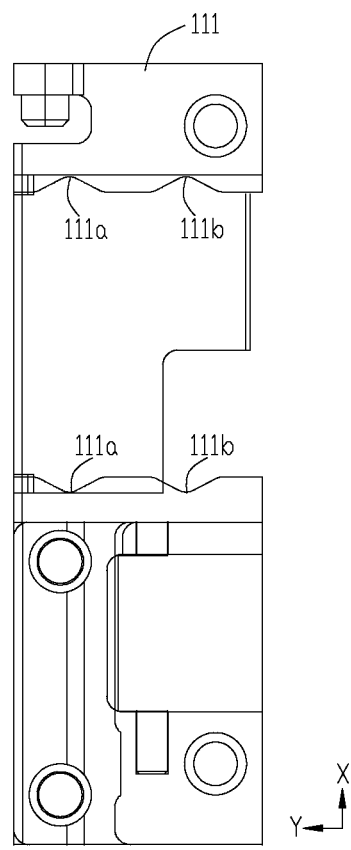
FIG. 38 is a top view of the first rotating bracket in FIG. 36.

As shown in FIG. 38, the first rotating bracket 111 includes a first recessed part 111*a* and a second recessed part 111*b* spaced along the width direction Y of the mounting bracket 18. A distance between the first recessed part 111*a* and the mounting bracket 18 is less than a distance between the second recessed part 111*b* and the mounting bracket 18, that is, the second recessed part 111*b* is closer, than the first recessed part 111*a*, to the mounting bracket 18. In addition, as shown in FIG. 38, the first rotating bracket 111 includes two first recessed parts 111*a*, and the two first recessed parts 111*a* are provided on the first rotating bracket 111 along the length direction X of the mounting bracket 18. The second rotating bracket 112 includes two second recessed parts 111*b*, and the two second recessed parts 111*b* are provided on the first rotating bracket 111 along the length direction X of the mounting bracket 18.

Figure 36:
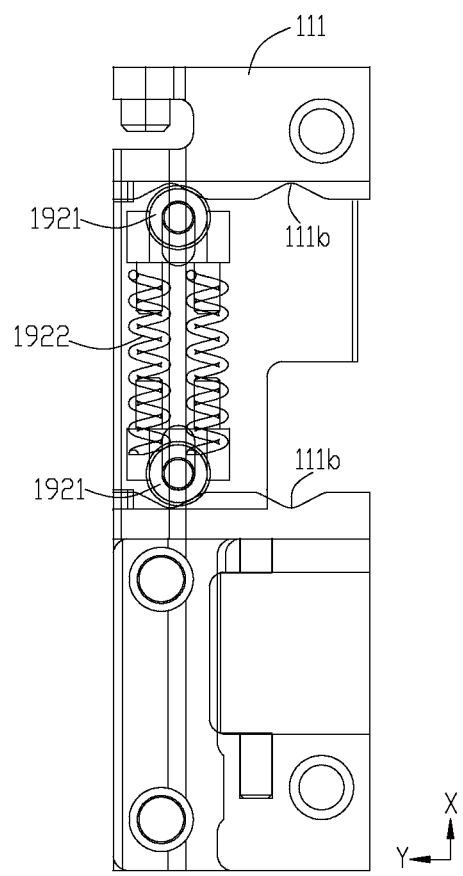
FIG. 36 is a perspective view of a first rotating bracket and a second damping assembly in FIG. 23 in a specific embodiment.

When the foldable apparatus 1 is in the unfolded state, as shown in FIG. 36, the first rotating bracket 111 and the second rotating bracket 112 are located at the second position. In this case, the first moving member 1921 of the second damping assembly 192 fits the first recessed part 111*a*. When the foldable apparatus 1 is in the folded state, the first rotating bracket 111 and the second rotating bracket 112 are located at the second position. In this case, the first moving member 1921 of the second damping assembly 192 fits the second recessed part 111*b*. When the foldable apparatus 1 switches between the unfolded state and the folded state, the first moving member 1921 is movable along a wall surface between the first recessed part 111*a* and the second recessed part 111*b*.

When the first moving member 1921 of the second damping assembly 192 fits the first recessed part 111*a*, the second elastic member 1922 has a fourth deformation amount. In this case, the second damping assembly 192 can apply a fourth damping force to the first rotating bracket 111 by using the second elastic member 1922. Under an action of the fourth damping force, the first rotating bracket 111 can be maintained at the first position. When the second moving member 1921 of the second damping assembly 192 fits the second recessed part 111*b*, the second elastic member 1922 has a fifth deformation amount. In this case, the second damping assembly 192 can apply a fifth damping force to the first rotating bracket 111 by using the second elastic member 1922. Under an action of the fifth damping force, the first rotating bracket 111 can be maintained at the second position. When the first moving member 1921 of the second damping assembly 192 moves between the first recessed part 111a and the second recessed part 111b, the second elastic member 1922 has a sixth deformation amount. In this case, the second damping assembly 192 can apply a sixth damping force to the first rotating bracket 111 by using the second elastic member 1922. Under an action of the sixth damping force, a torque can be provided for rotational movement of the first rotating bracket 111. The sixth deformation amount is less than the fourth deformation amount and the fifth deformation amount, that is, the sixth damping force is less than the fourth damping force and the fifth damping force. When structures of the first recessed part 111a and the second recessed part 111b are the same, the fifth deformation amount and the sixth deformation amount are the same (magnitudes of the fifth damping force and the sixth damping force are the same), and certainly, the fifth deformation amount and the sixth deformation amount may also be different.

Specifically, as shown in FIG. 37, the first moving member 1921 has a first roller 1921a. The first moving member 1921 is rollable relative to the first roller 1921a. That is, the first moving member 1921 is rollable between the first recessed part 111a and the second recessed part 111b, so as to reduce wear between the first moving member 1921 and the first rotating bracket 111.

Figure 39:
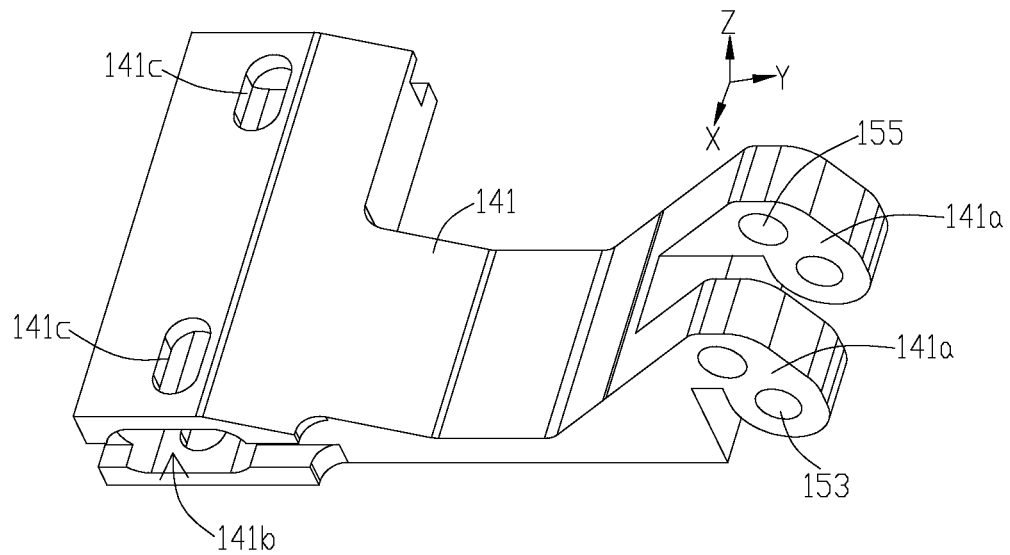
FIG. 39 is a schematic diagram of a structure of a first transmission connecting rod in FIG. 23.

In addition, the second damping assembly 192 is further connected to the first transmission connecting rod 141. As shown in FIG. 39, the first transmission connecting rod 141 has a first mounting cavity 141b, and the second damping assembly 192 is mounted in the first mounting cavity 141b, that is, the second damping assembly 192 is connected to the first transmission connecting rod 141. In addition, along the length direction X of the mounting bracket 18, two side walls of the first mounting cavity 141b both have openings, and two first moving members 1921 of the second damping assembly 192 can protrude from the openings, so as to fit the first rotating bracket 111. In the first transmission connecting rod 141, a top wall of the first mounting cavity 141b is provided with a first through hole 141c, and a size of the first through hole 141c along the length direction X of the mounting bracket 18 is greater than a size of the first through hole 141c along the width direction Y of the mounting bracket 18, that is, the first through hole 141c is an elongated hole. The first roller 1921a of the first moving member 1921 is rotatable in the first through hole 141c. In a rotation process of the first roller 1921a, the first moving member 1921 can roll along the width direction Y of the mounting bracket 18. In addition, the first roller 1921a is further movable along the length direction X of the mounting bracket 18, and can implement movement of the two first moving members 1921 along the length direction X of the mounting bracket 18, to change a deformation amount of the second elastic member 1922.

Figure 40:
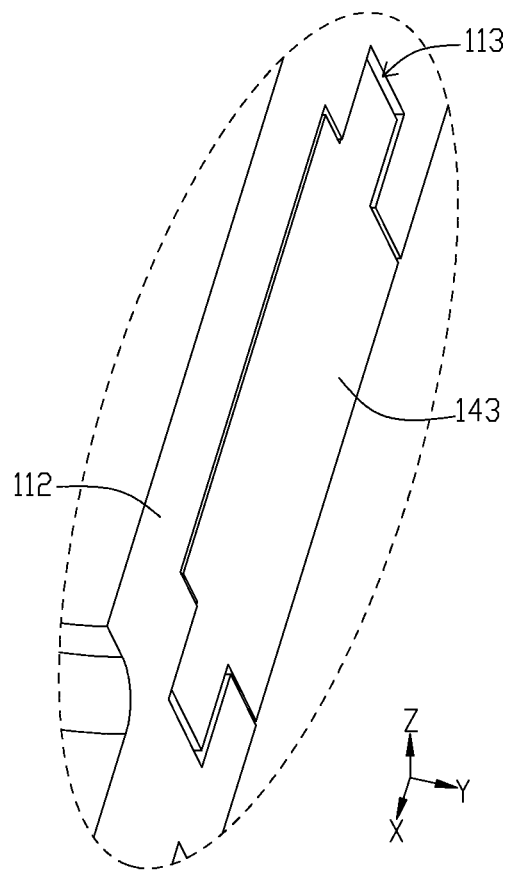
FIG. 40 is a partial enlarged view of part VIII in FIG. 13.

In the foregoing embodiments, the first transmission connecting rod 141 is slidably connected to the first rotating bracket 111, and the second transmission connecting rod 142 is slidably connected to the second rotating bracket 112. Specifically, as shown in FIG. 40, an example in which the second rotating bracket 112 is slidably connected to the second transmission connecting rod 142 is used. The second rotating bracket 112 is provided with a third track 113. Correspondingly, the second transmission connecting rod 142 is provided with a third slider 143, and the third slider 143 is slidable along the third track 113. A slidable connection structure between the first transmission connecting rod 141 and the first rotating bracket 111 is similar to this, and details are not described herein again.

In addition, an embodiment of this disclosure further provides an electronic device. The electronic device includes any one of the foldable apparatuses in the foregoing implementations and two housings. A first housing and a second housing are located on two sides of the foldable apparatus. The first housing is fastened to the first rotating bracket located on a same side. The second housing is fastened to the second rotating bracket located on a same side. A flexible screen 2 fastened to the two housings is further included.

As shown in FIG. 2, the flexible screen 2 includes a first region 21, a second region 22, a third region 23, a fourth region 24, and a fifth region 25. The first region 21 is connected to the first housing 31 (which may be specifically adhesion). The second region 22 is connected to the second housing 32 (which may be specifically adhesion). The third region 23, the fourth region 24, and the fifth region 25 correspond to the foldable apparatus 1, that is, the accommodation space 174 of the foldable apparatus 1 is used to accommodate the third region 23, the fourth region 24, and the fifth region 25, that is, the third region 23, the fourth region 24, and the fifth region 25 form a folding part 26 of the flexible screen 2. Specifically, as shown in FIG. 25, the third region 23 corresponds to the first support plate 171, the fourth region 24 corresponds to the second support plate 172, and the fifth region 25 corresponds to the third support plate 173.

A specific manner of connection between the support plate assembly 17 and the flexible screen 2 is described below.

In a specific embodiment, the third region 23 is not fastened to the first support plate 171, the fourth region 24 is not fastened to the second support plate 172, and the fifth region 25 is not fastened to the third support plate 173. In this embodiment, when the electronic device is in a folded state, the third region 23, the fourth region 24, and the fifth region 25 form a water drop-shaped structure after being folded, that is, the folding part 26 is in a water drop shape, and the fifth region 25 is semi-circular arcuate after being folded.

In another specific embodiment, the third region 23 is fastened to the first support plate 171 (which may be specifically adhesion), the fourth region 24 is fastened to the second support plate 172 (which may be specifically adhesion), and the fifth region 25 is not fastened to the third support plate 173. In this case, when the electronic device is in the folded state, the fifth region 25 forms a semi-circular arc shape through enclosure.

In this embodiment, when the third region 23 is fastened to the first support plate 171, and the fourth region 24 is fastened to the second support plate 172, in a folding or unfolding process of the electronic device, the third region 23 can be enabled to move with the first support plate 171, and the fourth region 24 can be enabled to move with the second support plate 172, that is, there is no relative movement between the third region 23 and the first support plate 171, so that flatness of the folding part 26 of the flexible screen 2 in the unfolding and folding process is improved, and a failure risk of the flexible screen 2 is reduced.

The foregoing descriptions are merely specific implementations of this disclosure, but are not intended to limiting the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A foldable apparatus comprising:
a mounting bracket; and
a rotating bracket assembly, wherein the rotating bracket assembly comprises a first rotating bracket and a second rotating bracket arranged on two different sides of the mounting bracket along a width direction of the mounting bracket; the first rotating bracket is rotatably connected to the mounting bracket by using a first rotating shaft, and the first rotating shaft is movable relative to the mounting bracket along the width direction of the mounting bracket; and the second rotating bracket is rotatably connected to the mounting bracket by using a second rotating shaft, and the second rotating shaft is movable relative to the mounting bracket along the width direction of the mounting bracket; and
when the first rotating bracket and the second rotating bracket rotate toward each other, the first rotating shaft and the second rotating shaft are configured to move in a direction away from the mounting bracket along the width direction of the mounting bracket;
wherein the foldable apparatus further comprises:
a swing arm assembly, comprising a first swing arm and a second swing arm that are located on the two different sides of the mounting bracket along the width direction of the mounting bracket, wherein the rotating bracket assembly is rotatably connected to the mounting bracket by using the swing arm assembly, one end of the first swing arm is slidably connected to the first rotating bracket and is rotatable relative to the first rotating bracket, and an other end of the first swing arm is rotatably connected to the mounting bracket by using the first rotating shaft, and one end of the second swing arm is slidably connected to the second rotating bracket and is rotatable relative to the second rotating bracket, and an other end of the second swing arm is rotatably connected to the mounting bracket by using the second rotating shaft; and
a transmission assembly, comprising a transmission group and a push group, wherein
the transmission group comprises a first transmission connecting rod and a second transmission connecting rod that are located on the two different sides of the mounting bracket along the width direction of the mounting bracket; the first transmission connecting rod is slidably connected to the first rotating bracket and rotatably connected to the mounting bracket, and the second transmission connecting rod is slidably connected to the second rotating bracket and rotatably connected to the mounting bracket; and
the push group comprises a first push member and a second push member the first push member is rotatably connected to the second swing arm by using the second rotating shaft, and the first push member is further rotatably connected to the first transmission connecting rod, and the second push member is rotatably connected to the first swing arm by using the first rotating shaft, and the second push member is further rotatably connected to the second transmission connecting rod, wherein
an axis around which the first transmission connecting rod rotates relative to the mounting bracket and an axis around which the first transmission connecting rod rotates relative to the first push member are different axes, and an axis around which the second transmission connecting rod rotates relative to the mounting bracket and an axis around which the second transmission connecting rod rotates relative to the second push member are different axes, and
the first transmission connecting rod is configured to transfer movement of the first rotating bracket, to drive the first push member to posh the second rotating shaft to move in the direction away from the mounting bracket, and the second transmission connecting rod is configured to transfer movement of the second rotating bracket, to drive the second push member to push the first rotating shaft to move in the direction away from the mounting bracket.

2. The foldable apparatus according to claim 1, wherein the transmission assembly further comprises a limiting group, and the limiting group comprises a first limiting member and a second limiting member;
one end of the first limiting member is rotatably connected to the mounting bracket, and an other end of the first limiting member is rotatably connected to the first swing arm and the second push member by using the first rotating shaft;
one end of the second limiting member is rotatably connected to the mounting bracket, and an other end of the second limiting member is rotatably connected to the second swing arm and the first push member by using the second rotating shaft; and
the first limiting member is configured to limit movement of the first push member along a first preset track, and the second limiting member is configured to limit movement of the second push member along a second preset track.

3. The foldable apparatus according to claim 2, wherein both the first preset track and the second preset track extend along the width direction of the mounting bracket and are tilted toward a thickness direction of the mounting bracket; and tilt directions of the first preset track and the second preset track are opposite.

4. The foldable apparatus according to claim 2, wherein the transmission assembly further comprises a limiting group, and the limiting group comprises a first limiting member and a second limiting member; and both the first limiting member and the second limiting member are slidably connected to the mounting bracket;
the first limiting member is slidable relative to the mounting bracket along the width direction of the mounting bracket, the first limiting member is rotatably connected to the second push member by using the first rotating shaft, and the second push member is movable relative to the first limiting member along a thickness direction of the mounting bracket;
the second limiting member is slidable relative to the mounting bracket along the width direction of the mounting bracket, the second limiting member is rotatably connected to the first push member by using the second rotating shaft, and the first push member is movable relative to the second limiting member along the thickness direction of the mounting bracket; and
the first limiting member is configured to limit movement of the first push member along a preset track, and the second limiting member is configured to limit movement of the second push member along another preset track.

5. The foldable apparatus according to claim 4, wherein chutes extending along the width direction of the mounting bracket are provided on side walls of the mounting bracket that are relative to the first limiting member and the second limiting member, and the first limiting member and the second limiting member are respectively slidably connected to the corresponding chutes.

6. The foldable apparatus according to claim 4, wherein a first mounting groove is provided in the second limiting member, a second mounting groove is provided in the first limiting member, and both the first mounting groove and the second mounting groove are recessed along the thickness direction of the mounting bracket; and
the first push member is movably connected to the first mounting groove, and the second push member is movably connected to the second mounting groove.

7. The foldable apparatus according to claim 1, wherein the first rotating shaft is disposed on the first push member, and the second rotating shaft is disposed on the second push member; and
chutes extending along the width direction of the mounting bracket are provided on side walls of the mounting bracket that are relative to the first rotating shaft and the second rotating shaft, and the first rotating shaft and the second rotating shaft are respectively slidably connected to the corresponding chutes.

8. The foldable apparatus according to claim 1, wherein the foldable apparatus further comprises a support plate assembly, and the support plate assembly comprises a first support plate and a second support plate arranged on the two different sides of the mounting bracket along the width direction of the mounting bracket;
the first support plate is rotatably connected to the first rotating bracket, and the first support plate is slidably connected to the first transmission connecting rod and is rotatable relative to the first transmission connecting rod;
the second support plate is rotatably connected to the second rotating bracket, and the second support plate is slidably connected to the second transmission connecting rod and is rotatable relative to the second transmission connecting rod; and
in a configuration in which the first rotating bracket and the second rotating bracket rotate toward each other, the first transmission connecting rod is configured to drive one end of the first support plate that is close to the mounting bracket to move in a direction away from the mounting bracket, and the second transmission connecting rod is configured to drive one end of the second support plate that is close to the mounting bracket to move in the direction away from the mounting bracket, so that the first rotating bracket and the second rotating bracket rotate to a first position, and in this case, the first support plate, the mounting bracket, and the second support plate form an accommodation space through enclosure.

9. The foldable apparatus according to claim 8, wherein the first transmission connecting rod further comprises a first arcuate section and the second transmission connecting rod further comprises a second arcuate section; and
when the first rotating bracket and the second rotating bracket rotate toward each other to the first position, the first support plate, the first arcuate section, the mounting bracket, the second arcuate section, and the second support plate form the accommodation space through enclosure.

10. The foldable apparatus according to claim 8, wherein a first track and a first slider that are slidably fitted are provided on the first support plate and the first transmission connecting rod, and a second track and a second slider that are slidably fitted are provided on the second support plate and the second transmission connecting rod; and
in a configuration in which the first rotating bracket and the second rotating bracket rotate toward each other, the first slider is configured to slide from an end of the first track that is away from the mounting bracket to an end of the first track that is close to the mounting bracket, and the second slider is configured to slide from an end of the second track that is away from the mounting bracket to an end of the second track that is close to the mounting bracket.

11. The foldable apparatus according to claim 1, wherein the foldable apparatus further comprises a first damping assembly connected to the mounting bracket, and the first damping assembly and the transmission assembly are arranged along a length direction of the mounting bracket;
the first damping assembly comprises a first rotating arm, a second rotating arm, at least two mutually meshed first gears, a first elastic member, and a cam disposed between the first elastic member and the first gears, wherein the cam has a first concave-convex surface;
along the width direction of the mounting bracket, one end of the first rotating arm is slidably connected to the first rotating bracket and is slidable relative to the first rotating bracket, an other end of the first rotating arm is provided with a first tooth part, one end of the second rotating arm is slidably connected to the second rotating bracket and is slidable relative to the second rotating bracket, and an other end of the second rotating arm is provided with a second tooth part, both the first tooth part and the second tooth part mesh with the first gears, and along the length direction of the mounting bracket, a second concave-convex surface is disposed on a surface that is of the first gear and that is relative to the first concave-convex surface;
the cam and the first gears are arranged along the length direction of the mounting bracket, and two ends of the first elastic member elastically abut against the mounting bracket and the cam respectively; and
in a configuration in which the first rotating arm and the second rotating arm rotate, the first tooth part and the second tooth part are rotatable relative to the cam, so that the first concave-convex surface can mesh with the second concave-convex surface.

12. The foldable apparatus according to claim 11, wherein the first damping assembly further comprises a mounting member, the mounting member has a mounting space, and the cam and the first elastic member are located in the mounting space;
one of the first gears is connected to a pin shaft extending along the length direction of the mounting bracket, the cam and the first elastic member are sleeved on the pin shaft, and two ends of the first elastic member elastically abut against the mounting member and the cam respectively; and
a rotating hole is provided in the mounting member, the pin shaft can run through the rotating hole and protrude out of the mounting member, the first damping assembly further comprises a clamping member, a clamping slot is provided in a part of the pin shaft that protrudes out of the mounting member, and the clamping member is clamped with the clamping slot.

13. The foldable apparatus according to claim 1, wherein the foldable apparatus further comprises a damping assembly and another damping assembly, the first transmission connecting rod has a first mounting cavity for accommodating the damping assembly, and the second transmission connecting rod has a second mounting cavity for accommodating the damping assembly;

the damping assembly comprises a first moving member and an elastic member, and along the length direction of the mounting bracket, the elastic member is connected to the first moving member, and the first moving member elastically abuts to the first rotating bracket by using the elastic member, and the first moving member is connected to the first transmission connecting rod by using a first roller; and the another damping assembly comprises a second moving member and another elastic member, and along the length direction of the mounting bracket, the another elastic member is connected to the second moving member, and the second moving member elastically abuts to the second rotating bracket by using the another elastic member, and the second moving member is connected to the second transmission connecting rod by using a second roller.

14. The foldable apparatus according to claim 13, wherein the first rotating bracket comprises a first recessed part and a second recessed part spaced along the width direction of the mounting bracket; and the second rotating bracket comprises a third recessed part and a fourth recessed part spaced along the width direction of the mounting bracket;

in a configuration in which the first rotating bracket rotates, the first moving member is movable along a wall surface between the first recessed part and the second recessed part, and the first moving member can fit the first recessed part or the second recessed part; and in a configuration in which the second rotating bracket rotates, the second moving member is movable along a wall surface between the third recessed part and the fourth recessed part, and the second moving member can fit the third recessed part or the fourth recessed part.

15. The foldable apparatus according to claim 13, wherein a first through hole is provided in the first mounting cavity, the first roller is rotatable in the first through hole, and the first roller is movable in the first through hole along the length direction of the mounting bracket; and a second through hole is provided in the second mounting cavity, the second roller is rotatable in the second through hole, and the second roller is movable in the second through hole along the length direction of the mounting bracket.

16. The foldable apparatus according to claim 1, wherein the transmission assembly further comprises a synchronous gear set, the synchronous gear set comprises a first gear, a second gear, a third gear, and a fourth gear arranged along the width direction of the mounting bracket, the third gear meshes with the first gear, the fourth gear meshes with the second gear, and the third gear meshes with the fourth gear; and the first gear is connected to the first transmission connecting rod, and the second gear is connected to the second transmission connecting rod.

17. The foldable apparatus according to claim 1, wherein: the transmission assembly further comprises a limiting group, and the limiting group comprises a first limiting member and a second limiting member; and the first limiting member is configured to limit movement of the first push member along a first preset track, and the second limiting member is configured to limit movement of the second push member along a second preset track.

18. The foldable apparatus according to claim 1, wherein the transmission assembly further comprises a limiting group, and the limiting group comprises a first limiting member and a second limiting member; and both the first limiting member and the second limiting member are slidably connected to the mounting bracket.

19. An electronic device comprising:
a first housing,
a second housing, a flexible screen, and
a foldable apparatus comprising:
a mounting bracket; and
a rotating bracket assembly, wherein the rotating bracket assembly comprises a first rotating bracket and a second rotating bracket arranged on two different sides of the mounting bracket along a width direction of the mounting bracket; the first rotating bracket is rotatably connected to the mounting bracket by using a first rotating shaft, and the first rotating shaft is movable relative to the mounting bracket along the width direction of the mounting bracket; and the second rotating bracket is rotatably connected to the mounting bracket by using a second rotating shaft, and the second rotating shaft is movable relative to the mounting bracket along the width direction of the mounting bracket; and when the first rotating bracket and the second rotating bracket rotate toward each other, the first rotating shaft and the second rotating shaft are configured to move in a direction away from the mounting bracket along the width direction of the mounting bracket;

the first housing and the second housing are located on two different sides of the foldable apparatus, the first housing is fastened to the first rotating bracket located on a same side, and the second housing is fastened to the second rotating bracket located on a same side; and the flexible screen at least partially covers the first housing, the second housing, and the foldable apparatus, and is fastened to the first housing and the second housing:

wherein the foldable apparatus further comprises;

a swing arm assembly, comprising a first swing arm and a second swing arm that are located on the two different sides of the mounting bracket along the width direction of the mounting bracket, wherein the rotating bracket assembly is rotatably connected to the mounting bracket by using the swing arm assembly, one end of the first swing arm is slidably connected to the first rotating bracket and is rotatable relative to the first rotating bracket, and an other end of the first swing arm is rotatably connected to the mounting bracket by using the first rotating shaft; and one end of the second swing arm is slidably connected to the second rotating bracket and is rotatable relative to the second rotating bracket, and an other end of the second swing arm is rotatably connected to the mounting bracket by using the second rotating shaft; and a transmission assembly, comprising a transmission group and a push group, wherein the transmission group comprises a first transmission connecting rod and a second transmission connecting rod that are located on the two different sides of the mounting bracket along the width direction of the mounting bracket; the first transmission connecting rod is slidably connected to the first rotating bracket and rotatably connected to the mounting bracket, and the second transmission connecting rod is slidably connected to the second rotating bracket and rotatably connected to the mounting bracket; and the push group comprises a first push member and a second push member the first push member is rotatably connected to the second swing arm by using the second rotating shaft, and the first push member is further rotatably connected to the first transmission connecting rod, and the second posh member is rotatably connected to the first swing arm by using the first rotating shaft, and the second push member is further rotatably connected to the second transmission connecting rod, wherein an axis around which the first transmission connecting rod rotates relative to the mounting bracket and an axis around which the first transmission connecting rod rotates relative to the first push member are different axes, and an axis around which the second transmission connecting rod rotates relative to the mounting bracket and an axis around which the second transmission connecting rod rotates relative to the second push member are different axes, and the first transmission connecting rod is configured to transfer movement of the first rotating bracket, to drive the first push member to push the second rotating shaft to move in the direction away from the mounting bracket, and the second transmission connecting rod is configured to transfer movement of the second rotating bracket, to drive the second push member to push the first rotating shaft to move in the direction away from the mounting bracket.

20. The electronic device according to claim 19, wherein when the foldable apparatus comprises a support plate assembly, the flexible screen is further fastened to at least one part of the support plate assembly.

\* \* \* \* \*